(12) United States Patent
Abe et al.

(10) Patent No.: US 12,061,392 B2
(45) Date of Patent: Aug. 13, 2024

(54) IMAGE DISPLAY DEVICE, AND METHOD FOR SELECTING COMBINATION OF BACKLIGHT LIGHT SOURCE AND POLARIZING PLATE IN LIQUID CRYSTAL DISPLAY DEVICE

(71) Applicant: TOYOBO CO., LTD., Osaka (JP)

(72) Inventors: Takahisa Abe, Tsuruga (JP); Toshiki Inoue, Otsu (JP); Yasushi Sasaki, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 18/551,551

(22) PCT Filed: Mar. 17, 2022

(86) PCT No.: PCT/JP2022/012456
§ 371 (c)(1),
(2) Date: Sep. 20, 2023

(87) PCT Pub. No.: WO2022/202637
PCT Pub. Date: Sep. 29, 2022

(65) Prior Publication Data
US 2024/0176189 A1 May 30, 2024

(30) Foreign Application Priority Data

Mar. 24, 2021 (JP) ................................ 2021-050517
Dec. 21, 2021 (JP) ................................ 2021-207557
(Continued)

(51) Int. Cl.
*G02F 1/13357* (2006.01)
*G02F 1/1335* (2006.01)

(52) U.S. Cl.
CPC .. *G02F 1/133609* (2013.01); *G02F 1/133528* (2013.01); *G02F 2201/50* (2013.01)

(58) Field of Classification Search
CPC ......... G02F 1/133609; G02F 1/133528; G02F 2201/50
See application file for complete search history.

(56) References Cited

U.S. PATENT DOCUMENTS

| | | | |
|---|---|---|---|
| 2003/0071952 A1 | 4/2003 | Yoshida et al. | |
| 2013/0093982 A1 | 4/2013 | Kuroda et al. | |
| (Continued) | | | |

FOREIGN PATENT DOCUMENTS

| | | |
|---|---|---|
| CN | 1760703 A | 4/2006 |
| CN | 103033984 A | 4/2013 |
| (Continued) | | |

OTHER PUBLICATIONS

Japan Patent Office, International Search Report in International Patent Application No. PCT/JP2022/012456 (Jun. 7, 2022).

*Primary Examiner* — Mariam Qureshi
(74) *Attorney, Agent, or Firm* — Leydig, Voit & Mayer, Ltd.

(57) ABSTRACT

Provided is a liquid crystal display device that has a wide reproduced color gamut without noticeable color unevenness even if it is an image display device that shows an steep emission spectrum in the red region, in particular, even if it comprises a light source having a steep emission spectrum in the red region, such as a KSF phosphor, as a backlight light source. The image display device comprises an image display cell and at least one polarizer, wherein the at least one polarizer is a polarizer in which light incident on the polarizer has a plurality of peak groups in the range of 600 to 650 nm, and the at least one polarizer comprises a polarizing element-protection film having a 45-degree light source fit index (FI(45)) of 0.4 or more and 0.62 or less as determined by the following formula 1:

$$FI(45)=Wd/[Wc/(Rob(45)/Wc)] \qquad \text{formula 1.}$$

20 Claims, 1 Drawing Sheet

(30) Foreign Application Priority Data

| Jan. 6, 2022 | (JP) | ................................. 2022-001276 |
| Jan. 6, 2022 | (JP) | ................................. 2022-001277 |
| Jan. 6, 2022 | (JP) | ................................. 2022-001278 |
| Jan. 12, 2022 | (JP) | ................................. 2022-003088 |

(56) References Cited

U.S. PATENT DOCUMENTS

| 2013/0100378 A1 | 4/2013 | Murata et al. |
| 2013/0342771 A1 | 12/2013 | Kim et al. |
| 2017/0261794 A1 | 9/2017 | Murata et al. |
| 2018/0034819 A1* | 2/2018 | Yan ........................ H04L 63/06 |
| 2018/0173038 A1 | 6/2018 | Murata et al. |
| 2020/0050039 A1* | 2/2020 | Koike ................ G02F 1/133528 |
| 2021/0389626 A1* | 12/2021 | Abe ..................... C08G 63/183 |

FOREIGN PATENT DOCUMENTS

| CN | 105143967 A | 12/2015 |
| CN | 108292058 A | 7/2018 |
| JP | 2016-060075 A | 4/2016 |
| JP | 2016-161833 A | 9/2016 |
| JP | 2017-102289 A | 6/2017 |
| KR | 10-2015-0114860 A | 10/2015 |
| KR | 10-2015-0135935 A | 12/2015 |
| WO | 2011/162198 A1 | 12/2011 |
| WO | 2017/010444 A1 | 1/2017 |
| WO | 2017/065148 A1 | 4/2017 |
| WO | 2017/119427 A1 | 7/2017 |
| WO | 2020/071282 A1 | 4/2020 |

* cited by examiner

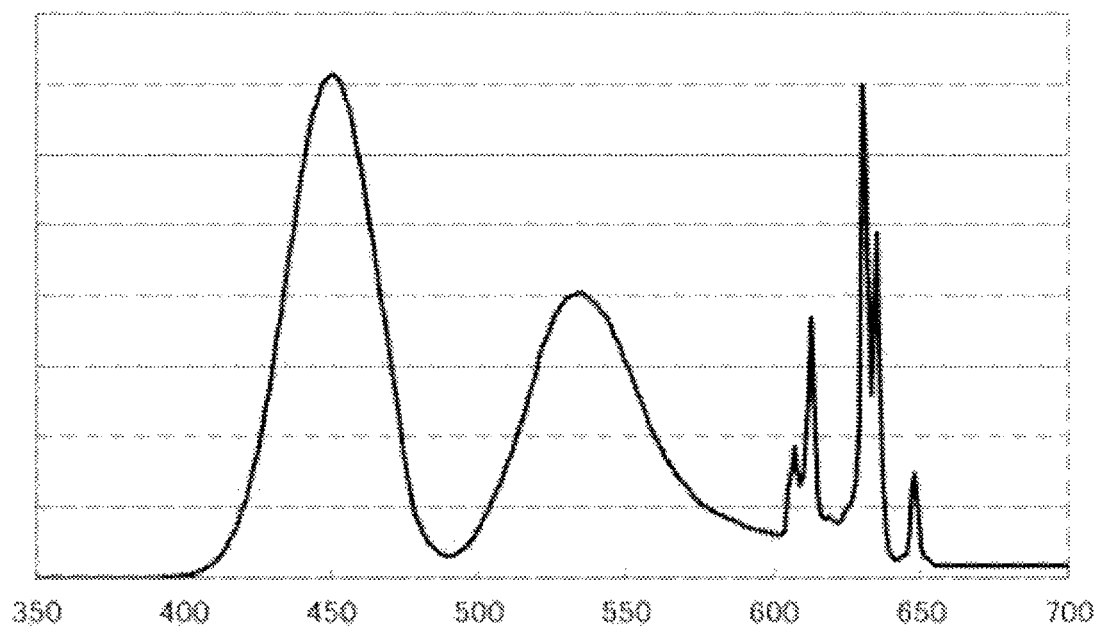

IMAGE DISPLAY DEVICE, AND METHOD FOR SELECTING COMBINATION OF BACKLIGHT LIGHT SOURCE AND POLARIZING PLATE IN LIQUID CRYSTAL DISPLAY DEVICE

TECHNICAL FIELD

The present invention relates to an image display device. The present invention typically relates to an image display device that shows an emission spectrum having steep peaks in the red region. In particular, the present invention relates to a liquid crystal display device having wide expressiveness in the CIE (Commission Internationale de l'Eclairage) chromaticity diagram by using a light source having steep peaks in the red region in an emission spectrum.

BACKGROUND ART

It has been known that when films with birefringent properties, such as polyester films, are used in an environment with a fluorescent or cold-cathode tube light source, rainbow unevenness due to retardation occurs. Thus, optically isotropic cellulose-based films have been used as polarizing element-protection films used in liquid crystal displays and the like.

In recent years, a technique has been proposed to suppress rainbow unevenness in liquid crystal display devices by combining a polarizer comprising a polyester film having an in-plane retardation of 3000 to 30000 nm as a polarizing element-protection film with a white light source having a continuous emission spectrum (e.g., Patent Literature (PTL) 1). In this technique, excellent properties of polyester as polarizing element-protection films, such as mechanical strength, transparency, low absorption, and low moisture permeability, are highly valued. Further, with the lower price and widespread use of white light-emitting diodes, which combine a blue light-emitting diode and a yellow phosphor, such devices have been put to practical use as liquid crystal display devices.

Liquid crystal display devices have recently been required to have wider color reproducibility, and light sources with steep emission peaks in the red region in an emission spectrum, called KSF phosphors (phosphors in which Mn is added to $K_2SiF_6$ crystals), are increasingly used as white light-emitting diodes.

However, when a light source containing such a KSF phosphor is combined with a polarizer including a polyester film with a high retardation as a polarizing element-protection film, red stripe-like color unevenness is observed in some areas; thus, further improvement is required in suppressing color unevenness. Some methods have been proposed to suppress color unevenness in liquid crystal display devices using such a KSF light source. Examples include a method of setting the refractive index of a polyester film in the transmission axis direction of a polarizer to 1.53 to 1.62 (e.g., PTL 2) and a method of providing an anti-reflection layer and/or a low reflection layer on at least one surface of a polyester film (e.g., PTL 3). However, there is room for further improvement. In particular, when a polyester film is used for a polarizer on the light-source side, color unevenness is likely to occur, and further improvement is required.

In image display devices with higher definition, such as 4K or 8K, there are many opportunities to view an image closely even if they are large image display devices. Thus, even small defects are noticeable, and improvement of these defects is also required. To take advantage of the characteristics of wide-color-gamut image display devices, polarizing element-protection films are also required to have high transparency.

Furthermore, in a black display area or with the power turned off, an interference color due to light interference of the coating layer of the polarizing element-protection film is noticeable. Such an interference color deteriorates the display image quality and the appearance quality of display devices themselves. In particular, large image display devices, which are often used in show windows, lobbies of luxury hotels, high-end stores, etc., are required to have an excellent appearance even when they are turned off.

CITATION LIST

Patent Literature

PTL 1: WO2011/162198
PTL 2: WO2017/010444
PTL 3: WO2017/065148

SUMMARY OF INVENTION

Technical Problem

An object of the present invention is to provide an image display device that has a wide reproduced color gamut without noticeable color unevenness even if it shows an emission spectrum with steep peaks in the red region; and an image display device in which further, no noticeable interference colors are shown when the light is off. Another object of the present invention is to provide a liquid crystal display device that has a wide reproduced color gamut without noticeable color unevenness even when a light source having an emission spectrum that has steep peaks in the red region, such as a KSF phosphor, is used as a backlight light source; and a liquid crystal display device in which further, no noticeable interference colors are shown when the light is off.

Another object of the present invention is to provide an image display device that has no noticeable defects even if it is a high-definition image display device. Another object of the present invention is to provide an image display device capable of reproducing high-clarity, vivid colors. Another object of the present invention is to provide a display device (in particular, a large display device) that is less likely to cause color unevenness over the entire screen even when viewed from an oblique direction, and provides a uniform color tone.

Solution to Problem

As a result of intensive study to achieve the above objects, the present inventors have completed the present invention. Specifically, the present invention includes the following embodiments.

Item 1.
An image display device comprising an image display cell and at least one polarizer,
wherein the at least one polarizer is a polarizer in which light incident on the polarizer has a plurality of peak groups in the range of 600 to 650 nm, and the at least one polarizer comprises a polarizing element-protection film having a 45-degree light source fit index (FI(45)) of 0.4 or more and 0.62 or less as determined by the following formula 1:

$$FI(45)=Wd/[Wc/(Rob(45)/Wc)] \qquad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 2:

The image display device according to Item 1, wherein the polarizing element-protection film has a 30-degree light source fit index (FI(30)) of 0.35 or more and 0.68 or less as determined by the following formula 2, and a 60-degree light source fit index (FI(60)) of 0.35 or more and 0.68 or less as determined by the following formula 3:

$$FI(30)=Wd/[Wc/(Rob(30)/Wc)] \quad \text{formula 2}$$

$$FI(60)=Wd/[Wc/(Rob(60)/Wc)] \quad \text{formula 3}$$

Rob(30): retardation when measuring the polarizing element-protection film from a direction inclined 50 degrees from the normal direction to the in-plane direction of the film at an angle of 30 degrees from the slow-axis direction to the fast-axis direction Rob(60): retardation when measuring the polarizing element-protection film from a direction inclined 50 degrees from the normal direction to the in-plane direction of the film at an angle of 60 degrees from the slow-axis direction to the fast-axis direction Wd: peak-to-peak distance (nm) of the peak groups Wc: central wavelength (nm) of the peak groups.

Item 3.

The image display device according to Item 2, wherein the ratio of a difference between the FI(30) and the FI(60) (ΔFI=FI(60)−FI(30)) to the FI(45) (ΔFI/FI(45)) in the polarizing element-protection film is 0.2 or more and 0.35 or less.

Item 4.

An image display device comprising an image display cell and at least one polarizer, wherein the at least one polarizer is a polarizer in which light incident on the polarizer has a plurality of peak groups in the range of 600 to 650 nm, the at least one polarizer comprises a polarizing element and at least one polarizing element-protection film, values obtained by measuring a 45-degree light source fit index (FI(45)) of the at least one polarizing element-protection film at intervals of 100 mm along a long-side direction and at intervals of 100 mm along a short-side direction are each 0.4 or more and 0.62 or less, the FI(45) being determined by the following formula 1, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less:

$$FI(45)=Wd/[Wc/(Rob(45)/Wc)] \quad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 5.

The image display device according to Item 4, wherein values obtained by measuring a 30-degree light source fit index (FI(30)) and a 60-degree light source fit index (FI(60)) of the at least one polarizing element-protection film at intervals of 100 mm along the long-side direction and at intervals of 100 mm along the short-side direction are each 0.35 or more and 0.68 or less, the FI(30) being determined by the following formula 2, and the FI(60) being determined by the following formula 3:

$$FI(30)=Wd/[Wc/(Rob(30)/Wc)] \quad \text{formula 2}$$

$$FI(60)=Wd/[Wc/(Rob(60)/Wc)] \quad \text{formula 3}$$

Rob(30): retardation when measuring the polarizing element-protection film from a direction inclined 50 degrees from the normal direction to the in-plane direction of the film at an angle of 30 degrees from the slow-axis direction to the fast-axis direction Rob(60): retardation when measuring the polarizing element-protection film from a direction inclined 50 degrees from the normal direction to the in-plane direction of the film at an angle of 60 degrees from the slow-axis direction to the fast-axis direction Wd: peak-to-peak distance (nm) of the peak groups Wc: central wavelength (nm) of the peak groups.

Item 6.

The image display device according to Item 5, wherein values obtained by measuring ΔFI/FI(45) of the at least one polarizing element-protection film at intervals of 100 mm along the long-side direction and at intervals of 100 mm along the short-side direction are each 0.2 or more and 0.35 or less, the ΔFI/FI(45) being the ratio of a difference between the FI(30) and the FI(60) (ΔFI=FI(60)−FI(30)) to the FI(45).

Item 7.

The image display device according to any one of Items 1 to 6, wherein the number of foreign substances having a longer diameter of 100 μm or more in the polarizing element-protection film is 1 or less.

Item 8.

The image display device according to any one of Items 1 to 7, wherein in the polarizing element-protection film, the amount of antimony atoms in a residue that is insoluble in a mixed solvent of parachlorophenol and tetrachloroethane is 50 mg or less per kg of a resin that forms the polarizing element-protection film.

Item 9.

The image display device according to any one of Items 1 to 8, wherein the polarizing element-protection film comprises an easy-to-adhere layer containing particles with a refractive index of 1.7 to 3 on at least one surface thereof.

Item 10.

The image display device according to any one of Items 1 to 9, wherein the light having a plurality of peak groups in the range of 600 to 650 nm incident on the polarizer is derived from light emitted by excitation of a red phosphor activated with tetravalent manganese ions.

Item 11.

An image display device comprising an image display cell and at least one polarizer, wherein the at least one polarizer comprises a polarizing element-protection film having a retardation (Rob(45)) of 7500 nm or more and 11700 nm or less as measured from a direction inclined 50 degrees from a normal direction to an in-plane direction of the film at an angle of 45 degrees from a slow-axis direction to a fast-axis direction, and light incident on the at least one polarizer comprises light emitted by excitation of a red phosphor activated with tetravalent manganese ions.

Item 12.

An image display device comprising an image display cell and at least one polarizer,
wherein the at least one polarizer comprises a polarizing element and at least one polarizing element-protection film,
values obtained by measuring a retardation (Rob(45)) of the at least one polarizing element-protection film at intervals of 100 mm along a long-side direction and at intervals of 100 mm along a short-side direction are each 7500 nm or more and 11700 nm or less, the Rob(45) being measured from a direction inclined 50 degrees from a normal direction to an in-plane direction of the film at an angle of 45 degrees from a slow-axis direction to a fast-axis direction,
a value obtained by subtracting the minimum value from the maximum value of the Rob(45) measured at intervals of 100 mm along the long-side direction and a value obtained by subtracting the minimum value from the maximum value of the Rob(45) measured at intervals of 100 mm along the short-side direction are each 500 nm or less, and
light incident on the at least one polarizer comprises light emitted by excitation of a red phosphor activated with tetravalent manganese ions.

Item 13.

The image display device according to Item 11 or 12, wherein the number of foreign substances having a longer diameter of 100 μm or more in the polarizing element-protection film is 1 or less.

Item 14.

The image display device according to any one of Items 11 to 13, wherein in the polarizing element-protection film, the amount of antimony atoms in a residue that is insoluble in a mixed solvent of parachlorophenol and tetrachloroethane is 50 mg or less per kg of a resin that forms the polarizing element-protection film.

Item 15.

The image display device according to any one of Items 11 to 14, wherein the polarizing element-protection film comprises an easy-to-adhere layer containing particles with a refractive index of 1.7 to 3 on at least one surface thereof.

Item 16.

The image display device according to any one of Items 11 to 15, wherein the red phosphor activated with tetravalent manganese ions is represented by $K_2SiF_6:Mn^{4+}$.

Item 17.

The image display device according to any one of Items 11 to 16, wherein the polarizing element-protection film has a haze of 5% or less.

Item 18.

The image display device according to any one of Items 11 to 17, wherein at least one surface of the polarizing element-protection film has a surface roughness (SRa) of 0.05 μm or less.

Item 19.

The image display device according to any one of Items 11 to 18, wherein in the polarizer comprising the polarizing element-protection film, an angle between a slow axis in a plane of the polarizing element-protection film and an absorption axis of the polarizing element is 83 degrees or more and 90 degrees or less, or 0 degrees or more and 7 degrees or less, in terms of acute angle.

Item 20.

The image display device according to any one of Items 11 to 19, wherein the polarizer comprises a λ/4 wavelength layer on a surface of the polarizing element on a side opposite to a surface on which the polarizing element-protection film is laminated.

Item 21.

The image display device according to any one of Items 1 to 20, which is an electroluminescent image display device.

Item 22.

A liquid crystal display device comprising a backlight light source, a light-source-side polarizer, a liquid crystal cell, and a viewing-side polarizer,
wherein an emission spectrum of the backlight light source has a plurality of peak groups in the range of 600 to 650 nm, and
at least one of the light-source-side polarizer and the viewing-side polarizer comprises a polarizing element-protection film having a 45-degree light source fit index (FI(45)) of 0.4 or more and 0.62 or less as determined by the following formula 1:

$$FI(45)=Wd/[Wc/(Rob(45)/Wc)] \qquad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 23.

The liquid crystal display device according to Item 22, wherein the polarizing element-protection film has a 30-degree light source fit index (FI(30)) of 0.35 or more and 0.68 or less as determined by the following formula 2, and a 60-degree light source fit index (FI(60)) of 0.35 or more and 0.68 or less as determined by the following formula 3:

$$FI(30)=Wd/[Wc/(Rob(30)/Wc)] \qquad \text{formula 2}$$

$$FI(60)=Wd/[Wc/(Rob(60)/Wc)] \qquad \text{formula 3}$$

Rob(30): retardation when measuring the polarizing element-protection film from a direction inclined 50 degrees from the normal direction to the in-plane direction of the film at an angle of 30 degrees from the slow-axis direction to the fast-axis direction Rob(60): retardation when measuring the polarizing element-protection film from a direction inclined 50 degrees from the normal direction to the in-plane direction of the film at an angle of 60 degrees from the slow-axis direction to the fast-axis direction Wd: peak-to-peak distance (nm) of the peak groups Wc: central wavelength (nm) of the peak groups.

Item 24.

The liquid crystal display device according to Item 23, wherein the ratio of a difference between the FI(30) and the FI(60) (ΔFI=FI(60)−FI(30)) to the FI(45) (ΔFI/FI(45)) in the polarizing element-protection film is 0.2 or more and 0.35 or less.

Item 25.

The liquid crystal display device according to any one of Items 22 to 24, wherein the viewing-side polarizer comprises a polarizing element-protection film having a 45-degree light source fit index (FI(45)) of 0.4 or more and 0.62 or less as determined by formula 1.

Item 26.

The liquid crystal display device according to any one of Items 22 to 25, wherein the light-source-side polarizer comprises a polarizing element-protection film having a 45-degree light source fit index (FI(45)) of 0.4 or more and 0.62 or less as determined by formula 1.

Item 27.

A liquid crystal display device comprising a backlight light source, a light-source-side polarizer, a liquid crystal cell, and a viewing-side polarizer, wherein an emission spectrum of the backlight light source has a plurality of peak groups in the range of 600 to 650 nm, at least one of the light-source-side polarizer and the viewing-side polarizer comprises a polarizing element and at least one polarizing element-protection film, values obtained by measuring a 45-degree light source fit index (FI(45)) of the at least one polarizing element-protection film at intervals of 100 mm along a long-side direction and at intervals of 100 mm along a short-side direction are each 0.4 or more and 0.62 or less, the FI(45) being determined by the following formula 1, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less:

$$FI(45)=Wd/[Wc/(Rob(45)/Wc)] \quad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 28.

The liquid crystal display device according to Item 27, wherein values obtained by measuring a 30-degree light source fit index (FI(30)) and a 60-degree light source fit index (FI(60)) of the at least one polarizing element-protection film at intervals of 100 mm along the long-side direction and at intervals of 100 mm along the short-side direction are each 0.35 or more and 0.68 or less, the FI(30) being determined by the following formula 2, and the FI(60) being determined by the following formula 3:

$$FI(30)=Wd/[Wc/(Rob(30)/Wc)] \quad \text{formula 2}$$

$$FI(60)=Wd/[Wc/(Rob(60)/Wc)] \quad \text{formula 3}$$

Rob(30): retardation when measuring the polarizing element-protection film from a direction inclined 50 degrees from the normal direction to the in-plane direction of the film at an angle of 30 degrees from the slow-axis direction to the fast-axis direction Rob(60): retardation when measuring the polarizing element-protection film from a direction inclined 50 degrees from the normal direction to the in-plane direction of the film at an angle of 60 degrees from the slow-axis direction to the fast-axis direction Wd: peak-to-peak distance (nm) of the peak groups Wc: central wavelength (nm) of the peak groups.

Item 29.

The liquid crystal display device according to Item 28, wherein values obtained by measuring ΔFI/FI(45) of the at least one polarizing element-protection film at intervals of 100 mm along the long-side direction and at intervals of 100 mm along the short-side direction are each 0.2 or more and 0.35 or less, the ΔFI/FI(45) being the ratio of a difference between the FI(30) and the FI(60) (ΔFI=FI(60)−FI(30)) to the FI(45).

Item 30.

The liquid crystal display device according to any one of Items 27 to 29, wherein the viewing-side polarizer comprises a polarizing element-protection film, values obtained by measuring the 45-degree light source fit index (FI(45)), which is determined by formula 1, of the polarizing element-protection film at intervals of 100 mm along a long-side direction and at intervals of 100 mm along a short-side direction are each 0.4 or more and 0.62 or less, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less.

Item 31.

The liquid crystal display device according to any one of Items 27 to 30, wherein the light-source-side polarizer comprises a polarizing element-protection film, values obtained by measuring the 45-degree light source fit index (FI(45)), which is determined by formula 1, of the polarizing element-protection film at intervals of 100 mm along a long-side direction and at intervals of 100 mm along a short-side direction are each 0.4 or more and 0.62 or less, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less.

Item 32.

The liquid crystal display device according to any one of Items 22 to 31, wherein the number of foreign substances having a longer diameter of 100 μm or more in the polarizing element-protection film is 1 or less.

Item 33.

The liquid crystal display device according to any one of Items 22 to 32, wherein in the polarizing element-protection film, the amount of antimony atoms in a residue that is insoluble in a mixed solvent of parachlorophenol and tetrachloroethane is 50 mg or less per kg of a resin that forms the polarizing element-protection film.

Item 34.

The liquid crystal display device according to any one of Items 22 to 33, wherein the polarizing element-protection film comprises an easy-to-adhere layer containing particles with a refractive index of 1.7 to 3 on at least one surface thereof.

Item 35.

The liquid crystal display device according to any one of Items 22 to 34, wherein the backlight light source allows a red phosphor activated with tetravalent manganese ions to emit light by excitation light.

Item 36.

The liquid crystal display device according to Item 35, wherein the backlight light source allows a red phosphor represented by $K_2SiF_6:Mn^{4+}$ to emit light by excitation light.

Item 37.

A liquid crystal display device comprising a backlight light source, a light-source-side polarizer, a liquid crystal cell, and a viewing-side polarizer, wherein the backlight light source allows a red phosphor activated with tetravalent manganese ions to emit light by excitation light, and at least one of the light-source-side polarizer and the viewing-side polarizer comprises a polarizing element-protection film having a retardation (Rob(45)) of 7500 nm or more and 11700 nm or less as measured from a direction inclined 50 degrees from a normal direction to an in-plane direction of the film at an angle of 45 degrees from a slow-axis direction to a fast-axis direction.

Item 38.

The liquid crystal display device according to Item 37, wherein the polarizing element-protection film has a Rob(30) of 6570 nm or more and 12200 nm or less and a Rob(60) of 6570 nm or more and 12200 nm or less.

Item 39.

The liquid crystal display device according to Item 38, wherein a difference between the Rob(30) and the Rob(60) (ΔRob=Rob(60)−Rob(30)) in the polarizing element-protection film is 1880 nm or more and 3400 nm or less.

Item 40.

The liquid crystal display device according to any one of Items 37 to 39, wherein the viewing-side polarizer comprises a polarizing element-protection film having a Rob(45) of 7500 nm or more and 11700 nm or less.

Item 41.

The liquid crystal display device according to any one of Items 37 to 40, wherein the light-source-side polarizer comprises a polarizing element-protection film having a Rob(45) of 7500 nm or more and 11700 nm or less.

Item 42.

A liquid crystal display device comprising a backlight light source, a light-source-side polarizer, a liquid crystal cell, and a viewing-side polarizer, wherein the backlight light source allows a red phosphor activated with tetravalent manganese ions to emit light by excitation light, at least one of the light-source-side polarizer and the viewing-side polarizer comprises a polarizing element and at least one polarizing element-protection film, values obtained by measuring a retardation (Rob(45)) of the at least one polarizing element-protection film at intervals of 100 mm along a long-side direction and at intervals of 100 mm along a short-side direction are each 7500 nm or more and 11700 nm or less, the Rob(45) being measured from a direction inclined 50 degrees from a normal direction to an in-plane direction of the film at an angle of 45 degrees from a slow-axis direction to a fast-axis direction, and a value obtained by subtracting the minimum value from the maximum value of the Rob(45) measured at intervals of 100 mm along the long-side direction and a value obtained by subtracting the minimum value from the maximum value of the Rob(45) measured at intervals of 100 mm along the short-side direction are each 500 nm or less.

Item 43.

The liquid crystal display device according to Item 42, wherein values obtained by measuring Rob(30) and Rob(60) of the polarizing element-protection film at intervals of 100 mm along the long-side direction and at intervals of 100 mm along the short-side direction are each 6570 nm or more and 12200 nm or less.

Item 44.

The liquid crystal display device according to Item 43, wherein values obtained by measuring a difference between the Rob(30) and the Rob(60) (ΔRob=Rob(60)−Rob(30)) of the polarizing element-protection film at intervals of 100 mm along the long-side direction and at intervals of 100 mm along the short-side direction are each 1880 nm or more and 3400 nm or less.

Item 45.

The liquid crystal display device according to any one of Items 37 to 44, wherein the viewing-side polarizer comprises a polarizing element-protection film, and values obtained by measuring the Rob(45) of the polarizing element-protection film at intervals of 100 mm along a long-side direction and at intervals of 100 mm along a short-side direction are each 7500 nm or more and 11700 nm or less.

Item 46.

The liquid crystal display device according to any one of Items 37 to 45, wherein the light-source-side polarizer comprises a polarizing element-protection film, and values obtained by measuring the Rob(45) of the polarizing element-protection film at intervals of 100 mm along a long-side direction and at intervals of 100 mm along a short-side direction are each 7500 nm or more and 11700 nm or less.

Item 47.

The liquid crystal display device according to any one of Items 37 to 46, wherein the number of foreign substances having a longer diameter of 100 μm or more in the polarizing element-protection film is 1 or less.

Item 48.

The liquid crystal display device according to any one of Items 37 to 47, wherein in the polarizing element-protection film, the amount of antimony atoms in a residue that is insoluble in a mixed solvent of parachlorophenol and tetrachloroethane is 50 mg or less per kg of a resin that forms the polarizing element-protection film.

Item 49.

The liquid crystal display device according to any one of Items 37 to 48, wherein the polarizing element-protection film comprises an easy-to-adhere layer containing particles with a refractive index of 1.7 to 3 on at least one surface thereof.

Item 50.

The liquid crystal display device according to any one of Items 37 to 49, wherein the red phosphor activated with tetravalent manganese ions is represented by $K_2SiF_6:Mn^{4+}$.

Item 51.

The image display device according to any one of Items 37 to 50, wherein the polarizing element-protection film has a haze of 5% or less.

Item 52.

The image display device according to any one of Items 37 to 51, wherein at least one surface of the polarizing element-protection film has a surface roughness (SRa) of 0.05 μm or less.

Item 53.

The liquid crystal display device according to any one of Items 37 to 52, wherein the polarizer comprising the polarizing element-protection film has a haze of 5% or less.

Item 54.

The liquid crystal display device according to any one of Items 37 to 53, wherein a surface of the polarizer comprising the polarizing element-protection film on a side opposite to a liquid crystal cell side has an SRa of 0.05 μm or less.

Item 55.

The liquid crystal display device according to any one of Items 37 to 54, wherein the polarizing element-protection film has an SRz of 1.0 μm or less.

Item 56.

The liquid crystal display device according to any one of Items 37 to 55, wherein a surface of the polarizer comprising the polarizing element-protection film on a side opposite to a liquid crystal cell side has an SRz of 1.0 μm or less.

Item 57.

The liquid crystal display device according to any one of Items 37 to 56, which comprises a functional layer on a surface of the polarizing element-protection film on a side opposite to a polarizing element side, and the polarizing element-protection film has a reflectance of 5% or less as measured from a functional layer side.

Item 58.

The liquid crystal display device according to any one of Items 37 to 57, wherein an angle between a slow axis in a plane of the polarizing element-protection film and an absorption axis of the polarizing element in the light-source-side polarizer or the viewing-side polarizer is 83 degrees or more and 90 degrees or less, or 0 degrees or more and 7 degrees or less, in terms of acute angle.

Item 59.

The liquid crystal display device according to any one of Items 37 to 58, wherein in either or both of the light-source-side polarizer and the viewing-side polarizer, a resin film is laminated on a surface of the polarizing element on a side opposite to a liquid crystal cell side, and any of a cured resin layer, an optical compensation layer, a tackifier layer, and a zero retardation resin film is laminated on the liquid crystal cell side of the polarizing element.

Item 60.

A method for selecting a combination of a backlight light source and a polarizer in a liquid crystal display device comprising a backlight light source, a light-source-side polarizer, a liquid crystal cell, and a viewing-side polarizer, the method comprising:

(a) selecting a backlight light source having a plurality of peak groups in the range of 600 to 650 nm in an emission spectrum; and (b) selecting a polarizer comprising a polarizing element-protection film, the polarizer being at least one of a light-source-side polarizer and a viewing-side polarizer, wherein the polarizing element-protection film has a 45-degree light source fit index (FI(45)) of 0.4 or more and 0.62 or less as determined by the following formula 1:

$$FI(45)=Wd/[Wc/(Rob(45)/Wc)] \quad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 61.

A method for selecting a combination of a backlight light source and a polarizer in a liquid crystal display device comprising a backlight light source, a light-source-side polarizer, a liquid crystal cell, and a viewing-side polarizer, the method comprising:

(a) selecting a backlight light source having a plurality of peak groups in the range of 600 to 650 nm in an emission spectrum; and (b) selecting a polarizer comprising a polarizing element-protection film, the polarizer being at least one of a light-source-side polarizer and a viewing-side polarizer, wherein values obtained by measuring a 45-degree light source fit index (FI(45)) of the polarizing element-protection film at intervals of 100 mm along a long-side direction and at intervals of 100 mm along a short-side direction are each 0.4 or more and 0.62 or less, the FI(45) being determined by the following formula 1; and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less:

$$FI(45)=Wd/[Wc/(Rob(45)/Wc)] \quad \text{formula 1}$$

Rob(45): retardation when measuring the polarizing element-protection film from a direction inclined 50 degrees from a normal direction to an in-plane direction of the film at an angle of 45 degrees from a slow-axis direction to a fast-axis direction Wd: peak-to-peak distance (nm) of the peak groups Wc: central wavelength (nm) of the peak groups.

Item 62.

The method according to Item 60 or 61, wherein the number of foreign substances having a longer diameter of 100 μm or more in the polarizing element-protection film is 1 or less.

Item 63.

The method according to any one of Items 60 to 62, wherein in the polarizing element-protection film, the amount of antimony atoms in a residue that is insoluble in a mixed solvent of parachlorophenol and tetrachloroethane is 50 mg or less per kg of a resin that forms the polarizing element-protection film.

Item 64.

The method according to any one of Items 60 to 63, wherein the polarizing element-protection film comprises an easy-to-adhere layer containing particles with a refractive index of 1.7 to 3 on at least one surface thereof.

Advantageous Effects of Invention

The present invention provides an image display device that has a wide reproduced color gamut without noticeable color unevenness even if it shows an emission spectrum with steep peaks in the red region, and an image display device in which further, no noticeable interference colors are shown when the light is off. In particular, the present invention provides a liquid crystal display device that has a wide reproduced color gamut without noticeable color unevenness (in particular, without noticeable color unevenness over the entire screen) even when a light source having an emission spectrum that has steep peaks in the red region, such as a KSF phosphor, is used as a backlight light source, and a liquid crystal display device in which further, no noticeable interference colors are shown when the light is off.

The present invention also provides an image display device that has no noticeable defects even if it is a high-definition image display device. The present invention also provides an image display device with a wide color gamut that maximizes high-clarity, vivid color reproducibility. Further, the present invention provides a display device (in particular, a large display device) that is less likely to cause color unevenness over the entire screen even when viewed from an oblique direction and provides a uniform color tone.

BRIEF DESCRIPTION OF DRAWINGS

FIG. 1 is an emission spectrum of the white LED containing $K_2SiF_6:Mn^{4+}$ as a red phosphor used in Examples.

DESCRIPTION OF EMBODIMENTS

Image Display Device In one embodiment, the image display device of the present invention is preferably an image display device in which light incident on the polarizer has a plurality of peaks (in particular, steep peaks) in the range of 600 to 650 nm.

Examples of the image display device of the present invention include, but are not limited to, liquid crystal display devices, electroluminescent (EL) display devices, micro-LEDs, and the like.

Methods for emitting light with a plurality of peaks (in particular, steep peaks) in the range of 600 to 650 nm in the image display device of the present invention include a method in which a phosphor capable of emitting light with a plurality of peaks (in particular, steep peaks), typified by a KSF phosphor (a phosphor in which Mn is added to a $K_2SiF_6$ crystal) is excited to emit light, a method in which semiconductor lasers are used in combination, and the like.

In the case of liquid crystal display devices, for example, a method in which a blue or ultraviolet LED is used to excite a red KSF phosphor to emit light as a backlight light source of white light can be used.

In the case of electroluminescent display devices, for example, the following methods can be used: a method in which a blue EL emitter is used to excite a red KSF phosphor to emit light, and it is used as a red pixel; and a method in which a blue EL emitter is used to excite a red KSF phosphor and a green phosphor to emit white light, which is then used with color filters to make pixels of each color.

In the present invention, the light emission method or drawing method is not limited. A liquid crystal display device comprising a backlight light source in which the emission spectrum of the backlight light source has a plurality of steep peaks in the red region is described in detail below as a typical example of image display devices. The following description is not limited to liquid crystal display devices unless it is specific to liquid crystal display devices.

Backlight Light Source

In the liquid crystal display device of the present invention, a backlight light source having a plurality of steep peaks in the range of 600 to 650 nm in an emission spectrum is suitably used. Here, "steep peak" means that the half width is 6 nm or less, preferably 5 nm or less, and more preferably 4 nm or less. The half width is the half width of a single peak top. If two or more peaks are close to each other and the measured light emission intensities overlaps at ½ or more of the peak tops, or if a peak overlaps with a broad peak, the half width is determined by extrapolating from the slope immediately before the overlap.

The plurality of peaks (in particular, steep peaks) may form a peak group including adjacent peaks with an interval between peak tops of 7 nm or less (one peak may be an accompanying peak of another peak). Such a peak group may consist of a single peak (also referred to as an "independent peak") or may include a peak a (e.g., an independent peak) and all peaks b (e.g., accompanying peaks) that are present at a peak-top interval of 7 nm or less from the peak a. The plurality of peaks (in particular, steep peaks) are preferably composed of a plurality of peak groups (e.g., a combination of one or more peak groups composed of an independent peak and one or more accompanying peaks, and one or more peak groups composed of only an independent peak). The methods for determining peak groups, independent peaks, and accompanying peaks are as described later.

Specific examples of the backlight light source include light sources that allow a red phosphor activated with tetravalent manganese ions to emit light by excitation light. Red phosphors activated with tetravalent manganese ions can emit red fluorescence when irradiated with excitation light. Examples of light sources used for excitation light include blue LEDs, ultraviolet LEDs, blue lasers, ultraviolet lasers, and the like, with blue LEDs being preferred. As blue LEDs, nitride-based semiconductor blue LEDs that are used in a method that allows a common yellow phosphor to emit light can be preferably used.

The red phosphor activated with tetravalent manganese ions is preferably a metal fluorine compound activated with tetravalent manganese ions. Preferred examples of phosphors include an $Mn^{4+}$-activated Mg fluorogermanate phosphor ($2.5MgO \cdot MgF_2:Mn^{4+}$) and an $M^1{}_2M^2F_6:Mn^{4+}$ (each $M^1$ is independently at least one member selected from the group consisting of Li, Na, K, Rb, and Cs; and $M^2$ is at least one member selected from the group consisting of Si, Ge, Sn, Ti, Zr, Nb, and Ta) phosphor. Specific examples thereof include $KNaMF_6:Mn^{4+}$ (M: Nb or Ta), $KRbSiF_6:Mn^{4+}$, $K_2SiF_6:Mn^{4+}$, $K_2TiF_6:Mn^{4+}$, and the like. Among these, $M^1{}_2M^2F_6:Mn^{4+}$ phosphors such as $K_2SiF_6:Mn^{4+}$, commonly referred to as "KSF," are preferred.

The backlight light source preferably comprises a green phosphor in addition to the red phosphor activated with tetravalent manganese ions. Examples of green phosphors include Eu-activated chlorosilicate phosphors, Eu-activated silicate phosphors, Eu-activated R-sialon phosphors, Eu-activated thiogallate phosphors, rare-earth aluminate phosphors, lanthanum silicon nitride-based phosphors, and the like. The green phosphor may be green quantum dot particles. Among these, Eu-activated R-sialon phosphors such as $Si_{6-z}Al_zO_zN_{8-z}$: Eu (0<z<4.2) or green quantum dot particles are preferred in terms of color reproduction range.

The backlight light source may comprise a yellow phosphor in addition to the red phosphor activated with tetravalent manganese ions. Examples of yellow phosphors include YAG phosphors such as (Y or Lu)$_3$(Al or Ga)$_5$O$_{12}$:Ce and (Y or Ce)$_3$Al$_5$O$_{12}$; and the like. White light can be emitted by using only a combination of a blue LED and a yellow phosphor; however, by combining them with a red phosphor activated with tetravalent manganese ions, the color gamut that can be reproduced can be expanded. To these backlight light sources, a green phosphor described above may be further added to adjust the color balance.

The backlight light source of the present invention is preferably a light source (white LED) in which a red phosphor or the like activated with tetravalent manganese ions is excited by a blue LED described above to emit light. However, the backlight light source of the present invention may be a combination of a light source in which light is emitted by exciting a red phosphor or the like activated with tetravalent manganese ions and a light source that uses another method, such as a combination of the above white LED and a sheet containing at least one member selected from the group consisting of green quantum dots and red quantum dots, a combination of a blue LED and a sheet containing green quantum dots and a red phosphor activated with tetravalent manganese ions, a combination of a magenta LED in which a red phosphor activated with tetravalent manganese ions is excited by an blue LED to emit light and a sheet containing green quantum dots, and a combination of the above white LED and a white LED in which a yellow phosphor is allowed to emit light, an RGB three-wavelength white LED, or the like. In the above, the green phosphors described above may also be used in place of the green quantum dots.

The light sources described above may be referred to below as a "KSF light source" as a representative term therefor.

The liquid crystal display device may be, for example, a direct-lit system in which the above light source is provided directly under a liquid crystal panel, or an edge-lit system in which the above light source is provided on a side portion and irradiation is performed through a light guide plate disposed below a liquid crystal panel.

Further, the backlight light source is preferably incorporated into a liquid crystal display device as a light source unit by combining it with a reflector, a diffuser, a prismatic plate, a lens plate, etc. In addition, a reflective polarizer may be provided between the backlight light source and the liquid crystal panel to increase luminance.

Polarizer

The liquid crystal display device of the present invention preferably comprises at least one polarizer on each of the backlight light source side (hereinafter, a backlight light source may be simply referred to as a "light source") and the viewing side of a liquid crystal cell. That is, the liquid crystal display device of the present invention preferably comprises a backlight light source, a light-source-side polarizer, a liquid crystal cell, and a viewing-side polarizer. At least one of the light-source-side polarizer and the viewing-side polarizer preferably comprises a polarizing element and at least one polarizing element-protection film, and typically, a polarizing element-protection film is laminated on at least one surface of the polarizing element.

Polarizing Element-Protection Film

The 45-degree light source fit index (FI(45)) of the polarizing element-protection film determined by the following formula 1 is preferably 0.4 or more and 0.62 or less.

$$FI(45)=Wd/[Wc/(Rob(45)/Wc)] \quad \text{formula 1}$$

In formula 1, Rob(45), Wd, and Wc are as follows:
Rob(45): retardation when measuring the polarizing element-protection film from a direction inclined 50 degrees from the normal direction to the in-plane direction of the film at an angle of 45 degrees from the slow-axis direction to the fast-axis direction
Wd: peak-to-peak distance (nm) of peak groups present in the range of 600 to 650 nm of backlight light source
Wc: central wavelength (nm) of peak groups present in the range of 600 to 650 nm of backlight light source The values obtained by measuring the 45-degree light source fit index (FI(45)), which is determined by formula 1, of the polarizing element-protection film at intervals of 100 mm along the long-side direction and at intervals of 100 mm along the short-side direction are each preferably 0.4 or more and 0.62 or less. Each of the values measured at intervals of 100 mm along the long-side direction and the values measured at intervals of 100 mm along the short-side direction may be abbreviated simply as "each value in the long-side direction and the short-side direction."

The FI(45) of the polarizing element-protection film is further preferably 0.43 or more, 0.44 or more, 0.445 or more, 0.45 or more, 0.455 or more, or 0.46 or more in this order.

The FI(45) of the polarizing element-protection film is further preferably 0.6 or less, 0.58 or less, 0.57 or less, 0.56 or less, 0.55 or less, or 0.54 or less in this order.

Each value in the long-side direction and the short-side direction of the FI(45) of the polarizing element-protection film is further preferably 0.43 or more, 0.44 or more, 0.445 or more, 0.45 or more, 0.455 or more, or 0.46 or more in this order.

Each value in the long-side direction and the short-side direction of the FI(45) of the polarizing element-protection film is further preferably 0.60 or less, 0.58 or less, 0.57 or less, 0.56 or less, 0.55 or less, or 0.54 or less in this order.

In the above and the following description, the phrase "preferably . . . in this order" means that the narrower the range of a numerical value, the more preferable.

By setting the FI(45) within the above ranges, even when a resin film with a high retardation is used as a polarizing element-protection film in a liquid crystal display device that comprises a light source with a steep emission spectrum, such as a KSF light source, as a backlight light source, effective suppression of color unevenness, which has been considered difficult to achieve, can be achieved, the image looks natural even when viewed from an oblique direction, and the image can have uniform color tone even in the corners of the screen.

Further, the value obtained by subtracting the minimum value from the maximum value of the FI(45) measured at intervals of 100 mm along the long-side direction and the value obtained by subtracting the minimum value from the maximum value of the FI(45) measured at intervals of 100 mm along the short-side direction are each preferably 0.026 or less, more preferably 0.024 or less, still more preferably 0.021 or less, particularly preferably 0.019 or less, and most preferably 0.016 or less.

The value obtained by subtracting the minimum value from the maximum value measured at intervals of 100 mm along the long-side direction and the value obtained by subtracting the minimum value from the maximum value measured at intervals of 100 mm along the short-side direction may be simply referred to as "the fluctuation in the long-side direction" and "the fluctuation in the short-side direction," respectively.

A polarizing element-protection film having such an FI(45) (in other words, a high oblique-direction retardation) may be hereinafter referred to as a "high Re polarizing element-protection film" or simply as a "high Re film."

The Wd is preferably 8 nm or more, more preferably 10 nm or more, and still more preferably 12 nm or more. The Wd is also preferably 40 nm or less, more preferably 35 nm or less, and still more preferably 30 nm or less.

The Wc is preferably 605 nm or more, more preferably 610 nm or more, and still more preferably 615 nm or more. The Wc is also preferably 645 nm or less, more preferably 640 nm or less, and still more preferably 635 nm or less.

Determination of Wd and Wc In the present invention, Wd and Wc are preferably determined by the following method. The emission spectrum of the backlight light source is measured by using a spectrophotometer at a measurement wavelength pitch of 0.5 to 1 nm. To avoid saturation of the intensity, the light volume is adjusted using a light-reducing filter etc. according to the sensitivity properties of the optical receiver.

1. Selection of Primary Peak

The peak wavelength and intensity of a peak with the highest intensity (Pmax) are read from among peaks in the range of 600 nm to 650 nm.

If there is almost no difference in intensity between adjacent wavelengths in the measurement, the middle value between the two points is defined as the peak wavelength, and a larger intensity value is used as the intensity at the peak wavelength. The phrase "almost no difference in intensity" as used here means that the intensity difference compared with the peak with the highest intensity is 10% or less.

2. Selection of Secondary Peak

Peaks with an intensity of $1/10$ or more of the Pmax intensity are selected in the range of 600 nm to 650 nm, and their wavelengths and intensities are read. In this case as well, if there is almost no difference in intensity between adjacent wavelengths, the same as that described in Item 1 above applies.

3. Correction of Intensity

The intensity values of the peaks selected in Item 2 above are each multiplied by the value of the spectral sensitivity efficiency given in Table 1: Determined value of spectral luminous efficiency $V(\lambda)$ for photopic vision in JIS Z 8785:2019 (ISO 23539:2005/CIE S 010:2004), and the resulting values are defined as corrected intensities. Since Table 1 in JIS is in increments of one nanometer, the value at a wavelength in which the peak wavelength is rounded to the nearest whole number is used as the value of spectral sensitivity efficiency.

4. Creation of Peak Group

A single peak is selected from the secondary peaks selected in Item 2. This peak is defined as peak A. In an interval between peak tops, if a peak that has a greater corrected intensity than that of peak A (this peak being defined as peak B) is present within 7 nm from peak A, then peak A is defined as an accompanying peak of peak B. If multiple peaks that have a corrected intensity greater than that of peak A are present within 7 nm from peak A, a peak that is closest to peak A is defined as peak B, and peak A is defined as an accompanying peak of peak B. (If multiple peaks have the same distance from peak A, a peak with the greatest corrected intensity is defined as peak B, and peak A as an accompanying peak of peak B.) If the peak (peak B in the above) with an accompanying peak is an accompanying peak of another peak (peak C), then these peaks (i.e., both peak A and peak B) are both defined as accompanying peaks of peak C. If no peak that has a corrected intensity greater than that of peak A is present within 7 nm from peak A, then peak A is defined as an independent peak. The primary peak is an independent peak. All of the secondary peaks are classified into either an independent peak or an accompanying peak, and an independent peak and one or more accompanying peaks of the independent peak are defined as a peak group. If no accompanying peak is present, then an independent peak alone is defined as a peak group.

5. Determination of Peak Group Intensity

The corrected intensity of each peak (independent peak or accompanying peak) of a peak group determined in Item 4 above is summed up, and the resulting value is defined as the peak group intensity.

6. Determination of Peak Wavelength of Peak Group

The peak wavelength and corrected intensity of each peak (independent peak or accompanying peak) of a peak group are multiplied by each other, the sum of the resulting values is divided by the sum of the peak intensity of each peak, and the resulting value is defined as the peak wavelength of the peak group.

The peak wavelength can be set to a value rounded to two decimal places.

7. Determination of the Peak Group-to-Peak Group Distance (Wd)

Two peak groups are selected in the order from the largest peak group intensity, and a group with larger intensity is defined as the first peak group while a group with smaller intensity is defined as the second peak group. The difference between the peak wavelength of the first peak group and the peak wavelength of the second peak group is calculated to one decimal place, which is defined as the peak group-to-peak group distance.

8. Determination of Central Wavelength (Wc)

The average value of the peak wavelength of the first peak group and the peak wavelength of the second peak group is calculated to one decimal place, which is defined as the central wavelength.

For example, the following gives specific examples in terms of the KSF light source in FIG. 1.

The wavelength of the peak with the highest intensity (Pmax) is measured to be 630.5 nm, and the intensity of the same is measured to be 1.000. The intensity at an adjacent wavelength of 631.2 nm in the measurement is measured to be 0.916; thus, the peak wavelength of a primary peak is (630.5+631.2)/2=630.85, which is rounded to the first decimal place to 630.9 nm, and the intensity is determined as 1.000.

The secondary peaks having an intensity $1/10$ or more of the Pmax intensity are as follows.

Secondary peak 1: at a peak wavelength of 608.6 nm (intensity: 0.158), this peak wavelength being the middle value between the peak wavelength of 608.2 nm (intensity: 0.153) and the peak wavelength of 608.9 nm (intensity: 0.158), Secondary peak 2: at a peak wavelength of 613.4 nm (intensity: 0.368), Secondary peak 3: at a peak wavelength of 634.9 nm (intensity: 0.698), and Secondary peak 4: at a peak wavelength of 647.5 nm (intensity: 0.195).

Each value above is multiplied by the spectral sensitivity efficiency shown in the JIS to obtain a corrected intensity as follows.

Secondary peak 1: at a peak wavelength of 608.6 nm (corrected intensity: 0.158×0.515=0.081), Secondary peak 2: at a peak wavelength of 613.4 nm (corrected intensity: 0.368×0.465=0.171), Primary peak: at a peak wavelength of 630.9 nm (corrected intensity: 1.000×0.244=0.244), Secondary peak 3: at a peak wavelength of 634.9 nm (corrected intensity: 0.698×0.217=0.151), and Secondary peak 4: at a peak wavelength of 647.5 nm (corrected intensity: 0.195×0.118=0.023).

Secondary peak 3 at a peak wavelength of 634.9 nm can be regarded as an accompanying peak of the primary peak at a peak wavelength of 630.9 nm, and these two peaks constitute a first peak group with a peak group intensity of 0.395. Secondary peak 1 at a peak wavelength of 608.6 nm can be regarded as an accompanying peak of secondary peak 2 at a peak wavelength of 613.4 nm, and these two peaks constitute a second peak group with a peak group intensity of 0.252. Secondary peak 4 at a peak wavelength of 647.5 nm is an independent peak (individually constituting a peak group) with a peak group intensity of 0.023.

The peak wavelength of the first peak group is (630.9×0.244+624.9×0.151)/(0.244+0.151)=611.86 nm.

The peak wavelength of the second peak group is (608.6×0.081+613.4×0.171)/(0.081+0.171)=632.43 nm.

The peak group-to-peak group distance (Wd) is 20.6 nm, and the central wavelength (Wc) is 622.1 nm.

From these results, in the case of a light source that uses a metal fluorine compound activated with manganese ions, typified by KSF as a red phosphor, Rob(45) of the polarizing element-protection film is preferably 7500 nm or more, and further preferably 8100 nm or more, 8280 nm or more, 8380 nm or more, 8470 nm or more, or 8650 nm or more in this order. Further, Rob(45) is preferably 11700 nm or less, and further preferably 11300 nm or less, 10900 nm or less, 10720 nm or less, 10530 nm or less, 10340 nm or less, or 10160 nm or less in this order.

In the case of a light source that uses a metal fluorine compound activated with manganese ions, typified by KSF as a red phosphor, each value in the long-side direction and short-side direction of Rob(45) of the polarizing element-protection film is preferably 7500 nm or more, and further preferably 8100 nm or more, 8280 nm or more, 8380 nm or more, 8470 nm or more, or 8650 nm or more in this order. Further, each value in the long-side direction and short-side direction of Rob(45) of the polarizing element-protection film is preferably 11700 nm or less, and further preferably 11300 nm or less, 10900 nm or less, 10720 nm or less, 10530 nm or less, 10340 nm or less, or 10160 nm or less in this order.

Additionally, the fluctuation of Rob(45) of the polarizing element-protection film in the long-side direction and short-side direction is preferably 500 nm or less, more preferably 450 nm or less, still more preferably 400 nm or less, particularly preferably 350 nm or less, and most preferably 300 nm or less.

The above describes the case of the backlight light source of a liquid crystal display device; however, the 45-degree light source fit index (FI(45)) of light incident on a polarizer of an image display device can also be determined in the same manner.

For example, the light spectrum of the backlight light source of a liquid crystal display device can be measured by taking out a backlight unit and allowing it to emit white light. For example, in an organic EL image display device, light incident on a polarizer can be measured by peeling off from the organic EL image display device the polarizer closer to the viewing side than the organic EL cell and allowing the image display device to emit white light. If the component between the backlight light source and the outermost surface of the image display device or between the image display cell, such as an organic EL cell, and the outermost surface of the image display device, has uniform transmission properties at 600 to 650 nm, then the spectrum of light emitted from the image display device can be used instead. The same applies to the 30-degree light source fit index (FI(30)) and 60-degree light source fit index (FI(60)) described below.

The review of the present inventors suggests the following reasons why color unevenness from an oblique direction can be suppressed when the retardation is within such a specific range; however, the present invention is not limited to these reasons.

First, color unevenness is assumed to occur for the following reasons.

When a high Re polarizing element-protection film is used, the polarization selectivity of reflectance occurs not only in the polarizing element and reflective polarizer, but also in interfacial reflection between the high Re polarizing element-protection film and air or other layers, providing a weak action of a polarizing element; thus, the high Re polarizing element-protection film is in the state of being sandwiched between polarizing elements.

When the polarizer is viewed from the front, the interface shows almost no action as a polarizing element; however, as the angle of viewing increases from the normal direction of the polarizer, the action of the interface as a polarizing element increases, reaching the maximum at around the Brewster's angle.

In a polarizer, a polarizing element and a high Re film are typically bonded such that the absorption axis of the polarizing element and the in-plane fast axis of the high Re film are coincident. In this case, even if the viewing angle is inclined from the front along the slow-axis direction of the high Re film, since the vibration direction of polarized light is perpendicular to the fast axis of the high Re film, linearly polarized light will not be disturbed by the high Re film and color unevenness will not occur, although the retardation of the high Re film becomes smaller. Likewise, even if the viewing angle is inclined along the fast-axis direction of the resin film, since the vibration direction of polarized light is parallel to the slow axis of the resin film, linearly polarized light will not be disturbed by the high Re film and color unevenness will not occur, although the retardation of the high Re film becomes greater.

However, if the viewing angle is inclined from the front toward a direction angled to the fast-axis direction in the film plane with respect to the slow axis of the high Re film, the shape of the refractive index ellipsoid viewed from an oblique direction of the high Re film will change as the viewing angle changes, and the slow axis and the fast axis will shift from the vibration direction of polarized light. As a result, linearly polarized light, which obliquely entered the high Re film, becomes elliptically polarized light, and due to the action of the polarizing element at the time of emission from the high Re film (or due to the action of the polarizing element at the interface), transmittance will vary depending on the state of elliptically polarized light.

Below, an angle to the fast-axis direction with respect to the slow axis in the film plane may be referred to as an "azimuthal angle," and an angle with respect to the normal direction of a film may be referred to as a "polar angle." When simply referring to an "oblique direction," it can mean that the direction is with a polar angle, irrespectively of an azimuthal angle.

Transmittance depends on the wavelength and retardation as shown in formula 4 below. If a light source has a continuous, gentle emission spectrum, like that of an LED that uses a yellow phosphor, the spectral envelope of the transmittance at each wavelength together with the original emission spectrum (the envelope of intensity of light resulting from transmission, through a polarizing element (or due to the action as a polarizing element), of an elliptically polarized light component that has passed through the resin film) has a spectral shape similar to that the original light source. However, if the emission spectrum has a steep peak, like the KSF light source, it will be difficult for the envelope to reproduce the spectral shape of the original light source. When an image is viewed, the azimuthal angle and polar angle vary in the foreground and background of the image, as well as on the left and right of the image, and the retardation varies according to the angles, whereby the state of polarization of light passed through the high Re film changes, causing color unevenness due to an angle that transmits the steep peak and an angle that blocks the steep peak.

$$T=\cos^2 \alpha - \sin 2\beta \sin 2(\beta-\alpha)\sin^2(\pi Re/\lambda) \quad \text{formula 4}$$

α: Angle between the absorption axes of two polarizers
β: Angle between the absorption axis of a polarizing element and the slow axis of a birefringent material
λ: Wavelength
T: Transmittance According to formula 4, when the retardation is in the range of thousands nanometers to tens of thousands nanometers, transmittance T will be between 0% and 100% in a repeated cycle of wavelength of a few nanometers to tens of nanometers. In terms of the KSF light source, a primary peak group is found near 630 nm and a secondary peak group is found near 610 nm, as shown in FIG. 1. If the cycle of transmittance T is such that the transmittance of either one of the primary peak group or the secondary peak group is high while the other is low, then either the primary peak group or secondary peak group is always transmitted, and the amount of change in red light is reduced, and color unevenness is less likely to be perceptible to human eyes.

As stated above, although color unevenness becomes noticeable at an azimuthal angle of about 30 to 60 degrees and at an angle exceeding 45 degrees from the normal direction, color unevenness can be suppressed if the retardation in an oblique direction in this region of the high Re polarizing element-protection film is in a suitable range.

As stated above, typically, the retardation in an oblique direction of a film with birefringent properties becomes smaller than the in-plane retardation when the viewing angle of the film is inclined toward the slow-axis direction from the front direction (normal direction), and becomes larger when the viewing angle is inclined toward the fast-axis direction. When the viewing angle is inclined at an azimuthal angle toward the fast-axis direction, the retardation will be a value in the middle of the above retardation values depending on the degree of the azimuthal angle.

It is believed that color unevenness can be effectively suppressed by setting the retardation from an oblique direction to be in a preferred range in this region where color unevenness is likely to occur.

The 30-degree light source fit index (FI(30)) determined by formula 2 below and/or the 60-degree light source fit index (FI(60)) determined by formula 3 below of the polarizing element-protection film for use in the present invention is preferably 0.35 or more and preferably 0.68 or less.

$$FI(30)=Wd/[Wc/(Rob(30)/Wc)] \quad \text{formula 2}$$

$$FI(60)=Wd/[Wc/(Rob(60)/Wc)] \quad \text{formula 3}$$

In formulas 2 and 3, Rob(30) and Rob(60) are as follows, and Wd and Wc are as described above.

Rob(30): retardation when measuring the polarizing element-protection film from a direction inclined 50 degrees from the normal direction to the in-plane direction of the film at an angle of 30 degrees from the slow-axis direction to the fast-axis direction Rob(60): retardation when measuring the polarizing element-protection film from a direction inclined 50 degrees from the normal direction to the in-plane direction of the film at an angle of 60 degrees from the slow-axis direction to the fast-axis direction Each value in the long-side direction and short-side direction of the 30-degree light source fit index (FI(30)) and/or each value in the long-side direction and short-side direction of the 60-degree light source fit index (FI(60)) of the polarizing element-protection film for use in the present invention is preferably 0.35 or more, and preferably 0.68 or less.

FI(30) and/or FI(60) of the polarizing element-protection film is further preferably 0.37 or more, 0.38 or more, 0.39 or more, or 0.4 or more in this order. FI(30) and/or FI(60) is preferably less than the value of FI(45).

FI(30) and/or FI(60) of the polarizing element-protection film is further preferably 0.65 or less, 0.63 or less, 0.62 or less, 0.61 or less, or 0.6 or less in this order. FI(30) and/or FI(60) is preferably more than the value of FI(45).

Each value in the long-side direction and short-side direction of FI(30) and/or FI(60) of the polarizing element-protection film is further preferably 0.37 or more, 0.38 or more, 0.39 or more, or 0.4 or more in this order, and is preferably less than each value in the long-side direction and short-side direction of FI(45).

Each value in the long-side direction and short-side direction of FI(30) and/or FI(60) of the polarizing element-protection film is further preferably 0.65 or less, 0.63 or less, 0.62 or less, 0.61 or less, or 0.6 or less in this order, and is preferably more than each value in the long-side direction and short-side direction of FI(45).

By setting FI(30) and FI(60) in the above ranges, color unevenness can be effectively suppressed in a wide range of regions where color unevenness is likely to occur.

In the case of a light source that uses a metal fluorine compound activated with manganese ions, typified by KSF as a red phosphor, Rob(30) and/or Rob(60) of the polarizing element-protection film is preferably 6570 nm or more or 6600 nm or more. Rob(30) is further preferably 6960 nm or more, 7150 nm or more, 7340 nm or more, or 7530 nm or more in this order. Rob(30) and/or Rob(60) is preferably less than the value of Rob(45). Rob(30) and/or Rob(60) of the polarizing element-protection film is preferably 12200 nm or less. Rob(30) and/or Rob(60) is further preferably 11900 nm or less, 11700 nm or less, 11500 nm or less, or 11300 nm or less in this order. Rob(30) and/or Rob(60) is preferably more than the value of Rob(45).

In the case of a light source that uses a metal fluorine compound activated with manganese ions, typified by KSF as a red phosphor, each value in the long-side direction and short-side direction of Rob(30) and/or Rob(60) of the polarizing element-protection film is preferably 6600 nm or more. Each value in the long-side direction and short-side direction of Rob(30) and/or Rob(60) is further preferably 6960 nm or more, 7150 nm or more, 7340 nm or more, or 7530 nm or more in this order. Each value in the long-side direction and short-side direction of Rob(30) and/or Rob(60) is preferably less than each value in the long-side direction and short-side direction of Rob(45). Each value in the long-side direction and short-side direction of Rob(30) and/or Rob(60) of the polarizing element-protection film is preferably 12200 nm or less. Each value in the long-side direction and short-side direction of Rob(30) and/or Rob(60) is further preferably 11900 nm or less, 11700 nm or less, 11500 nm or less, or 11300 nm or less in this order. Each value in the long-side direction and short-side direction of Rob(30) and/or Rob(60) is preferably more than each value in the long-side direction and short-side direction of Rob(45).

The ratio of a difference between FI(30) and FI(60) (ΔFI=FI(60)−FI(30)) to FI(45) (ΔFI/FI(45)) in the polarizing element-protection film is preferably 0.2 or more and 0.35 or less.

Each value in the long-side direction and short-side direction of ΔFI/FI(45) of the polarizing element-protection film is preferably 0.2 or more and 0.35 or less.

ΔFI/FI(45) is further preferably 0.22 or more, 0.23 or more, 0.24 or more, or 0.25 or more in this order. ΔFI/FI(45) is further preferably 0.34 or less, 0.33 or less, 0.32 or less, or 0.31 or less in this order.

Each value in the long-side direction and short-side direction of ΔFI/FI(45) is further preferably 0.22 or more, 0.23 or more, 0.24 or more, or 0.25 or more in this order. Each value in the long-side direction and short-side direction of ΔFI/FI(45) is further preferably 0.34 or less, 0.33 or less, 0.32 or less, or 0.31 or less in this order.

By setting ΔFI/FI(45) to a value equal to or more than those stated above, color unevenness can be effectively suppressed in a wide range of regions where color unevenness is likely to occur. Further, the color tone of the entire screen can be uniform. ΔFI/FI(45) can be increased by increasing the uniaxiality of the polarizing element-protection film; however, ΔFI/FI(45) is preferably a value equal to or less than those stated above in terms of ease of tearing in the slow-axis direction in the film plane and handling.

In the case of a light source that uses a metal fluorine compound activated with manganese ions, typified by KSF as a red phosphor, the difference between Rob(30) and Rob(60) (ΔRob=Rob(60)−Rob(30)) in the polarizing element-protection film is preferably 1880 nm or more or 1900 nm or more, and further preferably 2000 nm or more, 2100 nm or more, 2200 nm or more, or 2250 nm or more in this order. ΔRob of the polarizing element-protection film is preferably 3400 nm or less or 3380 nm or less, and further preferably 3300 nm or less, 3200 nm or less, 3100 nm or less, 3000 nm or less, or 2900 nm or less in this order.

In the case of a light source that uses a metal fluorine compound activated with manganese ions, typified by KSF as a red phosphor, each value in the long-side direction and short-side direction of ΔRob of the polarizing element-protection film is preferably 1900 nm or more, and further preferably 2000 nm or more, 2100 nm or more, 2200 nm or more, or 2250 nm or more in this order. Each value in the long-side direction and short-side direction of ΔRob of the polarizing element-protection film is preferably 3400 nm or less, and further preferably 3300 nm or less, 3200 nm or less, 3100 nm or less, 3000 nm or less, or 2900 nm or less in this order.

The preferred range of ΔRob/Rob(45) is the same as the range of ΔFI/FI(45).

The surface roughness (SRa) (JIS B0601:1994) of at least one surface or both surfaces of the high Re polarizing element-protection film is preferably 0.05 μm or less, more preferably 0.01 μm or less, and still more preferably 0.005 μm or less. By setting SRa to 0.05 μm or less, the film can have high transparency. SRa is preferably 0.0001 μm or more, and further preferably 0.0005 μm or more to ensure slipperiness of the film.

The ten-point average surface roughness (SRz) (JIS B0601:1994) of at least one surface or both surfaces of the high Re polarizing element-protection film is preferably 1.0 μm or less, more preferably 0.70 μm or less, still more preferably 0.50 μm or less, particularly preferably 0.30 μm or less, and most preferably 0.2 μm or less. SRz is preferably 0.001 μm or more, and more preferably 0.005 μm or more.

SRa and SRz of the light-source-side polarizer on the light-source side (the side opposite to the liquid crystal cell side) are preferably in the above ranges. The phenomenon in which the surface roughness increases is often caused by coarse particles, such as aggregated particles and catalyst residues. If the surface roughness values are equal to or below the upper limits above, it is possible to prevent coarse particles from dropping out and forming scratches on the film surface during the production or processing process of the film and after assembling a liquid crystal display device, and also prevent such scratches from serving as bright or dark spots and degrading the image quality. It is also possible to inhibit the reduction of image clarity and contrast.

Coarse particles in the film is preferably removed with a filter in the production of the resin, or by providing a filter in the production line of the film.

If the surface is an easy-to-adhere layer or any other coating layer, it is preferable, for example, to filter the coating solution with a filter after preparation of the coating solution, or perform filtration by providing a filter in the line that feeds the coating solution to the coating die.

The number of foreign substances having a longer diameter of 100 μm or more in the high Re polarizing element-protection film is preferably two or less. The foreign substances having a longer diameter of 100 μm or more in the high Re polarizing element-protection film refer to foreign substances having a longer diameter of 100 μm or more that are observed as bright spots when a polarizer for testing is disposed in a cross-Nicol arrangement on the high Re polarizing element-protection film side of a polarizer that has been cut to a size suitable for use in an image display device. Examples of foreign substances in a film include aggregates of lubricant particles. It is preferable not only to remove the aggregates with a filter with a small pore size during film formation, but also to form a film having a multilayer structure and use lubricant particles only in the surface layer of the film. It is also preferable to use lubricant particles in the easy-to-adhere coating on the surface instead of using them in the film.

Further, degraded resin materials can also serve as foreign substances in the film. Although hard foreign substances in a molten resin can be removed by the filter mentioned above, a gel-like foreign substance, which is thermally degraded molten resin, can deform to some extent at molten resin temperatures and can pass through the filter even if it is greater than the pore size of the filter. Further, when such a thermally degraded material has a large size, the number of foreign substances can instead increase by being cut with the filter. Additionally, the thermally degraded resin generated in the line after filtration will be incorporated directly in the film. These foreign substances not only cannot follow the stretching orientation of the surrounding resin during the stretching step, but also disrupt the stretching orientation of the surrounding resin and appear as bright spots when measured in a cross-Nicol state. Even small, hard foreign substances, which pass through the filter, can create space (voids) between themselves and the resin during stretching and can become foreign substances in the film. The pore size of a filter is not construed as not allowing passing through of any foreign substance with a size greater than the pore size; a certain degree of foreign substances with a size greater than the pore size undesirably pass through.

The number of foreign substances having a longer diameter of 100 μm or more in the high Re polarizing element-protection film is preferably one or less, and more preferably zero, i.e., none.

The number of foreign substances having a longer diameter of 50 μm or more in the high Re polarizing element-protection film is preferably 5 or less, more preferably 3 or less, still more preferably 1 or less, and particularly preferably 0.

Further, the number of foreign substances having a longer diameter of 20 μm or more in the high Re polarizing element-protection film is preferably 10 or less, more preferably 5 or less, still more preferably 3 or less, particularly preferably 1 or less, and most preferably 0.

In the high Re polarizing element-protection film, the presence of such foreign substances that have a color will be visible when an image is viewed closely. Even the presence of nearly colorless transparent foreign substances can result in different colors in a minute area or result in a disturbed uniformity of color tone, probably due to the difference in the refractive index between the foreign substances and the surrounding normal area. In the light-source-side polarizer, they can serve as dark spots.

In order to reduce the foreign substances described above in the film, it is preferable to minimize to the best of ability the areas at which the resin is retained in the path through which molten resin passes. Specifically, in an extruder, it is preferable to minimize to the best of ability the steps between screw elements, the steps between each block of the barrel, and the steps at each joint of piping. It is also preferable to design the piping, the filter housing, the inside the filter element, and the flow path of the die so as to reduce the retention of resin or to reduce the roughness of the internal walls thereof.

The amount of foreign substances tends to increase when the film production is initiated or when the resin extrusion amount is increased. In these cases, it is also preferable to decrease the resin extrusion amount to a specific amount after the amount is temporarily increased.

Further, it is preferable to examine defects after the film formation and take measures, such as avoiding the use of a film with a large amount of foreign substances in the production of a polarizer, or putting a marking on the defective area to avoid the use of that area for a polarizer.

The haze of the high Re polarizing element-protection film is preferably 5% or less, more preferably 3% or less, still more preferably 2% or less, and particularly preferably 1.5% or less. The lower limit of the haze is preferably 0.01% or more, and further more preferable 0.1% or more.

SRa and SRz are respectively SRa and SRz of the surface of the high Re polarizing element-protection film of the original film before formation of a functional layer, such as the low reflection layer described below; however, when an easy-to-adhere layer is formed in-line, the SRa and SRz values are of the surface of the easy-to-adhere layer. The same applies to the haze.

The haze can be measured using a turbidity meter (NHD2000, produced by Nippon Denshoku Industries Co., Ltd.) according to JIS-K7105.

The resin for use in the high Re polarizing element-protection film is not limited as long as birefringence is produced by orientation. The resin is preferably polyester, polycarbonate, polystyrene, or the like, and particularly preferably polyester, since the retardation can be increased, and the moisture permeability and absorption are low. Preferable examples of polyesters include polyethylene terephthalate (PET), polytrimethylene terephthalate (PTT), polytetramethylene terephthalate (PBT), and polyethylene naphthalate (PEN). Of these, PET and PEN are more preferred. In these polyesters, although a carboxylic acid component and/or glycol component other than the main constituent components may be copolymerized, the total amount of the carboxylic acid component and/or glycol component other than the main constituent components is preferably 10 mol % or less, more preferably 5 mol % or less, still more preferably 2 mol % or less, particularly preferably 1.5 mol % or less, and most preferably 1.2 mol % or less, based on the total amount of the carboxylic acid component and/or glycol component taken as 100 mol %. When it is equal to or less than the above, heat resistance can be increased and heat shrinkage can be reduced. The glycol component other than the main constituent components includes by-products, such as diethylene glycol. Since side reactions such as glycol dimerization cannot be completely avoided in polyester polymerization, the amount of the glycol component other than the main constituent components is preferably 0.1 mol % or more. The amount of the glycol component other than the main constituent components is most preferably in the range of 0.2 to 1 mol %.

The polyesters above easily achieve stretching at a high stretch ratio and have impact resistance, and are thus easy to handle. Further, due to low moisture permeability and low absorption, warping of liquid crystal cells caused by environmental changes is less likely to occur. The high Re polarizing element-protection film of a polyester is suitably used for large liquid crystal display devices, such as 45 inches (screen diagonal length of 45 inches) or larger, 50 inches (screen diagonal length of 50 inches) or larger, 55 inches (screen diagonal length of 55 inches) or larger, and 60 inches (screen diagonal length of 60 inches) or larger.

The thickness of the high Re polarizing element-protection film is preferably 25 to 120 μm. Since the retardation is calculated by multiplying the refractive index of the film plane by the thickness, the appropriate thickness range varies according to the resin, stretch ratio, and the like. For example, in the case of polyethylene terephthalate, the thickness is preferably 60 μm or more, and further preferably 63 μm or more, 65 μm or more, 70 μm or more, 73 μm or more, or 75 μm or more in this order. Further, the thickness is preferably 100 μm or less, and further preferably 95 μm or less, 90 μm or less, 87 μm or less, 85 μm or less, or 83 μm or less in this order. The thickness equal to or less than the above is suitable for making the thickness of image display devices thinner.

In the case of polyethylene naphthalate, the thickness is preferably 25 μm or more, and further preferably 30 μm or more, 35 μm or more, or 37 μm or more in this order, and the thickness is preferably 60 μm or less, and further preferably 55 μm or less, 50 μm or less, or 47 μm or less in this order.

These upper and lower limit values are combined in a thicker range when the stretch ratio is low and in a thinner range when the stretch ratio is high.

The thickness variation of the high Re polarizing element-protection film is preferably 6% or less, more preferably 5% or less, still more preferably 4% or less, and particularly preferably 3% or less both in the MD direction and TD direction.

The intrinsic viscosity (IV) of the resin that forms the film is preferably 0.45 to 1.5 dL/g.

In the case of PET, IV is preferably 0.5 to 1.5 dL/g. The lower limit of IV is more preferably 0.53 dL/g, and still more preferably 0.55 L/g. The upper limit of IV is more preferably 1.2 dL/g, still more preferably 1 dL/g, and particularly preferably 0.8 dL/g.

In the case of PEN, the lower limit of IV is preferably 0.45 dL/g, more preferably 0.48 dL/g, still more preferably 0.5 dL/g, and particularly preferably 0.53 dL/g. The upper limit of IV is preferably 1 dL/g, more preferably 0.8 dL/g, still more preferably 0.75 dL/g, and particularly preferably 0.7 dL/g.

By setting IV to be in the above ranges, the resulting film has excellent mechanical strength, such as impact resistance, and the production can be efficiently performed without placing a large load on the equipment.

In the polarizing element-protection film, the amount of antimony atoms in a residue that is insoluble in a mixed solvent of parachlorophenol and tetrachloroethane is preferably 50 mg or less, more preferably 30 mg or less, still more preferably 20 mg or less, particularly preferably 10 mg or less, and most preferably 5 mg or less, per kg of the resin that forms the film. The amount of antimony atoms in the residue is preferably smaller. The lower limit is preferably 0.1 mg, more preferably more than 0.5 mg, and still more preferably more than 1 mg. The polarizing element-protection film is preferably formed of a resin polymerized with an antimony compound as a catalyst, and is particularly preferably formed of polyester resin.

Examples of antimony compounds used as a catalyst include antimony trioxide, antimony pentoxide, antimony acetate, and antimony glycoxide. Preferred is antimony trioxide ($Sb_2O_3$).

In addition to such antimony compounds, it is possible to use, as a catalyst, a titanium compound catalyst, such as tetrabutoxytitanate, and an aluminum-based catalyst, such as basic aluminum acetate and a hindered phenol-containing phosphate ester (e.g., Irganox 1222), in combination.

Further, it is also preferable to add stabilizers and auxiliary agents for polymerization, and also melt-resistivity-adjusting agents. Typical examples include phosphorus compounds, such as trimethyl phosphate and phosphoric acid, magnesium compounds, such as magnesium acetate, and calcium compounds, such as calcium acetate.

In order to adjust, in the film, the amount of antimony atoms in a residue that is insoluble in the mixed solvent to be equal to or less than the above values, it is preferable to adjust, in the resin used to produce the film, the amount of antimony atoms in a residue that is insoluble in the mixed solvent to be equal to or less than the above values.

Examples of methods for adjusting, in polyester resin, the amount of antimony atoms in a residue that is insoluble in the mixed solvent to be equal to or less than the above values include the following methods, which may be used singly or in combination.

Set the amount of antimony added to polyester resin after polymerization to be preferably 300 ppm or less, more preferably 250 ppm or less, still more preferably 220 ppm or less, and particularly preferably 200 ppm or less, in terms of the amount of antimony atoms. The lower limit of the antimony amount is preferably 30 ppm, more preferably 50 ppm, and particularly preferably 80 ppm.

Add an antimony compound as a solution or slurry of ethylene glycol. The concentration of the antimony compound here is preferably 10 mass % or less, more preferably 7 mass % or less, and particularly preferably 5 mass % or less.

Set the maximum temperature for polymerization of polyester resin to be preferably 290° C. or less, and more preferably 285° C. or less.

Increase the degree of pressure reduction so that the time during which the temperature of polymerization of polyester resin is maximum is within 45 minutes, and further within 30 minutes. For continuous polymerization, the time is average retention time.

When a phosphorus compound, magnesium compound, or calcium compound is added to the polyester resin after polymerization, the amount added is as follows. The amount in terms of phosphorus atoms is preferably 15 to 120 ppm, more preferably 20 to 100 ppm, and still more preferably 25 to 80 ppm. The amount in terms of magnesium or calcium atoms is preferably 30 to 120 ppm, and more preferably 40 to 100 ppm. Furthermore, when a phosphorus compound is added after a magnesium or calcium compound is added, the addition is preferably performed in multiple stages and in divided portions.

The high Re polarizing element-protection film preferably has a light transmittance of 20% or less at a wavelength of 380 nm. The light transmittance at a wavelength of 380 nm is more preferably 15% or less, still more preferably 10% or less, and particularly preferably 5% or less. When the light transmittance is 20% or less, alteration of iodine or a dichroic pigment in the polarization layer due to ultraviolet light can be suppressed. Transmittance refers to a value measured in the direction perpendicular to the plane of the film, and can be measured with a spectrophotometer (e.g., U-3500 model, produced by Hitachi, Ltd.).

The light transmittance at a wavelength of 380 nm of the high Re polarizing element-protection film can be adjusted to 20% or less, for example, by adding an ultraviolet absorber to the film, by applying a coating solution containing an ultraviolet absorber to the surface of the film, or by suitably adjusting the type and concentration of an ultraviolet absorber, as well as the thickness of the film. The ultraviolet absorber is a known substance. Examples of ultraviolet absorbers include organic ultraviolet absorbers and inorganic ultraviolet absorbers, with organic ultraviolet absorbers being preferable from the standpoint of transparency.

Examples of organic ultraviolet absorbers include benzotriazole absorbers, benzophenone absorbers, cyclic imino ester absorbers, and combinations thereof. Organic ultraviolet absorbers are not limited to these absorbers as long as an absorber for use has an absorbance within a desirable range.

It is also preferable to add particles with an average particle size of 0.05 to 2 μm to the high Re polarizing element-protection film to improve slipperiness. Examples of the particles include inorganic particles, such as titanium dioxide, barium sulfate, calcium carbonate, calcium sulfate, silica, alumina, talc, kaolin, clay, calcium phosphate, mica, hectorite, zirconia, tungsten oxide, lithium fluoride, and calcium fluoride; and organic polymer-based particles, such as styrene-based particles, acrylic particles, melamine-based particles, benzoguanamine-based particles, and silicone-based particles.

These particles may be added to the entire film or only to the skin layer of a film formed to have a skin-core co-extruded multilayer structure. Alternatively, it is also preferable that the film itself does not contain particles, and that particles are only added to the easy-to-adhere layer described below.

When the particles are added to the resin of the film, the addition can be achieved, for example, by a method of using a starting resin that has been produced by previously adding particles, or a method of using a master batch to which particles are added at a high concentration during film formation. In either method, an increase in the number of aggregates of particles may cause, for example, a decrease in image clarity and contrast, or cause the particles to drop out as a result of an increase in surface roughness. It is preferable to remove those aggregated particles with a filter etc. during the production of a starting resin or the production of a masterbatch. Further, it is preferable to remove aggregated particles by providing a filter in the line of the molten resin during film formation. The filter used here preferably has a 95% separation particle size of 50 μm or less, more preferably 20 µm or less, particularly preferably 10 µm or less, and most preferably 5 µm or less.

The catalyst for use for polymerization of resin (in particular, polyester resin) may be a mixed catalyst etc. of an antimony compound, such as antimony trioxide, a titanium compound, such as tetrabutyl titanate, an aluminum compound, such as basic aluminum acetate, and an ester of 3,5-di-tert-butyl-4-hydroxybenzylphosphonic acid or a salt thereof, such as Irganox 1222 or Irganox 1425. The residues etc. of these catalysts can also reduce the haze or increase the surface roughness. It is thus preferable to use a resin that is produced by selecting the amounts of the catalysts and polymerization conditions suitable for each catalyst so that residues are not easily produced. Additionally, it is preferable to provide a filter having the pore size described above in the line of the molten resin during film formation. Preferable examples of the filter include sintered metal, sintered metal wire, metal mesh, and ceramic.

The high Re polarizing element-protection film can be obtained according to typical methods for producing a film. The following is an example when the film is a polyester film. In the following description of a production method, the high Re polarizing element-protection film may be referred to as a "polyester film."

For example, a polyester film can be produced by a method comprising melting a polyester resin (e.g., PET), extruding the molten resin into a sheet-like form, and stretching the thus-obtained non-oriented polyester in a sheet-like form longitudinally or transversely at a temperature equal to or higher than the glass transition temperature, followed by heat treatment.

The polarizing element-protection film may be stretched uniaxially or biaxially. However, higher biaxiality requires a greater thickness to achieve the required Rob(45). Although Rob(45) can be set to be within a suitable range by, for example, adjusting the thickness, uniaxial stretching is preferred. This is, for example, because Rob(30) and Rob(60) can be easily set to be within a suitable range, and ΔFI/FI (45) can be easily set to be a suitable range. Even when biaxial stretching is applied, higher uniaxiality is preferred.

The main orientation axis of the polarizing element-protection film may be in the running direction of the film (may be referred to as the "longitudinal direction" or "MD direction") or the direction perpendicular to the longitudinal direction (may be referred to as the "perpendicular direction" or "TD direction"). Roll stretching is preferred for MD stretching, and tenter stretching is preferred for TD stretching. In view of the formation of fewer scratches on the surface of the film, productivity, etc., and also in terms of bonding with the polarizing element obtained by stretching PVA, TD stretching with a tenter is preferred.

In stretching, an unstretched film is preheated and stretched preferably at 80 to 130° C., and more preferably 90 to 120° C. The stretch ratio in the main stretching direction is preferably 3.6-fold to 7-fold, more preferably 3.8-fold to 6.5-fold, still more preferably 4-fold to 6.2-fold, and particularly preferably 4.1-fold to 6-fold. Lower stretching temperatures and higher stretch ratios tend to increase Rob(45) and decrease ΔFI/FI(45).

To further increase uniaxiality, applying shrinkage in the direction perpendicular to the stretching direction is also preferred during stretching. When TD stretching is performed with a tenter, shrinkage can be performed, for example, by narrowing the distance between the tenter clips. Shrinkage treatment is preferably 1 to 20%, and more preferably 2 to 15%.

If biaxial stretching is performed, in order to set Rob(45), Rob(30), Rob(60), and ΔFI/FI(45) to be in suitable ranges, it is preferred to perform the stretching above as main stretching, and before the main stretching, perform stretching 1.2-fold or less, more preferably 1.15-fold or less, and particularly preferably 1.13-fold or less in the direction perpendicular to the direction of the main stretching. The lower limit of the stretch ratio in the perpendicular direction is preferably 1.01-fold, more preferably 1.03-fold, and particularly preferably 1.05-fold.

Subsequent to stretching, it is preferred to perform heat fixation. The heat fixation temperature is preferably 150 to 230° C., and more preferably 170 to 220° C. Lower heat fixation temperatures tend to make it easy to increase Rob(45) and decrease ΔFI/FI(45). However, heat shrinkage of the film tends to increase at lower heat fixation temperatures.

In heat fixation, it is also preferred to perform relaxation treatment in the main stretching direction or the direction perpendicular to the main stretching direction. The relaxation treatment is preferably 0.5 to 10%, and more preferably 1 to 5%.

The film after heat fixation is rolled up after cooling. Additional slight stretching in the main stretching direction during the cooling process is also preferably performed to provide moderate heat shrinkage and reduce warpage of the liquid crystal panel after being assembled. The additional slight stretching is performed at a film temperature of preferably 80 to 150° C. at a ratio of preferably 1 to 5%, and more preferably 1.5 to 3%.

Annealing may also be performed after film formation to adjust the heat shrinkage.

The high Re polarizing element-protection film may be subjected to corona treatment, flame treatment, plasma treatment, or the like to improve adhesion.

Since the retardation from an oblique direction is affected by the thickness of the film, it is preferable to reduce the thickness variation of the film.

The thickness variation in the TD direction of the film is preferably reduced, for example, by precisely controlling the distance between the tips of the die when extruding the molten resin in a sheet-like form, by optimizing the flow path inside the die so that the resin is extruded uniformly in the width direction from the tips of the die, or by reducing the temperature difference of the tips of the die in the width direction. It is also preferable to have a control program that measures the thickness of the film in the TD direction and feeds the results back into the distance between the tips of the die so that the fluctuation is gradual.

The thickness variation in the MD direction of the film is preferably reduced, for example, by suppressing the pulsation of the extruded resin; by improving the vibration resistance of the die, the cooling roll, and other casting equipment; or by making the point at which the resin extruded in a sheet-like form is brought into contact with the cooling roll constant by reducing the fluctuations of air pressure used for pinning or by reducing vibration of electrodes in the case of electrostatic application. These measures are preferably performed in combination.

Further, temperature fluctuations in tenter stretching cause fluctuations in the orientation of the film, which will also affect the retardation in an oblique direction. In particular, temperature fluctuations are likely to occur near the clips due to the clip temperature. The forces on the film may also vary due to the occurrence of bowing. These factors are believed to be the causes of differences in optical properties of the film in the TD direction. Taking these into consideration, it is preferable to equalize the optical properties of the film in the TD direction before being slit after tenter stretching, for example, by taking the time necessary to achieve a uniform film temperature in the width direction during preheating, by varying the shape and size of the hot air and cooling air outlets in the tenter in the width direction, by varying the air velocity in the width direction, or by providing auxiliary heating means at the ends. It is also preferable to reduce the temperature fluctuations in the tenter to reduce the fluctuations in the MD direction.

In the present invention, it is possible to use only the portion at which the optical properties fall within the above ranges in the produced long film, for example, only the center portion, by slitting. From an economic standpoint, however, the portion to be removed by slitting is preferably smaller. Furthermore, it is preferred to form a wide film and slit this film to obtain multiple films. For this purpose, it is preferred to adjust the stretching conditions so that the optical properties of the film in the width direction are uniform during tenter stretching in the production of the film. The retardation from an oblique direction tends to be higher due to fluctuations in the orientation, in addition to thickness variations of the film; thus, it is preferable to highly precisely control both of these.

Easy-to-Adhere Layer

The high Re polarizing element-protection film may be provided with an easy-to-adhere layer (an easy-to-adhere layer P1) to improve adhesion of the film to the polarizing element and improve adhesiveness to the oriented layer.

The resin for use in the easy-to-adhere layer includes polyester resin, polyurethane resin, polycarbonate resin, and acrylic resin; and the resin is preferably polyester resin, polyester polyurethane resin, polycarbonate polyurethane resin, and acrylic resin. The easy-to-adhere layer is preferably crosslinked. Crosslinking agents include isocyanate compounds, melamine compounds, epoxy resin, and oxazoline compounds. The addition of a water-soluble resin, such as polyvinyl alcohol, is also a useful means for improving adhesiveness of the film to the polarizing element.

The easy-to-adhere layer can be formed by applying an aqueous coating composition containing these resins optionally with crosslinking agents, particles, etc. onto the high Re polarizing element-protection film and drying it. Examples of particles are those described above for use in the substrate.

The easy-to-adhere layer may be formed off-line on a stretched film, but is preferably formed in-line during the film-forming step. In the case of in-line formation, the coating may be applied either before longitudinal stretching or before transverse stretching; however, it is preferred that a coating composition be applied immediately before transverse stretching and dried and cross-linked in preheating, heating, and heat treatment steps using a tenter. When in-line coating is performed with rolls immediately before longitudinal stretching, it is preferred that the film be dried with a vertical dryer after coating, and then guided to stretching rolls.

The coating amount of the easy-to-adhere layer (after drying) is preferably 0.01 to 1 g/m², and more preferably 0.03 to 0.5 g/m².

In the coating process of the easy-to-adhere layer, when the coating solution contains a large number of aggregates of particles, the haze can be reduced or the surface roughness can be increased. It is preferable to provide a filter in the line that feeds the coating solution to the coating die or in the circulation line of the coating solution to remove aggregated particles in advance. The filter for use preferably has a 95% separation particle size of 10 μm or less, more preferably 5 μm or less, and particularly preferably 2 μm or less. The filter is preferably a cartridge filter, a bag filter, or the like.

When the film is provided with the easy-to-adhere layer, interference may occur between reflected light of the interface between the easy-to-adhere layer and the original film and reflected light of the interface of the easy-to-adhere layer on the side opposite to the original film (e.g., the interface between the easy-to-adhere layer and a functional layer, an adhesive layer, or a tackifier layer), which may result in the formation of interference color in areas at which the thickness of the easy-to-adhere layer is uneven. The interference color is noticeable in the black display area and when the power is turned off. To suppress the interference color, it is preferable to reduce interference.

To reduce interference, it is preferable to adjust the refractive index of the easy-to-adhere layer to be closer to the refractive index of the original film. In the present invention, the original film can have birefringent properties. When the refractive index in the fast-axis direction of the original film is defined as nf while the refractive index in the slow-axis direction of the original film is defined as nl, the refractive index n of the easy-to-adhere layer is preferably $nf-0.05 \leq n \leq nl+0.05$, more preferably $nf-0.02 \leq n \leq nl+0.02$, and still more preferably $nf \leq n \leq nl$.

For example, when the original film is polyethylene terephthalate, the refractive index in the fast-axis direction is 1.6 and the refractive index in the slow-axis direction is about 1.7. Thus, the lower limit of the refractive index of the easy-to-adhere layer is preferably 1.55, more preferably 1.57, still more preferably 1.58, even more preferably 1.59, and particularly preferably 1.6. The upper limit of the refractive index of the easy-to-adhere layer is preferably 1.75, more preferably 1.73, still more preferably 1.72, even more preferably 1.71, and particularly preferably 1.7.

The refractive index of the easy-to-adhere layer may have birefringent properties if stretching is performed after in-line coating. In this case, the refractive index of the easy-to-adhere layer is the average of the refractive indexes in the fast-axis direction and the slow-axis direction. The refractive index of the easy-to-adhere layer can be measured, for example, by applying the coating solution of the easy-to-adhere layer to a glass plate or the like and drying it, followed by measurement with an ellipsometer etc.

In order to adjust the refractive index to be within the above ranges, it is preferable to use, for example, a method of adjusting the refractive index of the resin used for the easy-to-adhere layer, or a method of adding high-refractive-index particles.

The refractive index of resin can be increased with aromatic components. Thus, it is preferable to use a resin having a benzene ring or naphthalene ring in the main chain or a side chain, in particular, a resin having a naphthalene ring. Specifically, a polyester copolymerized with a naphthalene dicarboxylic acid is preferred. The polyester copolymerized with a naphthalene dicarboxylic acid may be blended with other resins, if necessary, for use. The use of polyester polyurethane as a polyester polyol is also possible. The naphthalene dicarboxylic acid component in the polyester is preferably 30 to 90 mol %, and more preferably 40 to 80 mol %, based on the total acid component defined as 100 mol %.

The lower limit of the refractive index of the high-refractive-index particles is preferably 1.7, and more preferably 1.75. The upper limit of the refractive index of the high-refractive-index particles is preferably 3, more preferably 2.7, and still more preferably 2.5.

The high-refractive-index particles are preferably particles containing a metal oxide with a high refractive index. Examples of such metal oxides include $TiO_2$ (refractive index: 2.7), $ZnO$ (refractive index: 2.0), $Sb_2O_3$ (refractive index: 1.9), $SnO_2$ (refractive index: 2.1), $ZrO_2$ (refractive index: 2.4), $Nb_2O_5$ (refractive index: 2.3), $CeO_2$ (refractive index: 2.2), $Ta_2O_5$ (refractive index: 2.1), $Y_2O_3$ (refractive index: 1.8), $La_2O_3$ (refractive index: 1.9), $In_2O_3$ (refractive index: 2.0), $Cr_2O_3$ (refractive index: 2.5), and composite oxides containing these metal atoms. In particular, $SnO_2$ particles, $TiO_2$ particles, $ZrO_2$ particles, and $TiO_2$—$ZrO_2$ composite particles are preferred.

The average particle size of the high-refractive-index particles is preferably 5 nm or more, more preferably 10 nm or more, still more preferably 15 nm or more, and particularly preferably 20 nm or more. An average particle size of the high-refractive-index particles of 5 nm or more is preferred to prevent aggregation.

The average particle size of the high-refractive-index particles is preferably 200 nm or less, more preferably 150 nm or less, still more preferably 100 nm or less, and particularly preferably 60 nm or less. An average particle size of the high-refractive-index particles of 200 nm or less is preferred to achieve excellent transparency.

The content of the high-refractive-index particles in the easy-to-adhere layer is preferably 2 mass % or more, more preferably 3 mass % or more, still more preferably 4 mass % or more, and particularly preferably 5 mass % or more. A content of high-refractive-index particles in the easy-to-adhere layer of 2 mass % or more is preferred to maintain the refractive index of the easy-to-adhere layer high and to effectively achieve low interference.

The content of the high-refractive-index particles in the easy-to-adhere layer is preferably 50 mass % or less, more preferably 40 mass % or less, still more preferably 30 mass % or less, and particularly preferably 20 mass % or less. A content of the high-refractive-index particles in the easy-to-adhere layer of 50 mass % or less is preferred to maintain film-forming properties.

It is preferred that the easy-to-adhere layer containing the high-refractive-index particles is laminated on at least one surface of the polarizing element-protection film. It is further preferred that the viewing-side polarizing element-protection film of the viewing-side polarizer is provided with the easy-to-adhere layer containing the high-refractive-index particles. It is particularly preferred that the viewing-side surface of the polarizing element-protection film is provided with the easy-to-adhere layer containing the high-refractive-index particles.

Functional Layer

When the high Re polarizing element-protection film is used for the viewing-side polarizer, it is also a preferable embodiment to provide functional layers, such as a hard coating layer, an anti-reflection layer, a low reflection layer, an anti-glare layer, and an antistatic layer, on the side opposite to the surface on which the polarizing element of the high Re polarizing element-protection film is laminated. In particular, since the high Re polarizing element-protection film often serves as the outermost surface on the viewing side of a liquid crystal display device, it is preferred that any one of an anti-reflection layer, a low reflection layer, and an anti-glare layer be provided. The anti-reflection layer, low reflection layer, and anti-glare layer are collectively referred to as a "reflection reduction layer." The reflection reduction layer not only prevents disturbance of viewing the screen due to reflection of external light on a liquid crystal display screen, but also reduces rainbow unevenness or makes rainbow unevenness less noticeable by suppressing reflection at the interface. In terms of the high Re polarizing element-protection film provided with the functional layer, a film before any functional layer is provided is referred to as a "substrate film." The substrate film may be provided with the easy-to-adhere layer described above.

The upper limit of the reflectance of the high Re polarizing element-protection film measured from the reflection reduction layer side is preferably 5%, more preferably 4%, still more preferably 3%, particularly preferably 2%, and most preferably 1.5%. A reflectance equal to or less than the above upper limit can suppress the reflection of external light and improve the visibility of the screen. The lower limit of the reflectance is preferably, but is not limited to, 0.01%, and more preferably 0.1% from a practical aspect.

There are various types of reflection reduction layers, such as low reflection layers, anti-reflection layers, and anti-glare layers.

Low Reflection Layer

The low reflection layer is typically a low-refractive-index layer. When provided on the surface of the substrate film, this layer has a function of reducing reflectance by reducing the difference in the refractive index when compared with that of air.

Anti-Reflection Layer

The anti-reflection layer controls reflection by controlling the thickness of the low-refractive-index layer to allow the reflected light of the interface to interfere. The low-refractive-index layer preferably has a thickness of around a value represented by the wavelength of visible light (400 to 700 mn)/(the refractive index of the low-refractive-index layer× 4).

It is also a preferable embodiment to provide a high-refractive-index layer between the anti-reflection layer and the substrate film. Two or more low-refractive-index layers and/or high-refractive-index layers may be provided to further enhance the anti-reflection effect by multiple interference. The high-refractive-index layer and the low-refractive-index layer may be collectively referred to as an "anti-reflection layer."

In the anti-reflection layer, the upper limit of reflectance is preferably 2%, more preferably 1.5%, still more preferably 1.2%, and particularly preferably 1%.

Low-Refractive-Index Layer

The refractive index of the low-refractive-index layer is preferably 1.45 or less, and more preferably 1.42 or less. The refractive index of the low-refractive-index layer is preferably 1.2 or more, and more preferably 1.25 or more. The refractive index of the low-refractive-index layer refers to a value measured at a wavelength of 589 nm.

The thickness of the low-refractive-index layer is not limited, and may be set as appropriate, typically from the range of about 30 nm to 1 μm. For use as the anti-reflection layer, the thickness of the low-refractive-index layer is preferably 70 to 120 nm, and more preferably 75 to 110 nm.

The low-refractive-index layer is preferably, for example, (1) a layer formed of a resin composition containing a binder resin and low-refractive-index particles, (2) a layer formed of a fluorine-based resin that is a low-refractive-index resin, (3) a layer formed of a fluorine-based resin composition containing silica or magnesium fluoride, or (4) a thin film of a low-refractive-index substance such as silica or magnesium fluoride.

The binder resin contained in the resin composition of (1) above may be a resin such as polyester, polyurethane, polyamide, polycarbonate, or acrylic, without particular restriction. Of these, acrylic is preferable, and those obtained by polymerizing (crosslinking) a photopolymerizable compound by light irradiation are preferable.

The photopolymerizable compound includes photopolymerizable monomers, photopolymerizable oligomers, and photopolymerizable polymers, which can be adjusted and used as appropriate. The photopolymerizable compound is preferably a combination of a photopolymerizable monomer with a photopolymerizable oligomer or photopolymerizable polymer. These photopolymerizable monomer, photopolymerizable oligomer, and photopolymerizable polymer are preferably polyfunctional.

Examples of polyfunctional monomers include pentaerythritol triacrylate (PETA), dipentaerythritol hexaacrylate (DPHA), pentaerythritol tetraacrylate (PETTA), and dipentaerythritol pentaacrylate (DPPA). Monofunctional monomers may also be used in combination to adjust the coating viscosity and hardness.

Examples of polyfunctional oligomers include polyester (meth)acrylate, urethane (meth)acrylate, polyester-urethane (meth)acrylate, polyether (meth)acrylate, polyol (meth)acrylate, melamine (meth)acrylate, isocyanurate (meth)acrylate, and epoxy (meth)acrylate.

Examples of polyfunctional polymers include urethane (meth)acrylate, isocyanurate (meth)acrylate, polyester-urethane (meth)acrylate, and epoxy (meth)acrylate.

A coating agent may contain a polymerization initiator, a catalyst for a crosslinking agent, a polymerization inhibitor, an antioxidant, an ultraviolet absorber, a leveling agent, and a surfactant, in addition to the components above.

The low-refractive-index particles contained in the resin composition of (1) above may be silica particles (e.g., hollow silica particles), magnesium fluoride particles, etc. Of these, hollow silica particles are preferable. Hollow silica particles can be made, for example, by the production method described in the Examples of JP2005-099778A.

The primary particles of the low-refractive-index particles have an average particle size of preferably 5 to 200 nm, more preferably 5 to 100 nm, and still more preferably 10 to 80 nm.

The low-refractive-index particles are more preferably those surface-treated with a silane coupling agent, and particularly preferably those surface-treated with a silane coupling agent containing (meth)acryloyl groups.

The content of the low-refractive-index particles in the low-refractive-index layer is preferably 10 to 250 parts by mass, more preferably 50 to 200 parts by mass, and still more preferably 100 to 180 parts by mass, per 100 parts by mass of the binder resin.

The fluorine-based resin for use in (2) may be a polymerizable compound having a fluorine atom at least in its molecule or a polymer of the polymerizable compound. The polymerizable compound is, although not particularly limited to, for example, preferably a polymerizable compound having a curing reactive group such as a photopolymerizable functional group or a thermosetting polar group. The polymerizable compound may be a compound having these multiple curing reactive groups at the same time. Unlike this polymerizable compound, the polymer has no such curing reactive groups.

For example, the compound having a photopolymerizable functional group for use may be selected from a wide range of fluorine-containing monomers having an ethylenically unsaturated bond.

The low-refractive-index layer preferably contain a known polysiloxane-based or fluorine-based antifouling agent as appropriate for the purpose of improving fingerprint resistance.

The surface of the low-refractive-index layer may be uneven in order to provide anti-glare properties; however, a smooth surface is also preferable.

When the low-refractive-index layer has a smooth surface, the arithmetic mean roughness SRa (JIS B0601:1994) of the surface of the low-refractive-index layer is preferably 20 nm or less, more preferably 15 nm or less, still more preferably 10 nm or less, and particularly preferably 1 to 8 nm. The 10-point average roughness Rz (JIS B0601:1994) of the surface of the low-refractive-index layer is preferably 160 nm or less, and more preferably 50 to 155 nm.

High-Refractive-Index Layer

The high-refractive-index layer has a refractive index of preferably 1.55 to 1.85, and more preferably 1.56 to 1.7. The refractive index of the high-refractive-index layer is a value measured at a wavelength of 589 nm.

The high-refractive-index layer has a thickness of preferably 30 to 200 nm, and more preferably 50 to 180 nm. Although the high-refractive-index layer may be a multilayer, the high-refractive-index layer is preferably formed of two layers or less, and more preferably a monolayer. If the high-refractive-index layer is a multilayer, the total thickness of the multiple layers is preferably within the ranges above.

If the high-refractive-index layer is formed of two layers, it is preferable to increase the refractive index of the high-refractive-index layer facing the low-refractive-index layer; specifically, the refractive index of the high-refractive-index layer facing the low-refractive-index layer is preferably 1.6 to 1.85, and the refractive index of the other high-refractive-index layer is preferably 1.55 to 1.7.

The high-refractive-index layer is preferably formed of a resin composition containing high-refractive-index particles and a resin. In particular, the high-refractive-index particles are preferably antimony pentoxide particles, zinc oxide particles, titanium oxide particles, cerium oxide particles, tin-doped indium oxide particles, antimony-doped tin oxide particles, yttrium oxide particles, zirconium oxide particles, and the like. Of these, titanium oxide particles and zirconium oxide particles are preferred.

The high-refractive-index particles for use may be a combination of two or more types of such particles. In particular, in order to prevent aggregation, it is also preferable to add first high-refractive-index particles and second high-refractive-index particles having a lower surface electric charge than the first high-refractive-index particles.

The resins for use in the high-refractive-index layer are the same as those listed for the low-refractive-index layer, except for fluorine-based resins.

To flatten the low-refractive-index layer, which is placed on the high-refractive-index layer, it is preferable that the surface of the high-refractive-index layer also be flat. The method used for flattening the surface of the high-refractive-index layer may be the same method used to flatten the low-refractive-index layer described above.

The average particle size of the low-refractive-index particles and the primary particles of the low-refractive-index particles is preferably 5 to 200 nm, more preferably 5 to 100 nm, and still more preferably 10 to 80 nm.

These particles are more preferably those surface-treated, still more preferably those surface-treated with a silane coupling agent, and particularly preferably those surface-treated with a silane coupling agent containing (meth) acryloyl groups.

The content of the low-refractive-index particles in the low-refractive-index layer is preferably 10 to 250 parts by mass, more preferably 50 to 200 parts by mass, and still more preferably 100 to 180 parts by mass, per 100 parts by mass of the binder resin.

The content of the low-refractive-index particles and the high-refractive-index particles in each layer is preferably 10 to 400 parts by mass, more preferably 30 to 250 parts by mass, still more preferably 50 to 200 parts by mass, and particularly preferably 80 to 180 parts by mass, per 100 parts by mass of the resin The high-refractive-index layer and the low-refractive-index layer can be formed, for example, by applying a resin composition containing a photopolymerizable compound to a substrate film, drying the composition, and then irradiating the resin composition in a film form with light such as ultraviolet light to polymerize (crosslink) the photopolymerizable compound.

The resin compositions of the high-refractive-index layer and the low-refractive-index layer may optionally contain a thermoplastic resin, a thermosetting resin, a solvent, a polymerization initiator, a dispersant, a surfactant, an antistatic agent, a silane coupling agent, a thickening agent, an anti-coloring agent, a coloring agent (pigments and dyes), an antifoaming agent, a leveling agent, a flame retardant, an ultraviolet absorber, an adhesion-imparting agent, a polymerization inhibitor, an antioxidant, a surface modifier, and a lubricant.

Anti-Glare Layer

Due to the unevenness provided on the surface to cause diffused reflection, the anti-glare layer prevents the reflection of the shape of the light source and reduces glare when external light is reflected on the surface.

The arithmetic mean roughness (SRa) of the surface unevenness of the anti-glare layer is preferably 0.02 to 0.25 µm, more preferably 0.02 to 0.15 µm, and still more preferably 0.02 to 0.12 µm.

The 10-point average roughness (Rzjis) of the surface unevenness of the anti-glare layer is preferably 0.15 to 2 µm, more preferably 0.20 to 1.2 µm, and still more preferably 0.3 to 0.8 µm.

SRa and Rzjis are calculated from the roughness curve measured with a contact roughness meter in accordance with JIS B0601-1994 or JIS B0601-2001.

For example, the following methods may be used to form the anti-glare layer on the substrate film.

Apply an anti-glare-layer coating composition containing particles (filler) etc.

Cure an anti-glare-layer resin with the resin in contact with a mold having an uneven structure.

Apply an anti-glare-layer resin to a mold having an uneven structure and transfer it onto a substrate film.

Apply a coating composition that undergoes spinodal decomposition during drying and film formation.

The lower limit of the thickness of the anti-glare layer is preferably 0.1 µm, and more preferably 0.5 µm. The upper limit of the thickness of the anti-glare layer is preferably 100 µm, more preferably 50 µm, and still more preferably 20 µm.

The refractive index of the anti-glare layer is preferably 1.20 to 1.80, and more preferably 1.40 to 1.70. The refractive index of the anti-glare layer refers to a value measured at a wavelength of 589 nm.

The low-refractive-index layer may be provided with unevenness to form an anti-glare low reflection layer, or the low-refractive-index layer may be provided on an uneven portion of the surface of the hard coating layer or high-refractive-index layer to impart anti-reflection functionality so as to form an anti-glare anti-reflection layer.

Hard Coating Layer

It is also a preferable embodiment to provide a hard coating layer as a lower layer of the reflection reduction layer described above. The hard coating layer has a pencil hardness of preferably H or more, and more preferably 2H or more. The hard coating layer can be provided, for example, by applying and curing a composition solution of a thermosetting resin or a radiation-curable resin.

Thermosetting resins include acrylic resins, urethane resins, phenol resins, urea-melamine resins, epoxy resins, unsaturated polyester resins, silicone resins, and combinations thereof. Thermosetting resin compositions optionally contain a curing agent in addition to these curable resins.

The radiation-curable resin is preferably a compound having a radiation-curable functional group. Radiation-curable functional groups include ethylenically unsaturated bond groups such as a (meth)acryloyl group, a vinyl group, and an allyl group; an epoxy group; and an oxetanyl group. Of these, a compound having an ethylenically unsaturated bond group is preferable as an ionizing radiation-curable compound, and a compound having two or more ethylenically unsaturated bond groups is more preferable. In particular, a polyfunctional (meth)acrylate compound having two or more ethylenically unsaturated bond groups is still more preferable. The polyfunctional (meth)acrylate compound may be a monomer, an oligomer, or a polymer.

Specific examples of these include those listed above as a binder resin. To achieve hardness as a hard coating, the compound having a radiation-curable functional group contains a bifunctional or higher functional monomer in an amount of preferably 50 mass % or more, and more preferably 70 mass % or more. Additionally, the compound having a radiation-curable functional group contains a trifunctional or higher functional monomer in an amount of preferably 50 mass % or more, and more preferably 70 mass % or more. The compound having a radiation-curable functional group can be used alone or in a combination of two or more.

The hard coating layer has a thickness of preferably 0.1 to 100 µm, and more preferably 0.8 to 20 µm.

The hard coating layer has a refractive index of more preferably 1.45 to 1.7, and still more preferably 1.5 to 1.6. The refractive index of the hard coating layer refers to a value measured at a wavelength of 589 nm.

To adjust the refractive index of the hard coating layer, the refractive index of the resin can be adjusted; or if particles are added, the refractive index of the particles can be adjusted. The particles are, for example, those listed as examples of particles for the anti-glare layer. In the present invention, the reflection reduction layer, including the hard coating layer, may also be referred to as a "reflection reduction layer."

When the functional layer is provided, the easy-to-adhere layer (an easy-to-adhere layer P2) may be provided between the functional layer and the substrate. The resins, crosslinking agents, etc. listed above for the easy-to-adhere layer P1 may be suitably used for the easy-to-adhere layer P2. The easy-to-adhere layer P1 and the easy-to-adhere layer P2 may have the same or different formulations.

The easy-to-adhere layer P2 is also preferably formed in-line. Although the easy-to-adhere layer P1 and the easyto-adhere layer P2 may be coated and dried sequentially, it is also a preferable embodiment to simultaneous perform coating of these layers on both surfaces.

If the high Re polarizing element-protection film is used for the light-source-side polarizer, the provision of the functional layer is not necessarily required although the functional layer may be laminated. In particular, it is also preferable to provide a hard coating layer on the side opposite to the side on which the polarizing element is laminated to prevent scratches caused by contact with the diffuser, prismatic plate, lens plate, reflective polarizer, etc. of the light source unit. It is also preferable to provide a reflection reduction layer or anti-reflection layer to more effectively transmit light from the light source and also further suppress color unevenness by reducing reflectance. The reflection reduction layer or anti-reflection layer is preferably provided on the side opposite to the side on which the polarizing element is laminated.

If the high Re polarizing element-protection film is used for the light-source-side polarizer, and the functional layer is provided on the side opposite to the side on which the polarizing element of the high Re polarizing element-protection film is laminated, the outermost surface of the functional layer preferably satisfies the above values of surface roughness SRa and SRz. By satisfying the above surface roughness values, scratching on the surface of the films of the light source unit and the functional layer can be prevented, and deterioration of image quality due to long-term use can be prevented, while maintaining excellent slipperiness with various film surfaces of the light source unit of the liquid crystal display device.

If the high Re polarizing element-protection film is provided with a functional layer other than the anti-glare layer, the upper limit values of SRa and SRz on the outermost surface of the functional layer are preferably the same as the upper limit values of SRa and SRz of the polarizing element-protection film described above, respectively. The lower limit values of SRa and SRz on the outermost surface of the functional layer are also preferably the same as the lower limit values of SRa and SRz of the polarizing element-protection film described above, respectively.

Polarizing Element

Examples of the polarizing element include, but are not limited to, polarizing elements formed by adsorbing iodine or an organic dichroic pigment on uniaxially stretched polyvinyl alcohol (PVA); liquid-crystal polarizing elements formed by a liquid-crystal compound and an oriented organic dichroic pigment or a liquid-crystal dichroic pigment; and wire grid polarizing elements.

A film-shaped polarizing element formed by adsorbing either iodine or an organic dichroic pigment on an uniaxially stretched polyvinyl alcohol (PVA) and a polarizing element-protection film wound in a roll form can be bonded together by using an adhesive, such as a PVA-based adhesive or an UV-curable adhesive, or a tackifier; and then rolled up. This type of polarizing element preferably has a thickness of 5 to 30 μm, more preferably 8 to 25 μm, and particularly preferably 10 to 20 μm. The thickness of the adhesive or the tackifier is preferably 1 to 10 μm, and more preferably 2 to 5 μm.

Other examples of preferable polarizing elements for use include a polarizing element obtained by application of PVA to an unstretched substrate, such as PET or polypropylene and uniaxial stretching with the substrate to adsorb iodine or an organic dichroic pigment on the PVA-coated substrate. When this polarizing element is used, a polarizing element-protection film and the polarizing element can be bonded together by bonding the polarizing surface of the polarizing element laminated on a substrate (the surface on which the substrate is not formed) and the polarizing element-protection film together with an adhesive or tackifier, and then peeling off the substrate used in preparing the polarizing element. In this case as well, it is preferable to bond the polarizing element-protection film and the polarizing element together in roll form and roll up the resulting polarizing element coated with the protection film. This type of polarizing element preferably has a thickness of 1 to 10 μm, more preferably 2 to 8 μm, and particularly preferably 3 to 6 μm. The thickness of the adhesive or the tackifier is preferably 1 to 10 μm, and more preferably 2 to 5 μm.

When a liquid-crystal polarizing element is used, an oriented polarizing element comprising a liquid-crystal compound and an organic dichroic pigment on a polarizing element-protection film is laminated, or a coating solution containing a liquid-crystal dichroic pigment is applied to a polarizing element-protection film, then the coated film is dried and cured with light or heat to laminate a polarizing element, thus forming a polarizer. The method for orienting the liquid-crystal polarizing element includes a method in which the surface of an object to be coated is subjected to rubbing; and a method in which a liquid-crystal polarizing element is irradiated with polarized UV light for curing while the liquid-crystal polarizing element is oriented. The surface of the polarizing element-protection film may be directly subjected to rubbing and then have a coating solution applied; or a coating solution may be directly applied to the polarizing element-protection film, and then the polarizing element-protection film coated with the coating solution may be irradiated with polarized UV light. Another preferable method is providing an oriented layer on a polarizing element-protection film before providing a liquid-crystal polarizing element (i.e., laminating a liquid-crystal polarizing element on the polarizing element-protection film via an oriented layer). Examples of the method for providing the oriented layer include the following:

- a method in which polyvinyl alcohol or a polyvinyl alcohol derivative, polyimide or a polyimide derivative, acrylic resin, a polysiloxane derivative, or the like is applied, and the surface is subjected to rubbing to form an oriented layer (rubbing-oriented layer); and
- a method in which a coating solution containing a polymer or monomer having a photo-reactive group, such as a cinnamoyl group and a chalcone group, and a solvent is applied, and the coated surface is irradiated with polarized UV light to orient and cure the coating, thereby forming an oriented layer (photo-oriented layer).

Alternatively, after a liquid-crystal polarizing element is provided on a releasable film according to the method described above and a liquid-crystal polarizing element surface and a polarizing element film are bonded together with an adhesive or tackifier, the releasable film can be peeled off to thereby bond the polarizing element film and the polarizing element together.

The liquid-crystal polarizing element preferably has a thickness of 0.1 to 7 μm, more preferably 0.3 to 5 μm, and particularly preferably 0.5 to 3 μm. The thickness of the adhesive or tackifier is preferably 1 to 10 μm, and more preferably 2 to 5 μm.

Lamination of Polarizing Element and Polarizing Element-Protection Film

The high Re polarizing element-protection film is preferably laminated on a surface of the polarizing element on the side opposite to the cell side. When the polarizing element and the high Re polarizing element-protection film are laminated to form a polarizer, the angle between the absorption axis of the polarizing element and the slow axis of the high Re polarizing element-protection film is preferably 90 degrees±7 degrees or less. The phrase "or less" of "90 degrees±7 degrees or less" only modifies the numeral after ±. The angle thus means the range of 83 to 97 degrees. The same applies to the phrase "or less" used hereinafter in this context. The angle means 83 degrees or more and 90 degrees or less in terms of acute angle. The angle between the absorption axis of the polarizer and the slow axis of the high Re polarizing element-protection film is more preferably 90 degrees±5 degrees or less, more preferably 90 degrees±3 degrees or less, particularly preferably 90 degrees±2 degrees or less, and most preferably 90 degrees±1.5 degrees or less. The entire range of the polarizer preferably has the above angle. The angle between the absorption axis of the polarizing element and the slow axis of the high Re polarizing element-protection film is preferably 0 degrees±7 degrees or less. The phrase "or less" of "0 degrees±7 degrees or less" only modifies the numeral after ±. The angle thus means −7 to 7 degrees. The same applies hereinafter. The angle means 0 degrees or more and 7 degrees or less in terms of the acute angle. The angle between the absorption axis of the polarizing element and the slow axis of the high Re polarizing element-protection film is more preferably 0 degrees±5 degrees or less, more preferably 0 degrees±3 degrees or less, particularly preferably 0 degrees±2 degrees or less, most preferably 0 degrees±1.5 degrees or less. The entire range of the polarizer preferably has the above angle.

From an industrial production standpoint, the angle between the absorption axis of the polarizing element and the slow axis of the high Re polarizing element-protection film is preferably approximately vertical (90 degrees±7 degrees or less) When the angle between the absorption axis of the polarizing element and the slow axis of the high Re polarizing element-protection film is approximately vertical, the vibration direction of the polarized light transmitted through the polarizing element is the direction of the slow axis (high refractive index) of the polarizing element-protection film. The adaptation of the present invention is also effective in terms of likelihood of reflection at the interface of the polarizing element-protection film.

When a resin film with birefringent properties is used as a polarizing element-protection film to form a KSF light source, color unevenness is likely to be observed from a specific direction. As described above, the present invention encompasses a technique by which retardation of the film when observed from this specific direction is adjusted to be within a range where color unevenness is not easily visible. It is thought that by setting the deviation of the angle between the absorption axis of the polarizing element and the slow axis of the polarizing element-protection film within a specific range, the direction in which color unevenness is likely to appear and the retardation range in which color unevenness is difficult to see on the film can be precisely matched, and the occurrence of color unevenness can be thereby more highly controlled.

When the angle between the absorption axis of the polarizing element and the slow axis of the polarizing element-protection film is set within the above range, the occurrence of color unevenness can also be prevented when the polarizing element is observed obliquely from the normal direction toward the direction of the absorption axis of the polarizing element or the direction orthogonal to the absorption axis. When the angle between the absorption axis of the polarizing element and the slow axis of the polarizing element-protection film is exactly 0 or 90 degrees, even if observation is made obliquely in the direction of the absorption axis of the polarizing element or the direction orthogonal to the absorption axis, the vibration direction of polarized light is at 0 or 90 degrees relative to the slow axis of the high Re film, and linearly polarized light is not disturbed. However, when the angle between the absorption axis of the polarizing element and the slow axis of the polarizing element-protection film deviates beyond the above range, linearly polarized light is disturbed to form elliptically polarized light, thus possibly resulting in observation of color unevenness.

When the polarizing element-protection film is a high Re film with a retardation of, for example, more than 8000 nm and a conventional yellow phosphor is used as a light source and if the angle between the absorption axis of the polarizing element and the slow axis of the polarizing element-protection film significantly deviates from 0 or 90 degrees, color unevenness has been observed due to the effect of outside light, such as fluorescent lamps.

On the other hand, color unevenness controlled by adjusting the angle between the absorption axis of the polarizing element and the slow axis of the polarizing element-protection film in the present invention as described above is color unevenness generated due to the KSF light source itself.

The color unevenness controlled by the present invention is considered to require more sophisticated adjustment for the following reasons.

Color unevenness caused by a high-intensity backlight light source is more noticeable than color unevenness caused by room light.

In liquid crystal display devices using a KSF light source, color unevenness is more noticeable due to their excellent color reproducibility.

Liquid crystal display devices using a KSF light source are preferably used for large liquid crystal display devices. Liquid crystal display devices with such a high image quality and a large size are often used for screening in home theaters, museums, etc. In this case, color unevenness derived from the backlight light source is more noticeable with a darker room light.

Indoor lighting has also shifted from fluorescent lamps to white LED lighting using yellow phosphor, and rainbow unevenness originating from KSF light sources is noticeable.

In general, in the production of a polarizer, a polarizing element is laminated on a long polarizing element-protection film to produce a long polarizer, and the obtained long polarizer is cut to a required width and length and used for an image display device. Accordingly, in order to control optical properties of the polarizing element-protection film used for the polarizer of an image display device and fluctuation of these properties to be within the ranges described above, it is preferable to use, as the polarizer of an image display device, a long polarizer having a polarizing element-protection film with these optical properties in the TD direction within the required ranges and within the fluctuation range as described above. For this purpose, when a long polarizer is to be produced, first, a film having these optical properties in the TD direction of the film within the required ranges as described above is preferably used as a polarizing element-protection film. With respect to the MD direction, it is preferable to use a film having a thickness variation within the range described above over the entire length of the long polarizing element-protection film. In this measurement, since it is difficult to measure the thickness at intervals of 100 mm over the entire length in the MD direction, thickness variation in the MD direction determined based on data measured at wider intervals, such as on-line thickness measurement data, may be used.

The long polarizer and the long polarizing element-protection film preferably have a width of 400 to 3000 mm, more preferably 500 to 2500 mm, and even more preferably 600 mm to 2200 mm. The long polarizer and the polarizing element-protection film preferably have a length of 100 to 10000 m, more preferably 300 to 7000 m, and even more preferably 500 to 5000 m.

Surface of the Polarizing Element on the Liquid Crystal Cell Side

The surface of the polarizing element on the liquid crystal cell side may be directly bonded to the liquid crystal cell with an adhesive or a tackifier. A cured layer may be provided on the polarizing element, or a polarizing element-protection film that is different from the high Re polarizing element-protection film described above may be provided.

A preferred cured layer is, for example, the hard coating layer described above.

The polarizing element-protection film on a surface on the liquid crystal cell side of the polarizer includes cellulose-based (TAC) films, acrylic films, and polycyclic olefin (COP) films. The polarizing element-protection film on the liquid-crystal-cell-side surface may be a film with almost zero retardation, or may be a retardation film, which is called an optical compensation film for controlling color tone changes when a display screen is viewed from an oblique direction.

To produce the required retardation with an optical compensation film, for example, a method of stretching the film, a method of forming a retardation layer of, for example, a liquid crystal compound, on the film, a method for separately forming a retardation layer of, for example, a liquid crystal compound, on a release film and then transferring the layer, and like methods can be used. Examples of the liquid crystal compound used to form a retardation layer include rod-shaped liquid crystal compounds and discotic liquid crystal compounds, which are used according to the required retardation characteristics. In order to fix the oriented state, the liquid crystal compound preferably has a light-curing reactive group, such as a double bond. In order to orient the liquid crystal compound and impart retardation, an oriented layer is provided as a lower layer of the retardation layer, and the oriented layer is subjected to rubbing or irradiated with polarized ultraviolet light to thereby impart orientation control to orient the liquid crystal compound to be applied thereon in a specific direction.

The retardation of the optical compensation film can be appropriately set according to the type of liquid crystal cell to be used, the degree of viewing angle to be secured, and other factors.

The retardation layer can be formed by applying a coating composition for retardation layers. The coating composition for retardation layers may contain a solvent, a polymerization initiator, a sensitizer, a polymerization inhibitor, a leveling agent, a polymerizable non-liquid-crystal compound, a crosslinking agent, and the like. Such additives can be the same as those explained in the description of the orientation control layer and the liquid-crystal polarizing element.

The coating composition for retardation layers is applied to the release surface of a releasable film or on an orientation control layer; then dried, heated, and cured to thereby form a retardation layer.

Preferable conditions for these steps are also the same as the conditions explained in the description of the orientation control layer and the liquid-crystal polarizing element.

When the polarizing element and the polarizing element-protection film or the retardation film are bonded together, an adhesive or a tackifier is used. The adhesive is preferably an aqueous adhesive, such as polyvinyl alcohol-based adhesives or light-curing adhesives. Examples of light-curing adhesives include acrylic adhesives and epoxy adhesives. Examples of preferable tackifiers include acrylic tackifiers.

The optical compensation film, the retardation film, and the retardation layer described above are collectively referred to as the optical compensation layer.

If the polarizer is a circular polarizer used for anti-reflection in, for example, electroluminescent display devices, a $\lambda/4$ retardation layer is provided on the image display cell surface of the polarizing element. The $\lambda/4$ retardation layer can be provided in the same manner as the optical compensation layer described above. The $\lambda/4$ retardation layer may be a composite $\lambda/4$ retardation layer comprising a combination of a $\lambda/4$ retardation layer and a $\lambda/2$ retardation layer.

Except for the case of having an anti-glare layer, the polarizer preferably has a haze of 5% or less, more preferably 3% or less, even more preferably 2% or less, and particularly preferably 1.5% or less. The lower limit of the haze is preferably 0.01% or more, and more preferably 0.1% or more.

Liquid Crystal Cells

The liquid crystal cell is a liquid crystal compound sealed by a thin substrate, such as glass, on which a circuit is formed. When the substrate is glass, the thickness is preferably 1 mm or less. From the viewpoint of thinness, the thickness is more preferably 0.7 mm or less, even more preferably 0.5 mm or less, and particularly preferably 0.4 mm or less.

The liquid crystal cell system is not limited. VA mode liquid crystal cells and IPS mode liquid crystal cells are systems preferable for application to the present invention because such mode liquid crystal cells have less color shift when viewed from the oblique direction, and the absorption axis of the polarizer is parallel or orthogonal to the long-side direction of the liquid crystal cell.

The color filter incorporated into a liquid crystal cell preferably has both a minimum transmittance and a maximum transmittance in the wavelength range of 420 nm to 460 nm for blue pixels of 80% or more, and more preferably 85% or more. The difference between the maximum transmittance and the minimum transmittance in the wavelength range of 420 nm to 460 nm is preferably 4% or less, and more preferably 3% or less.

Liquid Crystal Panel

Preferably, polarizers are individually bonded to the viewing side and the light-source side of the liquid crystal cell to form a liquid crystal display panel. The bonding is preferably done by using a tackifier. The tackifier is preferably an acrylic tackifier.

In the liquid crystal panel, the polarizer comprising the high Re polarizing element-protection film may be either a light-source-side polarizer or a viewing-side polarizer, or both.

In particular, for example, when a film having an in-plane retardation in the range of 3000 to 30000 nm is used as the light-source-side polarizing element-protection film of the light-source-side polarizer, light passing through the polarizing element-protection film is acted upon by the polarizing element, and the light incident on the high Re polarizing element-protection film is linearly polarized light due to the light passing through the reflective polarizer; therefore, when the film is combined with a KSF light source, color unevenness is likely to occur. Accordingly, it is preferable to use a polarizer comprising the high Re polarizing element-protection film described above as a light-source-side polarizer.

When a polarizer comprising the high Re polarizing element-protection film is used only for the light-source-side polarizer, the viewing-side polarizer may have a polarizing element-protection film with other characteristics formed on a surface opposite to the cell side. Examples of the polarizing element-protection film with other properties include resin films having birefringent properties with an in-plane retardation of 1500 to 30000 nm, TAC films, acrylic films, COP films, and like zero retardation films. Preferable examples of resin films having birefringent properties are resins mentioned as examples in the description of the high Re polarizing element-protection film. Other examples include resin films with an in-plane retardation of preferably 200 nm or less, and more preferably 150 nm or less, which are formed by using a resin having birefringent properties, such as PET. A polarizing element-protection film having other properties is also preferably provided with a functional layer described above. In particular, when a resin film having birefringent properties with an in-plane retardation of 1500 to 30000 nm is used, the color unevenness originating from the polarizing element-protection film of the viewing-side polarizer can be reduced by providing an anti-reflection layer or a low reflection layer.

In this case, the polarizing element of the viewing-side polarizer, the surface of the polarizing element on the liquid crystal cell side, the adhesive, the tackifier, etc. are the same as those explained in the description of the polarizer comprising the high Re polarizing element-protection film.

When a resin film having birefringent properties with an in-plane retardation of 1500 to 30000 nm is used, the angle between the slow axis of the resin film having birefringent properties and the absorption axis of the polarizing element is preferably about 0 degrees (0 degrees±7 degrees) or about 90 degrees (90 degrees±7 degrees). When the angle is about 90 degrees, the in-plane retardation is preferably 3000 nm or more, more preferably 4500 nm or more, even more preferably 6000 nm or more, and particularly preferably 7000 nm or more. The upper limit of in-plane retardation is preferably 12000 nm. Such a film can be produced, for example, by stretching a polyester, such as PET, 3- to 6-fold in the TD direction with a tenter or the like.

When the angle is set to about 0 degrees, the in-plane retardation is preferably 9000 nm or less, more preferably 8000 nm or less, even more preferably 7000 nm or less, and particularly preferably 6000 nm or less. Such a film can be produced, for example, by stretching a polyester, such as PET, 3- to 6-fold in the MD direction between rolls with different peripheral speeds.

The resin film with birefringent properties preferably has an Re/Rth ratio in the range of 0.6 to 1.2, and more preferably 0.7 to 1.

When a polarizer comprising the high Re polarizing element-protection film is used only for the viewing-side polarizer, the polarizing element-protection film formed on a surface of the light-source-side polarizer on a side opposite to the cell side is preferably a zero-retardation film, such as TAC film, acrylic film, or COP film. The zero-retardation film preferably has an in-plane retardation of 50 nm or less.

In general, the viewing-side polarizer has a vertical transmission axis so that the image display device can be recognized even if the image is viewed through polarized sunglasses. As a result, the light-source-side polarizer has a horizontal transmission axis. In a polarizer comprising a PVA-stretched polarizing element and a polyester high Re polarizing element-protection film, the transmission axis of the polarizing element is roughly parallel to the slow axis of the polarizing element-protection film; therefore, the viewing-side polarizer has a vertical slow axis, whereas the light-source-side polarizer has a horizontal slow axis.

Further, image display devices are often rectangular and are installed with the long-side direction being horizontal. Therefore, when viewed from the long-side direction, the image is viewed from a more oblique angle, and color unevenness from this direction is preferably reduced more.

Accordingly, in a rectangular liquid crystal display device installed with the long-side direction being horizontal, FI(45), FI(30), and FI(60) of the high Re polarizing element-protection film of the light-source-side polarizer are preferably set to high ranges within the preferable ranges described above.

When the polarizer comprising the high Re polarizing element-protection film is used for both the light-source-side polarizer and the viewing-side polarizer, properties of the high Re polarizing element-protection film of each polarizer can be the same or different as long as the properties fall within the specified ranges. When the properties of the high Re polarizing element-protection films of the polarizers are different, FI(45), FI(30) and FI(60) of the high polarizing element-protection film of the light-source-side polarizer are preferably set higher than those of the high polarizing element-protection film of the viewing-side polarizer.

The polarizing element of the viewing-side polarizer, the surface of the polarizing element on the liquid crystal cell side, the adhesive, the tackifier, etc. may also be the same or different.

The liquid crystal display device of the present invention may have touch panel functions incorporated therein. Examples of the method for incorporating touch panel functions into the liquid crystal display device include a method of providing a separate touch sensor on the viewing side of the liquid crystal cell; a method of forming an in-cell liquid crystal display device or an on-cell liquid crystal display device by providing an electrode as a touch sensor on the substrate of the liquid crystal cell; and a method of providing an electrode as a touch sensor on the surface cover sheet.

Examples

The present invention is described below more specifically with reference to Examples. However, the present invention is not limited by the following Examples. The present invention can be appropriately modified and carried out as long as the modification does not deviate from the gist of the present invention. All of such modifications are included within the technical scope of the present invention. The methods for evaluating physical properties etc. in the following Examples are as follows.

(1) Light Source Spectrum

A liquid crystal panel was removed from a liquid crystal display device. Using a multichannel spectrophotometer PMA-12 (C10027-01) produced by Hamamatsu Photonics, K.K., the center portion of the light source unit comprising a diffuser and a luminance-enhancing film was measured at a polar angle of 0 degrees at a position about 5 mm away from the light source unit. In the measurement, an ND-8 filter was used for adjusting the amount of light. The measurement pitch was about 0.75 nm.

(2A) Retardation from Oblique Direction

OPTIPRO-STD produced by Shintech Co., Ltd. was used as a measuring device. A sample of 40 mm in the fast-axis direction and 60 mm in the slow-axis direction was continuously cut out from the center portion of the film to prepare several sheets of samples. Each sample was set on the sample stage in such a manner that the slow-axis direction was almost parallel to the X direction of the measurement stage. Measurement was performed under the following conditions.

Axis definition
Slow axis: 0 deg
Axis search: ON
Output data: Retardation
Wavelength: Monochromatic light 589 nm
Sample stage
Incident angle: START-0 deg/END-50 deg/STEP-5 deg
Slow axis (direction of azimuthal angle to measure): START-30 deg/END-60 deg/STEP-5 deg Among the calculated measurement values, the values at a polar angle of 50 degrees and at azimuthal angles of 30 degrees, 45 degrees, and 60 degrees were taken as measurement values of each sample. The average values of the three sample measurements were defined as Rob(30), Rob(45), and Rob(60) of the film. Since the measurement value of each sample may have an error value due to ripple noise, it was confirmed whether or not the data were smoothly changing with respect to changes in the polar angle and azimuthal angle around the adopted polar angle and azimuthal angle. When the changes were not smooth, the same sample was applied again and re-measured, or the sample was replaced with another sample and the measurement was performed again, and the average of the three samples that were measured normally was used as the average value. When the sample was changed, the sample for re-measurement was cut out from the portion of the film adjacent in the fast-axis direction to the portion cut out for the original sample.

(2B) Retardation from Oblique Direction

OPTIPRO-STD produced by Shintech Co., Ltd. was used as a measuring device. Each sample was cut out to a size of 40 mm in the fast-axis direction and 60 mm in the slow-axis direction and set on the measurement stage in such a manner that the slow-axis direction was almost parallel to the X direction of the sample stage. Measurement was performed under the following conditions.

Axis definition
Slow axis: 0°
Axis search: ON
Output data: Retardation
Wavelength: Monochromatic light 589 nm
Sample stage
Incident angle: START-0 deg/END-50 deg/STEP-5 deg
Slow axis (direction of azimuthal angle to measure): START-30 deg/END-60 deg/STEP-5 deg Among the calculated measurement values, the values at a polar angle of 50 degrees and at azimuthal angles of 30 degrees, 45 degrees, and 60 degrees were taken as the measurement values of each sample. The average values of the three sample measurements were defined as Rob(30), Rob(45), and Rob(60) of the film. Since the measurement value of each sample may have an error value due to ripple noise, it was confirmed whether or not the data were smoothly changing with respect to changes in the polar angle and azimuthal angle around the adopted polar angle and azimuthal angle. When the changes were not smooth, the same sample was applied again and re-measured, and the average of the three samples that were measured normally was used as the average value.

With respect to sample cutout, for the long polarizing element-protection film, a first sample was cut out from the center portion in the width direction of the long polarizing element-protection film that had been slit to the width to be bonded to the polarizing element. Second and third samples were cut out from both end portions. Samples were continuously cut out from the position where the first sample was cut out toward both end portions of the film width. In this cutout, the samples were cut out with intervals of 100 nm between the centers of adjacent 40×60 mm samples, and end portions of the film were cut out to a position where a sample of a predetermined size could be cut out. Further, if the width of the remaining end portions was 60 mm or more after completion of the cutout toward both end portions, a sample was cut out from the center of the width of the remaining end portions.

In a polarizer cut into sheets for incorporation into a display device, if the long or short side matches with the width direction of the long polarizing element-protection film described above, each value in the width direction of the long film sampled and measured above was used as the value of the long or short side. If the long or short side of the polarizer cut into sheets coincides with the longitudinal direction of the long polarizing element-protection film, each value of the long or short side was measured by cutting out 11 samples with intervals of 100 mm from the center of the long polarizing element-protection film in the longitudinal direction and measuring the value, and this value was used in calculation. Since all of the films obtained in the Examples exhibited a larger fluctuation in the TD direction than that in the MD direction, the fluctuation in the TD direction was used.

When a sample is cut out from a polarizer incorporated in a display device, for example, the polarizer can be dipped in warm water of about 50° C., the polarizing element-protection film can then be gently peeled off from an end portion, and a sample can be cut out from the obtained polarizing element-protection film. In this case, samples are cut out from the center of the sheet film toward both ends in the long-side direction and the short-side direction by the system described above.

(3) Film Thickness and Variation

An electric micrometer (Millitron 1245D, produced by Feinpruf GmbH) was used for the measurement. The thickness of each film was measured at intervals of 50 mm from the center of the film in the width direction toward both end portions in the TD direction. The value calculated by the formula: (Maximum value-Minimum value)/the Average value×100 (%)) was obtained as the thickness variation in the TD direction. Further, the thickness was measured at 100 sites from the center portion of the film in the width direction at intervals of 50 mm in the MD direction. The thickness variation in the MD direction was determined in the same manner. Of the thickness variation in the TD direction and that in the MD direction, the greater variation was defined as the thickness variation of the film. The thickness of the film was defined as the thickness average in the TD direction.

(4) Absorption Axis of Polarizing Element

A polarizing filter whose absorption axis was known and a polarizing element were stacked and placed on a surface light source. The polarization filter was rotated to determine the direction of the absorption axis of the polarization filter in its darkest state, and 90 degrees from this direction was defined as the direction of the absorption axis of the polarizing element. In the case of a long polarizing element obtained by stretching PVA in the longitudinal direction, the longitudinal direction is the absorption axis direction; therefore, the longitudinal direction can be regarded as the absorption axis direction.

(5) Slow-Axis Direction of Film

The slow-axis direction of the film was measured with a molecular orientation meter (MOA-6004 type molecular orientation meter, produced by Oji Scientific Instruments Co., Ltd.).

(6) Three-Dimensional Surface Roughness

Using a probe-type three-dimensional roughness meter (SE-3AK, produced by Kosaka Laboratory, Ltd.) under the conditions of a needle radius of 2 μm and a load of 30 mg, the surface of each film was measured in the longitudinal direction of the film at a cutoff value of 0.25 mm over a measurement length of 1 mm at a needle feed speed of 0.1 mm/sec and then divided into 500 points at a pitch of 2 um, and the height of each point was taken into a three-dimensional roughness analyzer (SPA-11). The same operation as this was continuously performed 150 times at intervals of 2 um in a transverse direction of the film, that is, over 0.3 mm in the width direction of the film, and the data were taken into the analyzer. Subsequently, the center surface average roughness (SRa) and ten-point average roughness (SRz) were determined using the analyzer. The measurement was performed 3 times and the average value was used.

(7) Haze

The haze of the film was measured using a turbidity meter (NHD2000, produced by Nippon Denshoku Industries, Co., Ltd.) according to JIS-K7105.

(8) Light Transmittance at a Wavelength of 380 nm

Using a spectrophotometer (U-3500 model, produced by Hitachi, Ltd.), light transmittance in the wavelength range of 300 to 500 nm was measured using an air layer as a standard. The light transmittance at a wavelength of 380 nm was obtained.

(9) Intrinsic Viscosity 0.2 g of the sample was dissolved in 50 ml of a mixed solvent of phenol and 1,1,2,2-tetrachloroethane (phenol/1,1,2,2-tetrachloroethane weight ratio=60/40) and measured at 30° C. using an Ostwald viscometer.

(10A) Evaluation of Color Unevenness in Oblique Direction

A backlight unit and a liquid crystal panel were removed from a commercially available TV (REGZA 43J10X, produced by Toshiba Corporation). The polarizer of the liquid crystal panel was peeled off. On the surface of the liquid crystal panel from which the polarizer had been peeled off, the prepared polarizer was disposed in such a manner that one of polarizing element-protection films A to K was disposed on a surface of the polarizing element on the side opposite to the liquid crystal cell side so that the polarizing element is interposed between the polarizing element-protection film and the liquid crystal cell, and the absorption axis direction of the polarizing element was set to the same direction as that of the original polarizer. A backlight unit was then attached to prepare a display for evaluation. The space between the liquid crystal cell and the polarizer was filled with ion-exchanged water to prevent reflection.

The display for evaluation was placed horizontally on a desk and the entire surface was displayed in white. The state of color unevenness was observed by viewing the entire screen from a position about 2 m away from the screen at azimuthal angles of about 45 degrees and about 135 degrees (the center in the long-side direction and the short-side direction of the screen) and at a polar angle (an angle with the normal direction) of 50 degrees. Five persons ranked each display device according to the following three level ranking, the average value was rounded to the nearest whole number and used as the evaluation score. Note that the angle refers to the angle relative to the center of the screen. The evaluation was performed in a dark room with the light emission intensity of the backlight being maximized.

1 point: unacceptable color unevenness was observed in at least one area.

3 points: color unevenness was observed but was acceptable.

5 points: color unevenness was not noticeable.

As shown below, the evaluation was performed with only the viewing-side polarizer being changed, with only the light-source-side polarizer being changed, and with both polarizers being changed.

(10B) Evaluation of Color Unevenness in Oblique Direction

A backlight unit and a liquid crystal panel were removed from a commercially available TV (REGZA 43J10X, produced by Toshiba Corporation). The polarizer of the liquid crystal panel was peeled off. On the surface of the liquid crystal panel from which the polarizer had been peeled off, the prepared polarizer was disposed in such a manner that a high Re polarizing element-protection film was disposed on a surface of the polarizing element on the side opposite to the liquid crystal cell side so that the polarizing element is interposed between the high Re polarizing element-protection film and the liquid crystal cell, and the absorption axis direction of the polarizing element was set to the same direction as that of the original polarizer. A backlight unit was then attached to produce a display for evaluation. The space between the liquid crystal cell and the polarizer was filled with ion-exchanged water to prevent reflection.

The display for evaluation was placed horizontally on a desk and the entire surface was displayed in white. The presence or absence of striped color unevenness and uniformity of color tone were observed by viewing the entire screen at a polar angle (an angle with the normal direction) of 50 degrees at a position about 2 m away from the screen while walking around the desk on which the display for evaluation was placed. Five persons ranked each display device according to the following three-level ranking, and the average value was rounded to the nearest whole number and used as the evaluation score. Note that the angle refers to the angle relative to the center of the display screen. The evaluation was performed in a dark room with the light emission intensity of the backlight being maximized.

1 point: striped color unevenness or uneven color tone was observed in at least one portion on the periphery of the screen, in particular, in the distal end portion.

3 points: uneven color tone was observed in a portion, such as at the distal end, but was acceptable.

5 points: the unevenness of color tone was not noticeable.

The emission spectrum of the light source is shown in FIG. 1. As stated above, the peak group-to-peak group distance (Wd) was 20.6 nm and the central wavelength (Wc) was 622.1 nm.

(11) Horizontal and Vertical Direction Color Unevenness Evaluation

In the same manner as in the evaluation of color unevenness in the oblique direction, a display for evaluation was prepared and the entire surface was displayed in white. The state of color unevenness was observed by viewing the entire screen from the front at angles toward the long-side direction of the screen. Five persons ranked each display screen according to the following three level ranking by consensus. Note that the angle refers to the angle relative to the center of the screen. The evaluation was performed in a dark room with the light emission intensity of the backlight being maximized.

Rank 1: rainbow unevenness was observed around 60 degrees from the front.
Rank 3: color unevenness was observed around 70 degrees from the front.
Rank 5: no rainbow unevenness was observed until viewed from the side.

(12) Inspection of Foreign Substances in Film

Each polarizer for testing is placed on the surface of the prepared polarizer on the high Re polarizing element-protection film side in such a manner that the prepared polarizer and the polarizer for testing are in a cross-Nicol state. For the polarizer for testing, a TAC film whose both surfaces have no retardation and are free of scratches and foreign substances is selected. In this state, the inspection of foreign substances in the film is performed using a Nikon universal projector V-12 (projection lens 50×, transmission illumination light flux switching knob 50×, transmission light inspection). When a foreign substance is present in the high Re polarizing element-protection film, light is transmitted through that portion and it appears to shine. The number of foreign substance portions having a longer diameter of 100 µm or more, the number of foreign substance portions having a longer diameter of 50 µm or more and less than 100 µm, and the number of foreign substance portions having a longer diameter of 20 µm or more and less than 50 µm were counted, and the total of the number of foreign substance portions within each size range on the entire surface of the polarizer was calculated.

In cases where the longer diameter could not be distinguished, the defect portion due to a foreign substance detected by the method was cut out from the polarizer and observed under an increased magnification using a polarizing microscope to determine the longer diameter. In this microscopic observation, the high Re polarizing element-protection film side of the polarizer was turned up, and the polarization direction was set to be parallel to the polarization direction of the light-source-side polarizing element of the polarizing microscope.

(13) Micro-Image Uniformity

The front surface was displayed in white. The image on the display screen was visually observed from the front to every corner of the image at a distance of about 20 cm. The presence or absence of portions with abnormalities, such as foreign substances, dark spots, portions with different color tones, and disordered pixel arrangement, was observed. Five persons performed evaluation and ranked each display screen according to the following three level ranking by consensus.

Rank 1: there were many portions with abnormalities and the quality was poor.
Rank 3: there were some portions with abnormalities, but the quality was not particularly bad.
Rank 5: there were no portions with abnormalities.

(14) Amount of Antimony Atom in the Residue

After the easy-to-adhere layer was removed from the film surface by scraping the layer off with a razor blade, the film was cut into small pieces with scissors. After 0.1 g of these small pieces were dissolved in 20 mL of a mixed solvent of parachlorophenol and tetrachloroethane (parachlorophenol/tetrachloroethane weight ratio=60/40), the resulting solution was filtered through a hydrophilic PTFE membrane filter (H010A047A, produced by Advantech) with an average pore size of 0.1 µm by a water-flow suction filtration method. After the filtration, the filter was recovered and the residue on the filter was dissolved in nitric acid and volume-controlled to prepare a sample for measurement. Samples were prepared with N=3 for each sample. Sb in the test solution was measured with a high-resolution inductively coupled plasma mass spectrometer (HR-ICP-MS, produced by Thermo Fisher Scientific, Inc.)

(15) Image Sharpness and Brightness

The images of landscapes, people, and plants were displayed and observed from the surface, and their sharpness (contrast) and brightness were evaluated as compared with those of the original image display device. Five persons evaluated and ranked the image on each display device according to the following three-level ranking by consensus.

Rank 1: sharpness and brightness were reduced.
Rank 3: slightly inferior in sharpness and brightness, but not noticeable.
Rank 5: no difference in sharpness and brightness was perceived.

(16) Interference Color Evaluation

Formation of Hard Coating Layer

A coating solution for forming a hard coating layer having the following formulation was applied to one surface of the prepared substrate film by using a #10 wire bar and dried at 70° C. for 1 minute, and the solvent was removed. Subsequently, the film coated with the hard coating layer was irradiated with 300 mJ/cm$^2$ UV light using a high-pressure mercury vapor lamp to obtain a surface polarizing element-protection film comprising a hard coating layer of 5 µm thickness.

Coating Liquid for Forming Hard Coating Layer
Methyl ethyl ketone 65.00 mass %
Dipentaerythritol hexaacrylate 27.20 mass %
(A-DPH, produced by Shin-Nakamura Chemical Co., Ltd.)
Polyethylene diacrylate 6.80 mass %
(A-400, produced by Shin-Nakamura Chemical Co., Ltd.)
Photoinitiator 1.00 mass %
(Irgacure 184, produced by Ciba Specialty Chemicals)

A sample film was prepared by cutting a surface protection film having a hard coating formed thereon to a size of 10 cm (in the width direction of the film)×15 cm (in the longitudinal direction of the film). A black glossy tape (Vinyl Tape No. 21; black, Nitto Denko Corporation) was bonded to a surface of the obtained sample film on the side opposite to the hard coating layer side. Using three-wavelength daylight white (National Palook, F.L 15EX-N 15W) as the light source, each sample film was observed with the hard coating layer surface of the sample film facing up at a positional relationship where the strongest reflection can be seen as viewed obliquely from above (at a distance from the light source of 40 to 60 cm at an angle of 15 to 45 degrees).

The results of visual observation were ranked according to the following criteria. The observation was made by three evaluation experts. When different evaluation results were obtained, the evaluation was made by consensus. A and B were considered acceptable.

A: almost no interference color was observed from any angle.
B: slight rainbow color was observed.
C: clear rainbow color was observed.

Polyester A (PET (A)): polyethylene terephthalate with an intrinsic viscosity of 0.62 dl/g PET (A) was produced by the following method. 86.4 parts by mass of terephthalic acid and 64.6 parts by mass of ethylene glycol were placed in an esterification reaction can and the temperature was raised with stirring. When the temperature had reached 200° C., 0.017 parts by mass of antimony trioxide as a catalyst in the form of an ethylene glycol solution, 0.064 mass of magnesium acetate tetrahydrate and 0.16 mass of triethylamine were added with stirring. Subsequently, by increasing the pressure and the temperature, a pressure esterification reaction was performed at a gauge pressure of 0.34 MPa and 240° C. After the pressure esterification reaction can was returned to normal pressure, 0.014 parts by mass of phosphoric acid was added. The temperature was further raised to 260° C. over a period of 15 minutes, and 0.012 parts by mass of trimethyl phosphate was added. Subsequently, after 15 minutes, the resulting mixture was dispersed using a high-pressure dispersing machine. After 15 minutes, the resulting esterification reaction product was transferred to a polycondensation reaction vessel. The polycondensation reaction was performed while increasing the temperature under reduced pressure. The temperature reached in the polycondensation was 280° C., and the reaction was performed at this temperature for 20 minutes.

After completion of the polycondensation, the reaction mixture was filtered through a Naslon filter with a 95% cut diameter of 5 µm, extruded from a nozzle into strands, cooled and solidified by using cooling water that had been previously filtered (pore size: 1 µm or less), and cut into pellets.

Polyester B (PET (B)): a molten mixture of 10 parts by mass of a ultraviolet absorber (2,2'-(1,4-phenylene)bis(4H-3,1-benzoxazinon-4-one)) and 90 parts by mass of PET (A).

PET (B) was produced by the following method. 10 parts by mass of a dried ultraviolet absorber (2,2'-(1,4-phenylene)bis(4H-3,1-benzoxazinon-4-one)) and 90 parts by mass of the above PET (A) were mixed. Using a kneading extruder, the mixture was filtered and pelletized in the same manner as above to obtain polyester B containing an ultraviolet absorber.

Polyester C (PEN): polyethylene naphthalate with an intrinsic viscosity of 0.58 dl/g Polyester D (PET (D))

Polyester D was produced in the same manner as PET (A) except that 0.04 parts by mass of antimony trioxide was used, only phosphoric acid was used as the phosphorus compound and was simultaneously added with other catalysts, and the maximum temperature in the polycondensation reaction was 290° C. for 35 minutes.

Polyester E (PET (E))

Polyester E was produced in the same manner as PET (A) except that PET (D) was used.

These polyesters were filtered through a NASLON filter (nominal filtration accuracy: 95% of 5 µm particles were cut off) in the melt line for extrusion into strands.

Preparation of Adhesion-modifying Coating Solution 1

A transesterification reaction and a polycondensation reaction were performed in a usual manner to prepare a water-dispersible sulfonic acid metal salt group-containing copolymerized polyester resin of the following formulation: 46 mol % of terephthalic acid, 46 mol % of isophthalic acid, and 8 mol % of sodium 5-sulfonatoisophthalate as dicarboxylic acid components (based on the entire dicarboxylic acid components); and 50 mol % of ethylene glycol and 50 mol % of neopentyl glycol as glycol components (based on the entire glycol components). Subsequently, 51.4 parts by mass of water, 38 parts by mass of isopropyl alcohol, 5 parts by mass of n-butyl cellosolve, and 0.06 parts by mass of a nonionic surfactant were mixed, and then stirred with heating. When the temperature reached 77° C., 5 parts by mass of the water-dispersible sulfonic acid metal salt group-containing copolymerized polyester resin was added and continuously stirred until the mass of the resin disappeared. The resulting aqueous resin dispersion was then cooled to room temperature, thereby obtaining a homogeneous water-dispersible copolymerized polyester resin solution with a solids content of 5.0 mass %. Further, 3 parts by mass of aggregate silica particles (Sylysia 310, produced by Fuji Silysia Chemical, Ltd.) were dispersed in 50 parts by mass of water, and then 0.54 parts by mass of the aqueous dispersion of Sylysia 310 was added to 99.46 parts by mass of the water-dispersible copolymerized polyester resin solution. While stirring the mixture, 20 parts by mass of water was added, thereby obtaining an adhesion-modifying coating solution 1. The coating solution was filtered through a cartridge filter with a 95% separation particle size of 10 µm.

Adhesion-Modifying Coating Solution 2

Polymerization of Copolymer Polyester Resin 381 parts by mass of dimethyl naphthalate, 58.3 parts by mass of dimethyl terephthalate, 41.5 parts by mass of dimethyl-5-sodium sulfoisophthalate, 46.7 parts by mass of diethylene glycol, 245.8 parts by mass of ethylene glycol, and 0.5 parts by mass of tetra-n-butyl titanate were placed in a stainless steel autoclave equipped with a stirrer, a thermometer, and a partial reflux condenser. A transesterification reaction was performed at a temperature of 160 to 220° C. over a period of 4 hours. Subsequently, the temperature was raised to 255° C., and the pressure in the reaction system was gradually reduced. A reaction was then performed at a reduced pressure of 30 Pa for 1 hour and half to obtain a copolymerized polyester resin (A-1). The obtained copolymerized polyester resin was pale yellow and transparent. The formulation determined by 1H-NMR was 2,6-naphthalene dicarboxylic acid/terephthalic acid/S-sodium sulfoisophthalic acid/ethylene glycol/diethylene glycol=78/15/7/90/10 (mol %).

Preparation of Aqueous Dispersion of Polyester Resin 20 parts by mass of a polyester resin (A-1) and 15 parts by mass of ethylene glycol t-butyl ether were placed in a reactor equipped with a stirrer, a thermometer, and a reflux condenser. The resulting mixture was heated at 110° C. and stirred to dissolve the resin. After the resin was completely dissolved, 65 parts by mass of water was gradually added to the polyester solution while stirring. After the addition, the resulting mixture was cooled to room temperature while stirring, thus preparing a milky-white aqueous polyester dispersion (B-1) with a solids content of 20 mass %.

Polymerization of Block Polyisocyanate Crosslinking Agent

A four-necked flask equipped with a stirrer, a thermometer, a reflux cooling tube, a nitrogen blowing tube, and a dropping funnel was filled with a nitrogen atmosphere, and 600 parts of HMDI and 30 parts of polycaprolactone polyester polyol (Plaxel 303, produced by Daicel Chemical, molecular weight: 300), which is a trihydric alcohol, were added. A urethanization reaction was performed by maintaining the temperature in the reactor at 90° C. for 1 hour with stirring. The temperature in the reactor was then maintained at 60° C., and tetramethylammonium caprate, which is an isocyanurate-forming catalyst, was added. When the yield reached 48%, phosphoric acid was added and the reaction was stopped to obtain a polyisocyanate composition (C-1).

Subsequently, a four-necked flask equipped with a stirrer, a thermometer, a reflux cooling tube, a nitrogen blowing tube, and a dropping funnel was filled with a nitrogen atmosphere, and 100 parts of the polyisocyanate composition (C-1), 19 parts of methoxypolyethylene glycol with a molecular weight of 400 (Uniox M400, produced by NOF Corporation) (which reacts with 10% of all isocyanate groups of polyisocyanate), and 37 parts of propylene glycol monomethyl ether acetate were placed in the flask and maintained at 80° C. for 7 hours. The temperature of the reaction mixture was then maintained at 50° C. and 38 parts of methyl ethyl ketoxime was added dropwise. The infrared spectrum of the reaction mixture showed that the isocyanate groups disappeared, and an aqueous block polyisocyanate resin (C-2) with a solid content of 80 mass % was obtained.

Preparation of Adhesion-modifying Coating Solution 2

The following coating agents were mixed and filtered through a cartridge filter with a 95% separation particle size of 10 μm to prepare a coating solution 2. Particle A is $SnO_2$ with a refractive index of 2.1. Particle B is silica particles with an average primary particle size of about 500 nm.

Water 43.26 mass %
Isopropanol 30.00 mass %
Polyester aqueous dispersion (B-1) 20.07 mass %
Aqueous blocked polyisocyanate resin (C-2) 0.74 mass %
Particles A 5.58 mass %
   (Ceramace S-8, produced by Taki Chemical Co., Ltd., solids content: 8 mass %)
Particles B 0.30 mass %
(Seahostar KEW50, produced by Nippon Shokubai Co., Ltd., solids content: 15 mass %)
Surfactant 0.05 mass %
(Dynol 604, produced by Nissin Chemical Co., Ltd., solids content: 100 mass %)

Preparation of Adhesion-modifying Coating Solution 3

An adhesion-modifying coating solution 3 was obtained in the same manner as the adhesion-modifying coating solution 2 except that B-2 was used as the aqueous polyester dispersion and $SiO_2$ with a refractive index of 1.46 (Snowtex ZL, produced by Nissan Chemical Industry, solids content: 40 mass %) was used as particle A.

Polarizing Element

A rolled polyvinyl alcohol film with a thickness of 80 μm that was continuously dyed in an aqueous iodine solution was stretched 5-fold in the transport direction, treated in a boric acid solution, washed with water, and dried to obtain a long polarizing element.

Polarizing Element-Protection Film A

As starting materials for forming a substrate film intermediate layer, 90 parts by mass of PET (A) resin pellets not containing particles and 10 mass of PET (B) resin pellets containing a ultraviolet absorber were dried at 135° C. under reduced pressure (1 Torr) for 6 hours and then supplied to extruder 2 (for intermediate layer II), whereas PET (A) was dried in a usual manner and then supplied to extruder 1 (for outer layer I and outer layer III). These two types of polymers were melted at 285° C. and individually filtered through a sintered stainless steel filter (nominal filtering accuracy: 95% of 10 μm particles were cut off), laminated using a two-type three-layer junction block, and extruded into a sheet shape from a die. The resulting sheet was cooled and solidified by winding the sheet around a casting drum with a surface temperature of 30° C. by an electrostatic casting method, thereby forming an unstretched film. The amount discharged from each extruder to form this film were adjusted to achieve a thickness ratio of layer I/layer II/layer III of 10:80:10.

Subsequently, the adhesion-modifying coating solution 1 described above was applied to both surfaces of the unstretched PET film in such a manner that the dried coating amount was 0.08 g/m², and the coated film was then dried at 80° C. for 20 seconds. In the coating application, a cartridge filter with a 95% separation particle size of 10 μm was installed in the line for feeding the coating solution 1 to the coating die to remove aggregated particles.

The unstretched film having the coating layer formed thereon was guided to a tenter stretching machine. While the end portions of the film were held with clips, the film was guided to a heat fixation zone of 100° C., and stretched 4.1-fold in the width direction. Subsequently, while the width of the film stretched in the width direction was maintained, the film was heat-treated in a heat fixation zone at a temperature of 190° C. for 10 seconds, and further subjected to 3.0% relaxation treatment in the width direction to obtain a stretched PET film.

Polarizing Element-protection Films B to H

Polarizing element-protection films shown in Table 1 were obtained in the same manner as in polarizing element-protection film A except that the thickness of the unstretched films was adjusted.

Polarizing Element-Protection Film I

The unstretched PET film obtained in the same manner as polarizing element-protection film A except that the thickness was adjusted was heated to 110° C. and stretched 1.08-fold between rolls with different peripheral speeds. The adhesion-modifying coating solution prepared above was then applied to both surfaces of the unstretched PET film in such a manner that the dried coating amount was 0.08 g/m², and the coated film was dried in the same manner as above. The obtain film having the coating layer formed thereon was guided to a tenter stretching machine. While the end portions of the film were held with clips, the film was guided to a tenter of 100° C., and stretched 4.2-fold in the width direction. Subsequently, while the stretched width in the width direction was maintained, the film was treated in a heat fixation zone at a temperature of 190° C. for 10 seconds. Further, a relaxation treatment in the width direction of 2.0% was performed to obtain a stretched PET film.

Polarizing Element-Protection Film J

A stretched PET film was obtained in the same manner as polarizing element-protection film I except that the thickness was adjusted and the stretch between the rolls was set to 1.13-fold.

Polarizing Element-Protection Film K

A stretched PET film was obtained in the same manner as the polarizing element-protection film A except that the thickness was adjusted, the tenter temperature was set to 105° C., and the stretch ratio was set to 5.3-fold.

Polarizing Element-Protection Films L and M

An unstretched film having a coating layer formed thereon was obtained in the same manner as polarizing element-protection film A except that the thickness was adjusted. The unstretched film having the coating layer formed thereon was guided to a tenter stretching machine. While the end portions of the film were held with clips, the film was guided to a tenter at 125° C. and stretched 4.0-fold in the width direction. Subsequently, while the width stretched in the width direction was maintained, the film was treated in a heat fixation zone at a temperature of 225° C. for 10 seconds. Further, a relaxation treatment of 2.0% in the width direction was performed to obtain a stretched PET film.

Polarizing Element-Protection Film N

As a starting material for forming a substrate film, PEN resin pellets not containing particles were dried under reduced pressure (1 Torr) at 135° C. for 6 hours, then supplied to an extruder and melted at 295° C. This polymer was filtered through a sintered stainless steel filter (nominal filtration accuracy: 95% of 10 μm particles were cut off) and extruded into a sheet shape through a die. The resulting film was wound onto a casting drum with a surface temperature of 30° C. by the electrostatic application casting method, and cooled and solidified to obtain an unstretched film.

Subsequently, the adhesion-modifying coating solution prepared above was applied to both surfaces of the unstretched PET film in such a manner that the dried coating amount was 0.08 g/m², and the coated film was dried at 80° C. for 20 seconds.

The unstretched film having a coating layer formed thereon was guided to a tenter stretching machine. While the end portions of the film were held with clips, the film was guided to a tenter of 130° C., and stretched 4.0-fold in the width direction. Subsequently, while the width of the film stretched in the width direction was maintained, the film was heat-treated in a heat fixation zone at a temperature of 210° C. for 10 seconds, and further subjected to a relaxation treatment of 3.0% in the width direction, thus obtaining a stretched PET film.

Polarizing Element-Protection Film O

A thick stretched PET film was obtained in the same manner as the polarizing element-protection film A except that the thickness was adjusted, the tenter temperature was set to 110° C., and the stretch ratio was set to 5.4-fold. For film O, the refractive index in each of nx, ny, and nz directions was measured with an Abbe refractive index meter and the difference between the refractive index in the nx directions and that in the ny direction was multiplied by the thickness to obtain an in-plane retardation. The in-plane retardation was 7198 nm.

Polarizing Element-Protection Film P

An unstretched PET film obtained in the same manner as polarizing element-protection film A except the thickness was adjusted was guided to a simultaneous biaxial stretching machine at 125° C. and stretched 6-fold in the MD direction and 1.8-fold in the TD direction. Subsequently, the resulting film was treated in a heat fixation zone at 225° C. for 10 seconds and subjected to a relaxation treatment of 3% in the MD direction and 0.5% in the TD direction, thus obtaining a stretched PET film. The in-plane retardation of film P was 3880 nm.

The polarizing element-protection film obtained above was slit in the center portion where the orientation direction was almost uniform (the deviation from TD direction or MD direction was 0.5 degrees or less) and used. Table 1 shows properties of each polarizing element-protection film.

TABLE 1

| High Re polarizing element-protection film | A | B | C | D | E | F | G | H |
|---|---|---|---|---|---|---|---|---|
| Resin | PET | PET | PET | PET | PET | PET | PET | PET |
| Thickness (μm) | 63 | 68 | 75 | 80 | 85 | 92 | 100 | 105 |
| Thickness variation (%) | 2.7 | 2.5 | 1.8 | 2.2 | 2.3 | 2.5 | 2.2 | 2.3 |
| Rob (45) (nm) | 7324 | 7905 | 8719 | 9300 | 9881 | 10695 | 11625 | 12206 |
| FI (45) | 0.390 | 0.421 | 0.464 | 0.495 | 0.526 | 0.569 | 0.619 | 0.650 |
| Rob (30) (nm) | 6064 | 6545 | 7219 | 7700 | 8181 | 8855 | 9625 | 10106 |
| FI (30) | 0.323 | 0.348 | 0.384 | 0.410 | 0.435 | 0.471 | 0.512 | 0.538 |
| Rob (60) (nm) | 8048 | 8687 | 9581 | 10220 | 10859 | 11753 | 12775 | 13414 |
| FI (60) | 0.428 | 0.462 | 0.510 | 0.544 | 0.578 | 0.626 | 0.680 | 0.714 |
| ΔFI/FI (45) | 0.271 | 0.271 | 0.271 | 0.271 | 0.271 | 0.271 | 0.271 | 0.271 |
| ΔRob (nm) | 1985 | 2142 | 2363 | 2520 | 2678 | 2898 | 3150 | 3308 |
| SRa (nm) | 2 or less | 2 or less | 2 or less | 2 or less | 2 or less | 2 or less | 2 or less | 2 or less |
| SRz (nm) | 28 | 26 | 26 | 30 | 29 | 26 | 27 | 27 |
| Haze (%) | 0.7 | 0.7 | 0.7 | 0.7 | 0.7 | 0.7 | 0.7 | 0.7 |
| 380 nm light transmittance (%) | 3 | 2 | 1 | 1 | 1 | <1 | <1 | <1 |

| High Re polarizing element-protection film | I | J | K | l | M | N | O | P |
|---|---|---|---|---|---|---|---|---|
| Resin | PET | PET | PET | PET | PET | PEN | PET | PET |
| Thickness (μm) | 80 | 80 | 65 | 80 | 100 | 42 | 60 | 40 |
| Thickness variation (%) | 3.6 | 4.2 | 2.8 | 2.3 | 2.4 | 4.8 | | |
| Rob (45) (nm) | 9150 | 8820 | 8588 | 8350 | 10590 | 8983 | | |
| FI (45) | 0.487 | 0.469 | 0.457 | 0.444 | 0.564 | 0.478 | | |
| R0b (30) (nm) | 7530 | 7250 | 7258 | 6855 | 8758 | 7519 | | |
| FI (30) | 0.401 | 0.386 | 0.386 | 0.365 | 0.466 | 0.400 | | |
| Rob (60) (nm) | 10200 | 10180 | 9801 | 9642 | 12221 | 10319 | | |
| FI (60) | 0.543 | 0.542 | 0.522 | 0.513 | 0.651 | 0.549 | | |
| ΔFI/FI (45) | 0.292 | 0.332 | 0.296 | 0.334 | 0.327 | 0.312 | | |
| ΔRob (nm) | 2670 | 2930 | 2543 | 2787 | 3463 | 2800 | | |
| SRa (nm) | 2 or less | 2 or less | 2 or less | 2 or less | 2 or less | 2 or less | 2 or less | 2 or less |

TABLE 1-continued

| | | | | | | | | |
|---|---|---|---|---|---|---|---|---|
| SRz (nm) | 26 | 28 | 30 | 29 | 26 | 26 | 28 | 28 |
| Haze (%) | 0.7 | 0.7 | 0.8 | 0.7 | 0.7 | 0.8 | 0.7 | 0.7 |
| 380 nm light transmittance (%) | 1 | 1 | 2 | 1 | 1 | — | 3 | 10 |

Production of Polarizers

Polarizer Production 1

The polarizing element-protection films prepared above were individually bonded to one surface of a polarizing element, and a triacetyl cellulose film (40 μm thick) was bonded to the opposite-side surface of the polarizing element by roll-to-roll bonding to thereby produce polarizers PA1 to PP1. A LTVN-curable adhesive was used for the bonding. In polarizers PA1 to PO1, the angle between the slow axis of the polarizing element-protection film and the absorption axis of the polarizing element was 90 degrees. In polarizer PP1, the angle between the slow axis of the polarizing element-protection film and the absorption axis of the polarizing element was 0 degrees. The deviation was less than 0.5 degrees in any case.

Polarizer Production 2

A triacetyl cellulose film (40 μm thick) was bonded to one surface of a polarizing element by roll-to-roll bonding and then cut into sheets. The polarizing element-protection film D cut into sheets was bonded to the opposite-side surface of the polarizing element in such a manner that the angle of bonding was shifted as shown in Table 2, thus obtaining polarizers PD2 to PD4.

TABLE 2

| High Re polarizing element- | Polarizer | | | | | | | | | |
|---|---|---|---|---|---|---|---|---|---|---|
| protection film | PA1 | PB1 | PC1 | PD1 | PE1 | PF1 | PG1 | PH1 | PI1 | PJ1 |
| | A | B | C | D | E | F | G | H | I | J |
| Polarizing element | PVA | PVA | PVA | PVA | PVA | PVA | PVA | PVA | PVA | PVA |
| Cell-side polarizing element-protection film | TAC | TAC | TAC | TAC | TAC | TAC | TAC | TAC | TAC | TAC |
| Haze (%) | 0.9 | 0.9 | 1 | 1 | 1 | 1 | 1 | 1.1 | 1 | 1 |
| Angle between the absorption axis and the slow axis | 90 | 90 | 90 | 90 | 90 | 90 | 90 | 90 | 90 | 90 |

| High Re polarizing element- | Polarizer | | | | | | | | |
|---|---|---|---|---|---|---|---|---|---|
| protection film | PK1 | PL1 | PM1 | PN1 | PD2 | PD3 | PD4 | PO1 | PP1 |
| | K | T | M | N | D | D | D | K | L |
| Polarizing element | PVA | PVA | PVA | PVA | PVA | PVA | PVA | PVA | PVA |
| Cell-side polarizing element-protection film | TAC | TAC | TAC | TAC | TAC | TAC | TAC | TAC | TAC |
| Haze (%) | 1 | 1 | 1.1 | 1 | 1 | 1 | 1 | 0.9 | 0.9 |
| Angle between the absorption axis and the slow axis | 90 | 90 | 90 | 90 | 88 | 86 | 82 | 90 | 0 |

Evaluation with Light-Source-Side Polarizer

Only the light-source-side polarizer was replaced with the polarizer prepared above, and evaluation in color unevenness was performed. The color unevenness in an oblique direction was evaluated according to (10A). Table 3 shows the results.

TABLE 3

|  | Comp. Ex. 1-1 | Example 1-1 | Example 1-2 | Example 1-3 | Example 1-4 | Example 1-5 | Example 1-6 | Comp. Ex. 1-2 | Example 1-7 |
|---|---|---|---|---|---|---|---|---|---|
| Viewing side Light-source side | PA1 | PB1 | PC1 | PD1 | PE1 | PF1 | PG1 | PH1 | PI1 |
| Evaluation of color unevenness in an oblique direction | 1 | 3 | 5 | 5 | 5 | 4 | 3 | 2 | 5 |
| Evaluation of color unevenness in horizontal and vertical directions | 5 | 5 | 5 | 5 | 5 | 5 | 5 | 5 | 5 |

|  | Example 1-8 | Example 1-9 | Example 1-10 | Example 1-11 | Example 1-12 | Example 1-13 | Example 1-14 | Reference Example 1-1 |
|---|---|---|---|---|---|---|---|---|
| Viewing side Light-source side | PJ1 | PK1 | PL1 | PM1 | PN1 | PD2 | PD3 | PD4 |
| Evaluation of color unevenness in an oblique direction | 4 | 5 | 3 | 3 | 5 | 5 | 3 | 2 |
| Evaluation of horizontal and vertical direction color unevenness | 5 | 5 | 5 | 5 | 5 | 5 | 3 | 1 |

In the case of polarizer PA1 using polarizing element-protection film A, Re was low and clear color unevenness from the oblique direction was observed. When Re was increased by increasing the film thickness from polarizing element-protection film B to polarizing element-protection film H, the color unevenness from the oblique direction, which was slightly observed in polarizing element-protection film B, decreased once and then increased. When the polarizing element-protection film H was used, clear color unevenness was observed. When ΔFI/FI(45) was increased in ascending order of polarizing element-protection films I, J, L, M, color unevenness as viewed from the oblique direction tended to increase. Color unevenness as viewed from the horizontal and vertical directions was not observed in these samples.

Even in the polarizing element-protection film K comprising PEN as the resin, color unevenness was not noticeable as long as FI(45) and the like were within appropriate ranges.

Subsequently, using polarizers (PD2, PD3, and PD4) comprising a polarizing element-protection film D with the angle between the slow axis of the polarizing element-protection film and the absorption axis of the polarizing element being deviated from 90 degrees, the occurrence of color unevenness was evaluated. Color unevenness as viewed from an oblique direction became stronger as the deviation increased. Further, color unevenness as viewed from horizontal and vertical directions also appeared as the deviation increased.

Evaluation Using the Viewing-Side Polarizer

Only the viewing-side polarizer was replaced by each of the polarizers prepared above, and color unevenness was evaluated. The evaluation of color unevenness in an oblique direction was performed according to (10A).

Table 4 shows the results. In order to check the effect of optical properties of the polarizing element-protection film, no reflection reduction layer or the like was applied.

TABLE 4

|  | Comp. Ex. 1-4 | Example 1-15 | Example 1-16 | Example 1-17 | Example 1-18 | Example 1-19 | Example 1-20 | Comp. Ex. 1-5 | Example 1-21 |
|---|---|---|---|---|---|---|---|---|---|
| Viewing side Light - source side | PA1 | PB1 | PC1 | PD1 | PE1 | PF1 | PG1 | PH1 | PI1 |
| Evaluation of color unevenness in oblique direction | 2 | 3 | 5 | 5 | 5 | 5 | 3 | 2 | 5 |

TABLE 4-continued

| | | | | | | | | | |
|---|---|---|---|---|---|---|---|---|---|
| Evaluation of color unevenness in horizontal and vertical directions | 5 | 5 | 5 | 5 | 5 | 5 | 5 | 5 | 5 |

| | Example 1-22 | Example 1-23 | Example 1-24 | Example 1-25 | Example 1-26 | Example 1-27 | Example 1-28 | Reference Example 1-2 |
|---|---|---|---|---|---|---|---|---|
| Viewing side Light -source side | PJ1 | PK1 | PL1 | PM1 | PN1 | PD2 | PD3 | PD4 |
| Evaluation of color unevenness in oblique direction | 4 | 5 | 3 | 3 | 5 | 5 | 3 | 2 |
| Evaluation of color unevenness in horizontal and vertical directions | 5 | 5 | 5 | 5 | 5 | 5 | 3 | 1 |

When each of the prepared polarizers was used as a viewing-side polarizer, color unevenness was smaller as a whole than that when each of the prepared polarizers was used as a light-source-side polarizer; however, the trend was the same.

Evaluation Using Both Light-Source-Side Polarizer and Viewing-Side Polarizer

The light-source-side polarizer and the viewing-side polarizer were both replaced with each of the polarizers prepared above, and evaluation in color unevenness was performed. Table 5 shows the results. Opstar TU-2360 (produced by Arakawa Chemical Industry Co., Ltd.) was applied to a surface of each polarization-protection film of the viewing-side polarizer on the side opposite to the polarizing element side, dried, and cured to provide a reflection reduction layer thereon. The reflectance as measured from the reflection reduction layer side of a polarizing element-protection film C, which was measured as a representative film, was 1.6%. The reflection reduction layer surface had an SRa of 2 nm and an SRz of 75 nm.

The reflectance was determined by measuring 5° reflectance at a wavelength of 550 nm with a spectrophotometer (UV-3150, produced by Shimadzu Corporation). The measurement was performed by applying a black magic marker and then applying a black vinyl tape (Kyowa Vinyl Tape HF-737, produced by Kyowa Co., Ltd., 50 mm wide) to a surface of the film on the side opposite to the side on which the anti-reflection layer (or low reflection layer) was formed.

TABLE 5

| | Example 1-27 | Example 1-28 | Example 1-29 | Example 1-30 | Example 1-31 | Example 1-32 | Example 1-33 | Example 1-34 | Example 1-35 |
|---|---|---|---|---|---|---|---|---|---|
| Viewing side | PB1 | PC1 | PC1 | PD1 | PE1 | PF1 | PJ1 | PK1 | PL1 |
| Light-source side | PD1 | PD1 | PC1 | PD1 | PD1 | PE1 | PD1 | PD1 | PD1 |
| Evaluation of color unevenness in oblique direction | 4 | 5 | 5 | 5 | 5 | 5 | 4 | 4 | 5 |
| Evaluation of color unevenness in horizontal and vertical directions | 5 | 5 | 5 | 5 | 5 | 5 | 5 | 5 | 5 |

As shown in Table 5, the present invention was found to be capable of suppressing color unevenness even if the polarizing element-protection film of the present invention was used as a polarizing element-protection film for both the light-source-side polarizer and the viewing-side polarizer. Further, when the polarizing element-protection film of the present invention was used as the polarizing element-protection film of the light-source-side polarizer, color unevenness was suppressed even if a polyester film other than the polarizing element-protection film used in the present invention was used as the polarizing element-protection film of the viewing-side polarizer.

Polarizing Element-Protection Film a

As starting materials for forming a substrate film intermediate layer, 90 parts by mass of PET (A) resin pellets not containing particles and 10 mass of PET (B) resin pellets containing a ultraviolet absorber were dried under reduced pressure (1 Torr) at 135° C. for 6 hours and then supplied to an extruder 2 (for intermediate layer II), whereas PET (A) was dried in a usual manner and supplied to an extruder 1 (for outer layer I and outer layer III). These two types of polymers were melted at 285° C. and individually filtered through a sintered stainless steel filter (nominal filtration accuracy: 95% of 10 μm particles were cut off). The two types of polymers were laminated in a two-type three-layer merging block, and extruded into a sheet shape from a die. The resulting sheet was cooled and solidified by winding the sheet around a casting drum with a surface temperature of 30° C. by an electrostatic casting method to prepare an unstretched film. The amount discharged from each extruder to form this film was adjusted to achieve a thickness ratio of layer I/layer II/layer III of 10:80:10.

Subsequently, the adhesion-modifying coating solution 2 was applied to both surfaces of the unstretched PET film in such a manner that the amount of the coating solution applied to each surface was 0.08 g/m² on a dry weight basis, and dried at 80° C. for 20 seconds. In the coating application, a cartridge filter with a 95% separation particle size of 10 μm was installed in the line for feeding the coating solution 2 to a coating die to remove aggregated particles.

The unstretched film having this coating layer formed thereon was guided to a tenter stretching machine. While the end portions of the film were held with clips, the film was guided to a tenter of 100° C., and stretched 4.1-fold in the width direction. Subsequently, while the width of the film stretched in the width direction was maintained, the film was heat-treated in a heat fixation zone at a temperature of 190° C. for 10 seconds, and further subjected to a relaxation treatment of 3.0% in the width direction. End portions that were uneven due to gripping with clips were removed to obtain a stretched PET film of 2000 mm in width and 1000 m in length. The nozzle was adjusted so that a larger amount of hot air from the tenter was applied to the end portions of the film in the preheating step and the first half of the heat fixation step. The obtained film was divided into two equal parts in the width direction to obtain a stretched PET film of 1000 mm in width and 1000 m in length.

As for the die, simulations were performed using the resin to be used, and a dedicated die capable of optimizing the flow distribution was used. The thickness variation in the TD direction was controlled by interlocking a thickness measuring device in the film production line with a lip adjustment bolt of the die, and the product was collected when it reached a stable state.

Polarizing Element-Protection Film b

A polarizing element-protection film b was produced in the same manner as in film A except that the amount of hot air applied to the end portions of the film was changed by nozzle adjustment in the preheating step and the first half of the heat fixation step, and the control program for the thickness measuring instrument and die lip adjustment bolts was improved.

Polarizing Element-Protection Film c

A polarizing element-protection film c was produced in the same manner as the production of film a except that no nozzle adjustment was performed in the preheating step and the first half of the heat fixation step, the time for the preheating step was reduced to ⅔, and the correlated control between the thickness measuring instrument and the die lip adjusting bolts was not performed.

Polarizing Element-Protection Film d

A polarizing element-protection film d was obtained in the same manner as polarizing element-protection film a except that the film was slit to a width of 1000 mm from the central portion.

Polarizing Element-Protection Film e

Polarizing element-protection film e was obtained in the same manner as polarizing element-protection film c except that the film was slit to a width of 1000 mm from the central portion.

Polarizing Element-Protection Films f and g

Polarizing element-protection film f was obtained in the same manner as polarizing element-protection film a except that the thickness was adjusted, the tenter temperature was set to 105° C., and the stretch ratio was 5.3-fold. Polarizing element-protection film g was obtained in the same manner as polarizing element-protection film f except that the thickness control program used was the same as the program for polarizing element-protection film b.

Table 6 shows properties of each polarizing element-protection film.

TABLE 6

| High Re polarizing element-protection film | A | b | c | d | e | f | g |
|---|---|---|---|---|---|---|---|
| Thickness (μm) | 80 | 80 | 80 | 80 | 80 | 65 | 65 |
| Thickness variation (%) | 3.2 | 2.1 | 4.2 | 2.5 | 4.2 | 3.0 | 2.2 |
| maxRob (45) (nm) | 9390 | 9290 | 9500 | 9300 | 9440 | 8870 | 8690 |
| minRob (45) (nm) | 9030 | 9120 | 8960 | 9050 | 9020 | 8550 | 8500 |
| Difference | 360 | 170 | 540 | 250 | 420 | 320 | 190 |
| maxFI (45) | 0.499 | 0.494 | 0.505 | 0.494 | 0.502 | 0.471 | 0.462 |
| minFI (45) | 0.480 | 0.485 | 0.476 | 0.481 | 0.479 | 0.454 | 0.452 |
| Difference | 0.019 | 0.009 | 0.029 | 0.013 | 0.022 | 0.017 | 0.010 |
| maxRob (30) (nm) | 8010 | 7880 | 8110 | 7910 | 8030 | 7520 | 7370 |
| minRob (30) (nm) | 7660 | 7710 | 7590 | 7680 | 7610 | 7200 | 7190 |

TABLE 6-continued

| High Re polarizing element-protection film | A | b | c | d | e | f | g |
|---|---|---|---|---|---|---|---|
| maxFI (30) | 0.426 | 0.419 | 0.431 | 0.420 | 0.427 | 0.400 | 0.392 |
| minFI (30) | 0.407 | 0.410 | 0.403 | 0.408 | 0.404 | 0.383 | 0.382 |
| maxRob (60) (nm) | 10670 | 10550 | 10780 | 10680 | 10680 | 10080 | 9930 |
| minRob (60) (nm) | 10290 | 10360 | 10220 | 10320 | 10250 | 9750 | 9730 |
| maxFI (60) | 0.567 | 0.561 | 0.573 | 0.562 | 0.568 | 0.536 | 0.528 |
| minFI (60) | 0.547 | 0.551 | 0.543 | 0.548 | 0.545 | 0.518 | 0.517 |
| maxΔFI/FI (45) | 0.283 | 0.287 | 0.281 | 0.287 | 0.281 | 0.289 | 0.295 |
| minΔFI/FI (45) | 0.291 | 0.291 | 0.294 | 0.292 | 0.293 | 0.298 | 0.299 |
| maxΔRob (nm) | 0.283 | 0.287 | 0.281 | 0.287 | 0.281 | 0.289 | 0.295 |
| minΔRob (nm) | 0.291 | 0.291 | 0.294 | 0.292 | 0.293 | 0.298 | 0.299 |
| SRa (nm) | 2 or less | 2 or less | 2 or less | 2 or less | 2 or less | 2 or less | 2 or less |
| SRz (nm) | 30 | 30 | 30 | 30 | 30 | 30 | 30 |
| Haze (%) | 0.7 | 0.7 | 0.7 | 0.7 | 0.7 | 0.8 | 0.8 |
| 380 nm light transmittance (%) | 1 | 1 | 1 | 1 | 1 | 2 | 2 |

Production of Polarizers

Polarizer Production 1

The polarizing element-protection films prepared above were individually bonded to one surface of a polarizing element and a triacetyl cellulose film (40 μm thick) was bonded to the opposite-side surface of the polarizing element by roll-to-roll bonding to thereby produce polarizers Pa1 to Pg1. A V curable adhesive was used for the bonding. In each polarizer, the angle between the slow axis of the polarizing element-protection film and the absorption axis of the polarizing element was 90 degrees, and the deviation was 0.5 degrees or less in any case.

TABLE 7

| High Re polarizing element - protection film | Polarizer | | | | | | |
|---|---|---|---|---|---|---|---|
| | Pa1 | Pb1 | Pc1 | Pd1 | Pe1 | Pf1 | Pg1 |
| | a | b | c | d | e | f | g |
| Polarizing element | PVA | PVA | PVA | PVA | PVA | PVA | PVA |
| Cell-side polarizing element - protection film | TAC | TAC | TAC | TAC | TAC | TAC | TAC |
| Haze (%) | 0.9 | 0.9 | 1 | 1 | 1 | 1 | 1 |
| Angle between the absorption axis and the slow axis | 90 | 90 | 90 | 90 | 90 | 90 | 90 |

Evaluation with Both the Light-Source-Side Polarizer and the Viewing-Side Polarizer The light-source-side polarizer and the viewing-side polarizer were both replaced with each of the polarizers prepared above, and the evaluation of color unevenness in an oblique direction was performed according to (10B).

Table 8 shows the results. Note that in order to see the effect of optical properties of the polarizing element-protection film, no reflection reduction layer or the like was provided.

TABLE 8

| | Example 2-1 | Example 2-2 | Comp. Ex. 2-1 | Example 2-3 |
|---|---|---|---|---|
| Light-source-side polarizer | Pa1 | Pb1 | Pc1 | Pd1 |
| Evaluation of color unevenness in oblique direction | 3 | 5 | 2 | 5 |

| | Example 2-4 | Example 2-5 | Example 2-6 |
|---|---|---|---|
| Light-source-side polarizer | Pe1 | Pf1 | Pg1 |
| Evaluation of color unevenness in oblique direction | 3 | 4 | 5 |

Polarizing Element-Protection Film h

As starting materials for forming a substrate film intermediate layer, 90 parts by mass of PET (A) resin pellets not containing particles and 10 mass of PET (B) resin pellets containing a ultraviolet absorber were dried under reduced pressure (1 Torr) at 135° C. for 6 hours and then supplied to an extruder 2 (for intermediate layer II), whereas PET (A) was dried in a usual manner and supplied to an extruder 1 (for outer layer I and outer layer III). These two types of polymers were melted at 285° C. and two types of polymers were individually filtered through a sintered stainless steel filter (nominal filtration accuracy: 95% of 10 μm particles were cut off). The two types of polymers were laminated using a two-type three-layer merging block, extruded into a sheet shape from a die. The resulting sheet was cooled and solidified by winding the sheet around a casting drum with a surface temperature of 30° C. by an electrostatic casting method to form an unstretched film. The amount discharged from each extruder to form this film was adjusted to achieve a thickness ratio of layer I/layer II/layer III of 10:80:10.

The difference between the inside diameter of the pipe and the inside diameter of the gasket at the joint on the flange of the pipe through which the molten resin passes was 50 μm or less. After a 5-minute resin discharge at a flow rate that was 1.2-fold the resin extrusion rate to be set at the start of operation was performed 3 times, film production was started and films obtained 30 minutes after the start of production and thereafter were sampled. The filter element was replaced with a cleaned one at the start of operation.

Subsequently, the adhesion-modifying coating solution 2 was applied to both surfaces of this unstretched PET film in such a manner that the dried coating amount was 0.08 g/m², and then dried at 80° C. for 20 seconds. In the coating application, a cartridge filter with a 95% separation particle size of 10 μm was installed in the line for feeding the coating solution 2 to a coating die to remove aggregated particles.

The unstretched film having this coating layer formed thereon was guided to a tenter stretching machine. While the end portions of the film were maintained with clips, the film was guided to a tenter at 100° C. and stretched 4.1-fold in the width direction. Subsequently, while the width stretched in the width direction was maintained, the film was treated for 10 seconds in a heat fixation zone at a temperature of 190° C. Further, a relaxation treatment of 3.0% in the width direction was performed to obtain a stretched PET film.

Polarizing Element-Protection Film i

A polarizing element-protection film was obtained in the same manner as polarizing element-protection film h except that the thickness of the unstretched film was adjusted as described in the table.

Polarizing Element-Protection Film j

A film after 1 week of continuous production under the conditions of the polarizing element-protection film h was sampled.

Polarizing Element-Protection Film k

A polarizing element-protection film k was produced in the same manner as the polarizing element-protection film h except that the difference between the inner diameter of the pipe and the inner diameter of the gasket at the joint was 200 μm, no resin release was performed, and the filter was used as it was, after 1 week of continuous production.

The polarizing element-protection film obtained above was slit in the center portion where the orientation direction is almost uniform (the deviation from the TD direction or MD direction was 0.5 degrees or less) and used. Table 9 shows properties of each polarizing element-protection film.

TABLE 9

| High Re polarizing element-protection film | h | i | j | k |
|---|---|---|---|---|
| Resin | PET | PET | PET | PET |
| Thickness (μm) | 80 | 85 | 80 | 80 |
| Thickness variation (%) | 2.2 | 2.3 | 2.2 | 2.2 |
| Rob (45) (nm) | 9100 | 9580 | 9050 | 9070 |
| FI (45) | 0.484 | 0.509 | 0.481 | 0.482 |
| Rob (30) (nm) | 7750 | 8050 | 7700 | 7680 |
| FI (30) | 0.412 | 0.428 | 0.409 | 0.408 |
| Rob (60) (nm) | 10230 | 10720 | 10250 | 10200 |
| FI (60) | 0.544 | 0.570 | 0.545 | 0.542 |
| ΔFI/FI (45) | 0.273 | 0.279 | 0.282 | 0.278 |
| ΔRob (nm) | 2480 | 2670 | 2550 | 2520 |
| SRa (nm) | 2 or less | 2 or less | 2 or less | 2 or less |
| SRz (nm) | 28 | 30 | 28 | 29 |
| Haze (%) | 0.8 | 0.8 | 0.8 | 0.8 |
| 380 nm light transmittance (%) | 1 | 1 | 1 | 1 |

Production of Polarizers

The polarizing element-protection films prepared above were individually bonded to one surface of a polarizing element and a triacetyl cellulose film (40 μm thick) was bonded to the opposite-side surface of the polarizing element by roll-to-roll bonding to thereby produce polarizers Ph1 to Pk1. A LTVN-curable adhesive was used for the bonding. The angle between the slow axis of the polarizing element-protection film and the absorption axis of the polarizing element was 90 degrees, and the deviation was 0.5 degrees or less.

TABLE 10

| Polarizer | Ph1 | Pi1 | Pj1 | Pk1 |
|---|---|---|---|---|
| High Re polarizing element-protection film | H | i | j | k |
| Polarizing element | PVA | PVA | PVA | PVA |
| Cell-side polarizing element-protection film | TAC | TAC | TAC | TAC |
| Haze (%) | 0.9 | 0.9 | 1 | 1 |
| Number of foreign substances of 100 μm or more | 0 | 0 | 0 | 3 |
| Number of foreign substances of 50 μm or more and 100 μm or less | 0 | 0 | 1 | 8 |
| Number of foreign substances of 20 μm or more and 50 μm or less | 1 | 0 | 3 | 23 |

Evaluation of Display Device

The light-source-side polarizer and viewing-side polarizer were replaced by the polarizer prepared above and evaluated. The evaluation of color unevenness as viewed from an oblique direction was performed according to (10A).

Table 11 shows the results. In order to see the effect of optical properties of the polarizing element-protection film, no reflection reduction layer was provided.

TABLE 11

| | Example 3-1 | Example 3-2 | Example 3-3 | Comp. Ex. 3-1 |
|---|---|---|---|---|
| Viewing side | Ph1 | Pi1 | Pj1 | Pk1 |
| Light-source side | Ph1 | Pi1 | Pj1 | Pk1 |
| Evaluation of color unevenness in an oblique direction | 5 | 5 | 5 | 5 |
| Evaluation of color unevenness in horizontal and vertical directions | 5 | 5 | 5 | 5 |
| Micro-image uniformity | 5 | 5 | 3 | 1 |

Polarizing Element-Protection Film 1

As starting materials for forming a substrate film intermediate layer, 90 parts by mass of PET (A) resin pellets not containing particles and 10 mass of PET (B) resin pellets containing a ultraviolet absorber were dried under reduced pressure (1 Torr) at 135° C. for 6 hours and then supplied to an extruder 2 (for intermediate layer II), whereas PET (A) was dried in a usual manner and supplied to an extruder 1 (for outer layer I and outer layer III). These two types of polymers were melted at 285° C. and individually filtered through a sintered stainless steel filter (nominal filtration accuracy: 95% of 10 μm particles were cut off). The two types of polymers were laminated using a two-type three-layer merging block, extruded into a sheet shape from a die. The resulting sheet was cooled and solidified by winding the sheet around a casting drum with a surface temperature of 30° C. by an electrostatic casting method to thereby form an unstretched film. The amount discharged from each extruder to form this film was adjusted to achieve a thickness ratio of layer I/layer II/layer III of 10:80:10.

The difference between the inner diameter of the pipe and the inside diameter of the packing at the joint on the flange of the pipe through which the molten resin passes was 50 μm or less. After a 5-minute resin discharge at a flow rate 1.2-fold the resin extrusion rate to be set at the start of operation was performed 3 times, film production was started and films obtained 30 minutes after the start of the production and thereafter were sampled. The filter element was replaced with a cleaned one at the start of the operation.

Subsequently, the adhesion-modifying coating solution 2 was applied to both surfaces of this unstretched PET film in such a manner that the dried coating amount was 0.08 g/m², and the coated film was dried at 80° C. for 20 seconds. In the coating application, a cartridge filter with a 95% separation particle size of 10 μm was installed in the line feeding the coating solution 2 to the coating die to remove aggregated particles.

The unstretched film with this coating layer formed thereon was guided to a tenter stretching machine. While the end portions of the film were held with clips, the film was guided to a tenter of 100° C. and stretched 4.1-fold in the width direction. Subsequently, while the width stretched in the width direction was maintained, the film was treated in a heat fixation zone at a temperature of 190° C. for 10 seconds. Further, a relaxation treatment of 3.0% in the width direction was performed to obtain a stretched PET film.

Polarizing Element-Protection Film m A polarizing element-protection film as shown in Table 12 was obtained in the same manner as polarizing element-protection film l except that the thickness of the unstretched film was adjusted.

Polarizing Element-Protection Film n

A polarizing element-protection film was produced in the same manner as in polarizing element-protection film l except that a dry blend of PET (A)/PET (D)=8/2 was used in place of PET (A) and a dry blend of PET (B)/PET (E)=8/2 was used in place of PET (B).

Polarizing Element-Protection Film o

A polarizing element-protection film was produced in the same manner as polarizing element-protection film l except that PET (D) was used in place of PET (A) and PET (E) was used in place of PET (B).

The polarizing element-protection films obtained above were slit in the center portion where the orientation direction is almost uniform (the deviation from the TD direction or MD direction was 0.5 degrees or less) and used. Table 12 shows the properties of each polarizing element-protection film.

TABLE 12

| High Re polarizing element-protection film | L | m | N | O |
|---|---|---|---|---|
| Resin | PET | PET | PET | PET |
| Thickness (μm) | 80 | 85 | 80 | 80 |
| Thickness variation (%) | 2.2 | 2.3 | 2.4 | 2.3 |
| Rob (45) (nm) | 9100 | 9580 | 9080 | 9070 |
| FI (45) | 0.484 | 0.509 | 0.483 | 0.482 |
| Rob (30) (nm) | 7750 | 8050 | 7720 | 7680 |
| FI (30) | 0.412 | 0.428 | 0.410 | 0.408 |
| Rob (60) (nm) | 10230 | 10720 | 10280 | 10250 |
| FI (60) | 0.544 | 0.570 | 0.546 | 0.545 |
| ΔFI/FI (45) | 0.273 | 0.279 | 0.282 | 0.283 |
| ΔRob (nm) | 2480 | 2670 | 2560 | 2570 |
| SRa (nm) | 2 or less | 2 or less | 2 or less | 2 or less |
| SRz (nm) | 28 | 30 | 28 | 29 |
| Haze (%) | 0.8 | 0.8 | 1.4 | 3.6 |
| Amount of Sb atom (ppm) | 2 | 2 | 23 | 53 |
| 380 nm light transmittance (%) | 1 | 1 | 1 | 1 |

Production of Polarizers

The polarizing element-protection films prepared above were individually bonded to one surface of a polarizing element and a triacetyl cellulose film (40 μm thick) was bonded to the opposite-side surface of the polarizing element by roll-to-roll bonding to thereby produce polarizers. A UV curable adhesive was used for the bonding. The angle between the slow axis of the polarizing element-protection film and the absorption axis of the polarizing element was 90 degrees. The deviation was 0.5 degrees or less in any case.

TABLE 13

| Polarizer | Pl1 | Pm1 | Pn1 | Po1 |
|---|---|---|---|---|
| High Re polarizing element-protection film | L | m | n | o |
| Polarizing element | PVA | PVA | PVA | PVA |
| Cell-side polarizing element-protection film | TAC | TAC | TAC | TAC |
| Haze (%) | 1 | 1 | 1.7 | 3.8 |

Display Device Evaluation

The light-source-side polarizer and viewing-side polarizer were replaced with the polarizer produced above and evaluation was performed. The evaluation of color unevenness in an oblique direction was performed according to (10A).

Table 14 shows the results. Note that in order to see the effect of optical properties of the polarizing element-protection film, no reflection reduction layer was provided.

TABLE 14

|  | Example 4-1 | Example 4-2 | Example 4-3 | Comp. Ex. 4-1 |
|---|---|---|---|---|
| Viewing side | Pl1 | Pm1 | Pn1 | Po1 |
| Light-source side | Pl1 | Pm1 | Pn1 | Po1 |
| Evaluation of color unevenness in oblique direction | 5 | 5 | 5 | 5 |
| Evaluation of color unevenness in horizontal and vertical directions | 5 | 5 | 5 | 5 |
| Image sharpness and brightness | 5 | 5 | 3 | 1 |

Polarizing Element-protection Film p

As starting materials for forming a substrate film intermediate layer, 90 parts by mass of PET (A) resin pellets not containing particles and 10 mass of PET (B) resin pellets containing a ultraviolet absorber were dried under reduced pressure (1 Torr) at 135° C. for 6 hours and then supplied to an extruder 2 (for intermediate layer II), whereas PET (A) was dried in a usual manner and supplied to an extruder 1 (for outer layer I and outer layer III). These two types of polymers were melted at 285° C. and individually filtered through a sintered stainless steel filter (nominal filtration accuracy: 95% of 10 μm particles were cut off). The two types of polymers were laminated using a two-type three-layer merging block, extruded into a sheet shape from a die. The resulting sheet was then cooled and solidified by winding the sheet around a casting drum with a surface temperature of 30° C. by an electrostatic casting method to form an unstretched film. The amount discharged from each extruder to form this film was adjusted to achieve a thickness ratio of layer I/layer II/layer III of 10:80:10.

Subsequently, the above adhesion-modifying coating solution was applied to both surfaces of this unstretched PET film in such a manner that the dried coating amount was 0.08 g/m², and the coated film was then dried at 80° C. for 20 seconds. In the coating application, a cartridge filter with a 95% separation particle size of 10 μm was installed in the line for feeding the coating solution to the coating die to remove aggregated particles.

The unstretched film having the coating layer formed thereon was guided to a tenter stretching machine. While the end portions of the film were held with clips, the film was guided to a tenter at 100° C. and stretched 4.1-fold in the width direction. Subsequently, while the width stretched in the width direction was maintained, the film was treated for 10 seconds in a heat fixation zone at a temperature of 190° C. Further, a relaxation treatment of 3.0% in the width direction was performed to obtain a stretched PET film.

Polarizing Element-Protection Film q

A polarizing element-protection film as shown in Table 15 was obtained in the same manner as polarizing element-protection film p except that the thickness of the unstretched film was adjusted.

Polarizing Element-Protection Film r

A polarizing element-protection film as shown in Table 15 was obtained in the same manner as polarizing element-protection film p except that an adhesion-modifying coating solution 3 was used.

The polarizing element-protection films obtained above were slit in the center portion where the orientation direction was almost uniform (the deviation from the TD direction or MD direction was 0.5 degrees or less) and used. Table 15 shows the properties of each polarizing element-protection film.

TABLE 15

| High Re polarizing element-protection film | P | q | r |
| --- | --- | --- | --- |
| Resin | PET | PET | PET |
| Thickness (μm) | 80 | 85 | 80 |
| Thickness variation (%) | 2.2 | 2.3 | 2.3 |
| Rob (45) (nm) | 9100 | 9580 | 9120 |
| FI (45) | 0.484 | 0.509 | 0.485 |
| Rob (30) (nm) | 7750 | 8050 | 7720 |
| FI (30) | 0.412 | 0.428 | 0.410 |
| Rob (60) (nm) | 10230 | 10720 | 10250 |
| FI (60) | 0.544 | 0.570 | 0.545 |
| ΔEI/FI (45) | 0.273 | 0.279 | 0.278 |
| ΔRob (nm) | 2480 | 2670 | 2530 |
| SRa (nm) | 2 or less | 2 or less | 2 or less |
| SRz (nm) | 28 | 30 | 30 |
| Haze (%) | 0.8 | 0.8 | 0.7 |
| Adhesion-modifying coating solution | D1 | D1 | D2 |
| 380 nm light transmittance (%) | 1 | 1 | 1 |

Production of Polarizers

The polarizing element-protection films prepared above were individually bonded to one surface of a polarizing element and a triacetyl cellulose film (40 μm thick) was bonded to the opposite-side surface of the polarizing element by roll-to-roll bonding to thereby produce polarizers. A UV curable adhesive was used for the bonding. In each polarizer, the angle between the slow axis of the polarizing element-protection film and the absorption axis of the polarizing element was 90 degrees, and the deviation was 0.5 degrees or less in any case.

TABLE 16

| Polarizer | Pp1 | Pq1 | Pr1 |
| --- | --- | --- | --- |
| High Re polarizing element-protection film | p | q | r |
| Polarizing element | PVA | PVA | PVA |
| Cell-side polarizing element-protection film | TAC | TAC | TAC |
| Haze (%) | 1 | 1 | 1 |

Evaluation with Light-Source-Side Polarizer

The light-source-side polarizer and the viewing-side polarizer were both replaced with the polarizer prepared above and evaluation was performed. The evaluation of color unevenness in an oblique direction was performed according to (10A).

Table 17 shows the results. Note that in order to see the effect of optical properties of the polarizing element-protection film, no reflection reduction layer was provided.

TABLE 17

| | Example 5-1 | Example 5-2 | Comp. Ex. 5-1 |
| --- | --- | --- | --- |
| Viewing side | Pp1 | Pq1 | Pr1 |
| Light-source side | Pp1 | Pq1 | Pr1 |
| Evaluation of color unevenness in oblique direction | 5 | 5 | 5 |
| Evaluation of color unevenness in horizontal and vertical directions | 5 | 5 | 5 |
| Interference color | A | A | C |

INDUSTRIAL APPLICABILITY

The present invention can provide an image display device that has a wide reproduced color gamut without noticeable color unevenness even though the image display device has an emission spectrum in which a steep peak appears in the red region.

The present invention can provide a liquid crystal display device that has a wide reproduced color gamut without noticeable color unevenness even though the liquid crystal display device comprises, as a backlight light source, a light source having a steep emission spectrum in the red region, such as a KSF phosphor.

The present invention can provide a liquid crystal display device that is substantially free of defects even if viewed closely and that has a wide reproduced color gamut without noticeable color unevenness even if the liquid crystal display device comprises, as a backlight light source, a light source having a steep emission spectrum in the red region, such as a KSF phosphor.

The present invention can provide a liquid crystal display device that provides brightness and sharpness and that has a wide reproduced color gamut without noticeable color unevenness even if the image display device comprises, as a backlight light source, a light source having a steep emission spectrum in the red region, such as a KSF phosphor.

The present invention can provide an image display device that has a wide reproduced color gamut without noticeable color unevenness and without noticeable interference color even if the image display device has an emission spectrum in which a sharp peak appears in the red region.

The invention claimed is:

1. An image display device comprising an image display cell and at least one polarizer,
wherein the at least one polarizer is a polarizer in which light incident on the polarizer has a plurality of peak groups in the range of 600 to 650 nm, and the at least one polarizer comprises a polarizing element-protection film having a 45-degree light source fit index (FI(45)) of 0.4 or more and 0.62 or less as determined by the following formula 1:

$$FI(45)=Wd/[Wc/(Rob(45)/Wc)] \quad \text{formula 1}$$

Rob(45): retardation when measuring the polarizing element-protection film from a direction inclined 50 degrees from a normal direction at incident angle and 45 degrees from a slow-axis direction to a fast-axis direction in a plane of the film
Wd: peak-to-peak distance (nm) of the peak groups
Wc: central wavelength (nm) of the peak groups.

2. The image display device according to claim 1, wherein the polarizing element-protection film has a 30-degree light source fit index (FI(30)) of 0.35 or more and 0.68 or less as determined by the following formula 2, and a 60-degree light source fit index (FI(60)) of 0.35 or more and 0.68 or less as determined by the following formula 3:

$$FI(30)=Wd/[Wc/(Rob(30)/Wc)] \quad \text{formula 2}$$

$$FI(60)=Wd/[Wc/(Rob(60)/Wc)] \quad \text{formula 3}$$

Rob(30): retardation when measuring the polarizing element-protection film from a direction inclined 50 degrees from the normal direction at incident angle and 30 degrees from the slow-axis direction to the fast-axis direction in a plane of the film
Rob(60): retardation when measuring the polarizing element-protection film from a direction inclined 50 degrees from the normal direction at incident angle and 60 degrees from the slow-axis direction to the fast-axis direction in a plane of the film
Wd: peak-to-peak distance (nm) of the peak groups
Wc: central wavelength (nm) of the peak groups.

3. The image display device according to claim 2, wherein the ratio of a difference between the FI(30) and the FI(60) (ΔFI=FI(60)−FI(30)) to the FI(45) (ΔFI/FI(45)) in the polarizing element-protection film is 0.2 or more and 0.35 or less.

4. The image display device according to claim 2, wherein values obtained by measuring the FI(30) and FI(60) at intervals of 100 mm along the long-side direction and at intervals of 100 mm along the short-side direction are each 0.35 or more and 0.68 or less.

5. The image display device according to claim 3, wherein values obtained by measuring the ΔFI/FI(45) at intervals of 100 mm along the long-side direction and at intervals of 100 mm along the short-side direction are each 0.2 or more and 0.35 or less.

6. The image display device according to claim 1, wherein
values obtained by measuring the FI(45) at intervals of 100 mm along a long-side direction and at intervals of 100 mm along a short-side direction are each 0.4 or more and 0.62 or less, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less.

7. The image display device according to claim 1, wherein the light having a plurality of peak groups in the range of 600 to 650 nm incident on the polarizer is derived from light emitted by excitation of a red phosphor activated with tetravalent manganese ions.

8. An image display device comprising an image display cell and at least one polarizer,
wherein the at least one polarizer comprises a polarizing element-protection film having a retardation (Rob(45)) of 7500 nm or more and 11700 nm or less as measured from a direction inclined 50 degrees from a normal direction at incident angle and 45 degrees from a slow-axis direction to a fast-axis direction in a plane of the film, and
light incident on the at least one polarizer comprises light emitted by excitation of a red phosphor activated with tetravalent manganese ions.

9. The image display device according to claim 1, which is an electroluminescent image display device.

10. The image display device according to claim 1, which is a liquid crystal display device comprising a backlight light source, a light-source-side polarizer, a liquid crystal cell, and a viewing-side polarizer.

11. The image display device according to claim 8, wherein in the polarizer comprising the polarizing element-protection film, an angle between a slow axis in a plane of the polarizing element-protection film and an absorption axis of the polarizing element is 83 degrees or more and 90 degrees or less, or 0 degrees or more and 7 degrees or less, in terms of acute angle.

12. The image display device according to claim 8, wherein
values obtained by measuring the Rob(45) of the polarizing element-protection film at intervals of 100 mm along a long-side direction and at intervals of 100 mm along a short-side direction are each 7500 nm or more and 11700 nm or less,
a value obtained by subtracting the minimum value from the maximum value of the Rob(45) measured at intervals of 100 mm along the long-side direction and a value obtained by subtracting the minimum value from the maximum value of the Rob(45) measured at intervals of 100 mm along the short-side direction are each 500 nm or less, and
light incident on the at least one polarizer comprises light emitted by excitation of a red phosphor activated with tetravalent manganese ions.

13. The image display device according to claim 8, wherein the polarizing element-protection film comprises an easy-to-adhere layer containing particles with a refractive index of 1.7 to 3 on at least one surface thereof.

14. The image display device according to claim 12, wherein the red phosphor activated with tetravalent manganese ions is represented by $K_2SiF_6:Mn^{4+}$.

15. The image display device according to claim 8, wherein the polarizing element-protection film has a Rob (30) of 6570 nm or more and 12200 nm or less and a Rob(60) of 6570 nm or more and 12200 nm or less,
Rob(30): retardation when measuring the polarizing element-protection film from a direction inclined 50 degrees from the normal direction at incident angle and 30 degrees from the slow-axis direction to the fast-axis direction in a plane of the film Rob(60): retardation when measuring the polarizing element-protection film from a direction inclined 50 degrees from the normal direction at incident angle and 60 degrees from the slow-axis direction to the fast-axis direction in a plane of the film.

16. The image display device according to claim 15, wherein a difference between the Rob(30) and the Rob(60) (ΔRob=Rob(60)−Rob(30)) in the polarizing element-protection film is 1880 nm or more and 3400 nm or less.

17. The image display device according to claim 16, wherein the ΔRob at intervals of 100 mm along the long-side direction and at intervals of 100 mm along the short-side direction are each 1880 nm or more and 3400 nm or less.

18. The image display device according to claim 15, wherein values obtained by measuring the Rob(30) and the Rob(60) at intervals of 100 mm along the long-side direction and at intervals of 100 mm along the short-side direction are each 6570 nm or more and 12200 nm or less.

19. A method for selecting a combination of a backlight light source and a polarizer in a liquid crystal display device comprising a backlight light source, a light-source-side polarizer, a liquid crystal cell, and a viewing-side polarizer, the method comprising:
(a) selecting a backlight light source having a plurality of peak groups in the range of 600 to 650 nm in an emission spectrum; and
(b) selecting a polarizer comprising a polarizing element-protection film, the polarizer being at least one of a light-source-side polarizer and a viewing-side polarizer, wherein the polarizing element-protection film has a 45-degree light source fit index (FI(45)) of 0.4 or more and 0.62 or less as determined by the following formula 1:

$$FI(45)=Wd/[Wc/(Rob(45)/Wc)] \qquad \text{formula 1}$$

Rob(45): retardation when measuring the polarizing element-protection film from a direction inclined 50 degrees from a normal direction at incident angle and 45 degrees from a slow-axis direction to a fast-axis direction in a plane of the film Wd: peak-to-peak distance (nm) of the peak groups Wc: central wavelength (nm) of the peak groups.

20. The method according to claim 19, wherein values obtained by measuring the FI(45) at intervals of 100 mm along a long-side direction and at intervals of 100 mm along a short-side direction are each 0.4 or more and 0.62 or less, and a value obtained by subtracting the minimum value from the maximum value of the FI(45) measured at intervals of 100 mm along the long-side direction and a value obtained by subtracting the minimum value from the maximum value of the FI(45) measured at intervals of 100 mm along the short-side direction are each 0.026 or less.

* * * * *